United States Patent
Chen et al.

(10) Patent No.: US 12,521,963 B2
(45) Date of Patent: Jan. 13, 2026

(54) FOLDABLE APPARATUS AND METHODS OF MAKING

(71) Applicant: CORNING INCORPORATED, Corning, NY (US)

(72) Inventors: Naigeng Chen, San Jose, CA (US); Sushmit Sunil Kumar Goyal, Painted Post, NY (US); Timothy Michael Gross, Corning, NY (US); Jason Thomas Harris, Horseheads, NY (US); Jenny Kim, Horseheads, NY (US); Andrew Peter Kittleson, Honeoye Falls, NY (US); Yousef Kayed Qaroush, Painted Post, NY (US); Pushkar Tandon, Painted Post, NY (US); Wendell Porter Weeks, Corning, NY (US); Arlin Lee Weikel, Mansfield, PA (US); Tingge Xu, Painted Post, NY (US); Ying Zhang, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 1089 days.

(21) Appl. No.: 17/068,241

(22) Filed: Oct. 12, 2020

(65) Prior Publication Data
US 2021/0107251 A1 Apr. 15, 2021

Related U.S. Application Data

(60) Provisional application No. 63/022,748, filed on May 11, 2020, provisional application No. 62/958,106, (Continued)

(51) Int. Cl.
B32B 7/022 (2019.01)
B32B 3/02 (2006.01)
(Continued)

(52) U.S. Cl.
CPC ............. B32B 7/022 (2019.01); B32B 3/02 (2013.01); B32B 3/16 (2013.01); B32B 7/12 (2013.01);
(Continued)

(58) Field of Classification Search
None
See application file for complete search history.

(56) References Cited

U.S. PATENT DOCUMENTS 6,350,506 B2   2/2002   Dickinson, Jr.
7,666,508 B2   2/2010   Feng et al.
(Continued)

FOREIGN PATENT DOCUMENTS

CN   105593185 A   5/2016
CN   107403590 A   11/2017
(Continued)

OTHER PUBLICATIONS

JP 2016-003158, English translation (Year: 2016).*
(Continued)

Primary Examiner — Frank J Vineis
Assistant Examiner — Nicole T Gugliotta

(57) ABSTRACT

Foldable apparatus can comprise a first portion comprising a first edge surface defined between a first surface area and a second surface area opposite the first surface area. Foldable apparatus can comprise a second portion comprising a second edge surface defined between a third surface area and a fourth surface area opposite the third surface area. A polymer-based portion can be positioned between the first blunted edge surface and the second blunted edge surface. In some embodiments, the polymer-based portion can comprise a polymer thickness of about 50 micrometers or less measured from the second surface area and/or the first surface area. In some embodiments, the first edge surface
(Continued)

and/or the second edge surface can comprise a blunted edge surface. In some embodiments, a coating can be disposed over the first portion, the second portion and the polymer-based portion.

17 Claims, 22 Drawing Sheets

Related U.S. Application Data filed on Jan. 7, 2020, provisional application No. 62/914,733, filed on Oct. 14, 2019.

(51) Int. Cl.
| | | |
|---|---|---|
| *B32B 3/16* | (2006.01) | |
| *B32B 7/023* | (2019.01) | |
| *B32B 7/12* | (2006.01) | |
| *B32B 17/10* | (2006.01) | |
| *C03C 27/10* | (2006.01) | |
| *G09F 9/30* | (2006.01) | |
| *H04M 1/02* | (2006.01) | |

(52) U.S. Cl.
CPC ............ *H04M 1/0269* (2022.02); *B32B 17/10* (2013.01); *B32B 2255/24* (2013.01); *B32B 2307/546* (2013.01); *B32B 2457/206* (2013.01)

(56) References Cited

U.S. PATENT DOCUMENTS

| | | | |
|---|---|---|---|
| 7,863,617 B2 | 1/2011 | Hioki et al. | |
| 8,009,421 B2 | 8/2011 | Misawa | |
| 8,616,024 B2 | 12/2013 | Cornejo et al. | |
| 8,729,426 B2 | 5/2014 | Rumsby | |
| 8,854,623 B2 | 10/2014 | Fontaine et al. | |
| 8,904,822 B2 | 12/2014 | Leblanc et al. | |
| 9,102,007 B2 | 8/2015 | Hosseini | |
| 9,302,938 B2 | 4/2016 | Kreski | |
| 9,321,677 B2 | 4/2016 | Chang et al. | |
| 9,321,678 B2 | 4/2016 | Chang et al. | |
| 9,321,679 B2 | 4/2016 | Chang et al. | |
| 9,354,476 B2 | 5/2016 | Han et al. | |
| 9,516,743 B2 | 12/2016 | Kim et al. | |
| 9,557,773 B2 | 1/2017 | Chang et al. | |
| 9,604,877 B2 | 3/2017 | Veerasamy et al. | |
| 9,676,649 B2 | 6/2017 | Dobbins et al. | |
| 9,725,359 B2 | 8/2017 | Weber | |
| 9,773,853 B2 | 9/2017 | Tao et al. | |
| 9,796,621 B2 | 10/2017 | Varshneya et al. | |
| 9,898,046 B2 | 2/2018 | Chang et al. | |
| 9,919,949 B2 | 3/2018 | Kawamoto et al. | |
| 9,947,882 B2 | 4/2018 | Zhang et al. | |
| 10,020,462 B1 | 7/2018 | Ai et al. | |
| 10,268,238 B2 | 4/2019 | Hamburgen et al. | |
| 10,268,242 B2 | 4/2019 | Seo et al. | |
| 10,303,218 B2 | 5/2019 | Jones et al. | |
| 10,345,856 B2 | 7/2019 | Song | |
| 2006/0207976 A1 | 9/2006 | Bovatsek et al. | |
| 2010/0326972 A1 | 12/2010 | Li et al. | |
| 2011/0151282 A1 | 6/2011 | Nagashima | |
| 2014/0029212 A1 | 1/2014 | Hwang et al. | |
| 2014/0178663 A1 | 6/2014 | Varshneya et al. | |
| 2014/0178689 A1 | 6/2014 | Kreski | |
| 2015/0110990 A1 | 4/2015 | Chou et al. | |
| 2015/0210589 A1 | 7/2015 | Chang et al. | |
| 2015/0274585 A1 | 10/2015 | Rogers et al. | |
| 2016/0048171 A1 | 2/2016 | Lee et al. | |
| 2016/0224822 A1 | 8/2016 | Hasegawa et al. | |
| 2016/0326050 A1 | 11/2016 | Lee et al. | |
| 2016/0357294 A1 | 12/2016 | Ozeki et al. | |
| 2017/0015584 A1 | 1/2017 | Krzyzak et al. | |
| 2017/0036941 A1 | 2/2017 | Lee et al. | |
| 2017/0174566 A1 | 6/2017 | Kreski | |
| 2017/0247291 A1 | 8/2017 | Hatano et al. | |
| 2017/0311466 A1 | 10/2017 | Memering et al. | |
| 2017/0334769 A1 | 11/2017 | Luzzato et al. | |
| 2017/0334770 A1 | 11/2017 | Luzzato et al. | |
| 2017/0334774 A1 | 11/2017 | Weber | |
| 2018/0009706 A1 | 1/2018 | Luo et al. | |
| 2018/0113490 A1 | 4/2018 | Chang et al. | |
| 2018/0132371 A1 | 5/2018 | Yeum et al. | |
| 2018/0136371 A1 | 5/2018 | Kim et al. | |
| 2018/0155238 A1 | 6/2018 | Kim et al. | |
| 2018/0194678 A1 | 7/2018 | Scheyvaerts et al. | |
| 2018/0217639 A1 | 8/2018 | Jones et al. | |
| 2018/0356859 A1* | 12/2018 | Hamburgen | G06F 1/1626 |
| 2019/0011954 A1 | 1/2019 | Chu et al. | |
| 2019/0022980 A1 | 1/2019 | Chu et al. | |
| 2019/0023611 A1 | 1/2019 | Luzzato et al. | |
| 2019/0045038 A1 | 2/2019 | Zhou et al. | |
| 2019/0047260 A1 | 2/2019 | Cleary et al. | |
| 2019/0047900 A1* | 2/2019 | Hu | H04M 1/0268 |
| 2019/0050027 A1 | 2/2019 | Chang et al. | |
| 2019/0100457 A1 | 4/2019 | Luzzato et al. | |
| 2019/0265756 A1 | 8/2019 | Jones et al. | |
| 2020/0026327 A1 | 1/2020 | Hendren et al. | |
| 2020/0171781 A1 | 6/2020 | Zhang | |
| 2020/0183457 A1 | 6/2020 | Youn et al. | |

FOREIGN PATENT DOCUMENTS

| | | | |
|---|---|---|---|
| CN | 108298827 A | 7/2018 | |
| CN | 108556434 A | 9/2018 | |
| CN | 108698377 A | 10/2018 | |
| CN | 109081561 A | 12/2018 | |
| JP | 5516442 B2 | 6/2014 | |
| JP | 5655980 B2 | 1/2015 | |
| JP | 2015-113261 A | 6/2015 | |
| JP | 2015-117167 A | 6/2015 | |
| JP | 2015-137224 A | 7/2015 | |
| JP | 5834937 B2 | 12/2015 | |
| JP | 2016-003158 A * | 1/2016 | ......... C03C 21/2001 |
| JP | 2016-169143 A | 9/2016 | |
| JP | 2017-001902 A | 1/2017 | |
| JP | 2017-030997 A | 2/2017 | |
| JP | 2017-048090 A | 3/2017 | |
| JP | 6149733 B2 | 6/2017 | |
| JP | 2017-160111 A | 9/2017 | |
| JP | 2018-002552 A | 1/2018 | |
| JP | 2018-052803 A | 4/2018 | |
| JP | 2018-168030 A | 11/2018 | |
| JP | 2019-001691 A | 1/2019 | |
| TW | 201906798 A | 2/2019 | |
| WO | 2012/073603 A1 | 6/2012 | |
| WO | 2013/161651 A1 | 10/2013 | |
| WO | 2014/007222 A1 | 1/2014 | |
| WO | 2014/045978 A1 | 3/2014 | |
| WO | 2014/045979 A1 | 3/2014 | |
| WO | 2014/112444 A1 | 7/2014 | |
| WO | 2014/139147 A1 | 9/2014 | |
| WO | 2014/166082 A1 | 10/2014 | |
| WO | 2015/050095 A1 | 4/2015 | |
| WO | 2015/093284 A1 | 6/2015 | |
| WO | 2015/116466 A1 | 8/2015 | |
| WO | 2015/156262 A1 | 10/2015 | |
| WO | 2016/118544 A1 | 7/2016 | |
| WO | 2016/149860 A1 | 9/2016 | |
| WO | 2016/149861 A1 | 9/2016 | |
| WO | 2016/152657 A1 | 9/2016 | |
| WO | 2016/204087 A1 | 12/2016 | |
| WO | 2017/009235 A1 | 1/2017 | |
| WO | 2017/026190 A1 | 2/2017 | |
| WO | 2017/102345 A1 | 6/2017 | |
| WO | 2017/136507 A1 | 8/2017 | |
| WO | 2017/154654 A1 | 9/2017 | |
| WO | 2017/179360 A1 | 10/2017 | |
| WO | 2017/217388 A1 | 12/2017 | |
| WO | 2017/221805 A1 | 12/2017 | |
| WO | 2018/008359 A1 | 1/2018 | |
| WO | 2018/056329 A1 | 3/2018 | |
| WO | 2018/057774 A1 | 3/2018 | |
| WO | 2018/066314 A1 | 4/2018 | |

(56) References Cited

FOREIGN PATENT DOCUMENTS

| WO | 2018/097096 A1 | 5/2018 |
| WO | 2018/112181 A1 | 6/2018 |
| WO | 2018/116981 A1 | 6/2018 |
| WO | 2018/135547 A1 | 7/2018 |
| WO | 2018/135548 A1 | 7/2018 |
| WO | 2019/085302 A1 | 5/2019 |

OTHER PUBLICATIONS

RoyMech: Fatigue & Stree Concentrations, https://www.roymech.co.uk/Useful_Tables/Fatigue#google_vignette (Year: 2012).*
JP2016-003158 A, Kiyotaka, JPO machine translation (Year: 2016).*
USPTO Human translation of paragraphs [0001]-[0005] of JP 2016-003158 (Year: 2016).*
International Search Report and Written Opinion of the International Searching Authority; PCT/US2020/055187; Mailed Jan. 19, 2021; 10 Pages; European Patent Office.

* cited by examiner

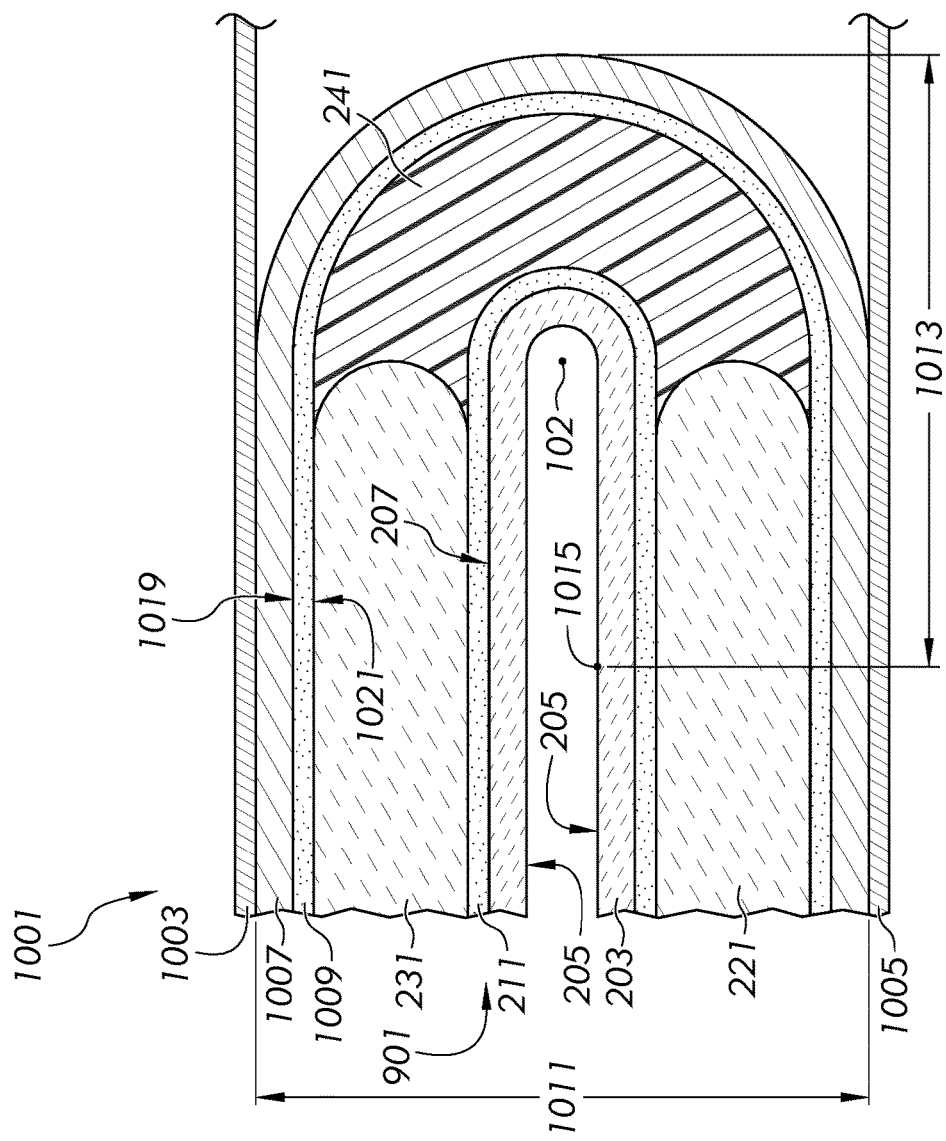
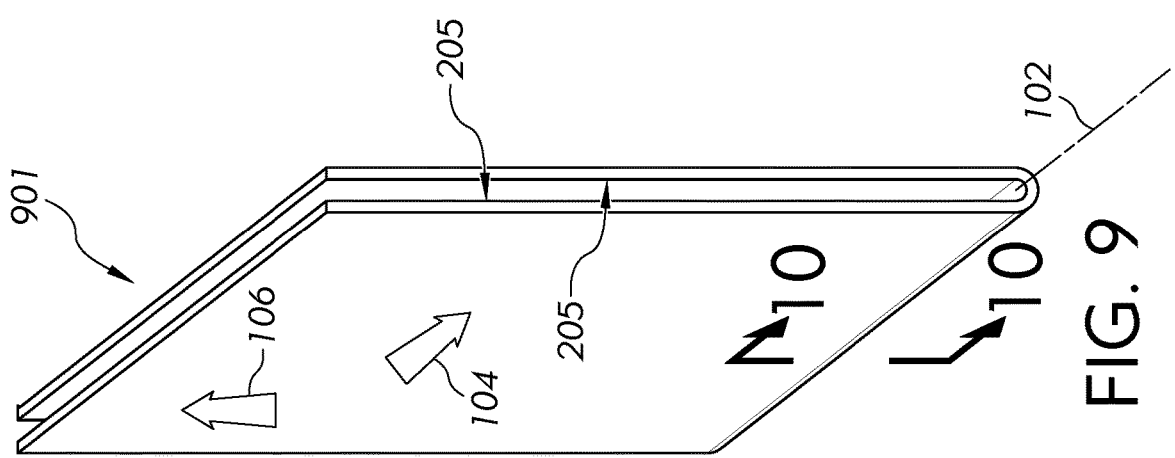
FIG. 10
FIG. 9

FOLDABLE APPARATUS AND METHODS OF MAKING

RELATED APPLICATIONS

This application claims the benefit of priority under 35 U.S.C. § 119 of U.S. Provisional Application Ser. No. 63/022,748 filed on May 11, 2020 and U.S. Provisional Application Ser. No. 62/958,106 filed on Jan. 7, 2020 and U.S. Provisional Application Ser. No. 62/914,733 filed on Oct. 14, 2019, the contents of each of which are relied upon and incorporated herein by reference in their entireties.

FIELD

The present disclosure relates generally to foldable apparatus and methods of making and, more particularly, to foldable apparatus comprising portions and methods of making foldable apparatus.

BACKGROUND

Glass-based substrates are commonly used, for example, in display devices, for example, liquid crystal displays (LCDs), electrophoretic displays (EPD), organic light emitting diode displays (OLEDs), plasma display panels (PDPs), or the like.

There is a desire to develop foldable versions of displays as well as foldable protective covers to mount on foldable displays. Foldable displays and covers should have good impact and puncture resistance. At the same time, foldable displays and covers should have small minimum bend radii (e.g., about 10 millimeters (mm) or less). However, plastic displays and covers with small minimum bend radii tend to have poor impact and/or puncture resistance. Furthermore, conventional wisdom suggests that ultra-thin glass-based sheets (e.g., about 75 micrometers (μm or microns) or less thick) with small minimum bend radii tend to have poor impact and/or puncture resistance. Furthermore, thicker glass-based sheets (e.g., greater than 125 micrometers) with good impact and/or puncture resistance tend to have relatively large minimum bend radii (e.g., about 30 millimeters or more). Consequently, there is a need to develop foldable apparatus that have low minimum bend radii and good impact and puncture resistance.

SUMMARY

There are set forth herein foldable apparatus and methods of making foldable apparatus that comprise a first portion and a second portion. The portions can comprise glass-based portions, ceramic-based portions, and/or polymer-based portions, which can provide good impact resistance and/or good puncture resistance to the foldable apparatus. The first portion and/or the second portion can comprise glass-based portions and/or ceramic-based portions comprising one or more compressive stress regions, which can further provide increased impact resistance and/or increased puncture resistance. Providing a substrate comprising a glass-based and/or ceramic-based substrate can also provide increased impact resistance and/or increased puncture resistance while simultaneously facilitating good folding performance.

A first edge surface of the first portion and a second edge surface of the second portion can comprise a blunted edge surface, which can minimize stress concentrations, for example, at an interface between the first portion and/or the second portion and the polymer-based portion. Providing a blunted edge surface for the first portion and/or the second portion can reduce the incidence of adhesion-based failure (e.g., delamination) between the polymer-based portion and the first portion and/or the second portion. In other embodiments, the first edge and/or the second edge need not be blunted.

A region between the first portion and the second portion can comprise a polymer-based portion, which can provide good folding performance (e.g., effective minimum effective bend radius in a range from about 1 mm to about 20 mm, for example, from about 5 mm to about 10 mm). Providing a minimum distance between the first portion and the second portion that is small (e.g., about 30 mm or less, for example, from about 5 mm to about 20 mm, or from 5 mm to about 10 mm) can further provide good folding performance as well as minimize a region of the foldable apparatus with a lower impact resistance (e.g., the portion of the foldable apparatus including the polymer-based portion compared to the portions of the foldable apparatus comprising the first portion and/or the second portion). In some embodiments, a coating can be disposed over at least the polymer-based portion (e.g., between the polymer-based portion and a user).

Providing a polymer-based portion contacting a surface area of the first portion and/or the second portion can reduce folding-induced stresses on a coating and/or substrate, for example, by shifting a neutral axis of the coating and/or substrate closer to the polymer-based portion than a midplane of the coating and/or substrate. Further providing a polymer-based portion contacting both the first portion and the second portion can reduce optical distortions when viewing an image (e.g., from a display device or other electronic device). Further providing a polymer-based portion contacting a pair of surface areas facing the same direction can provide a contact surface covering the first portion and the second portion to present the contact surface with consistent properties across its length and/or width for coupling components thereto (e.g., substrates, coatings, release liners, display devices). In some embodiments, the polymer-based portion and/or an adhesive layer (e.g., first, second, third) can comprise a refractive index that can substantially match (e.g., a magnitude of a difference of about 0.1 or less) a refractive index of the first portion and/or the second portion, which can minimize optical distortions.

Providing the polymer-based portion contacting a first surface area of the first portion and a third surface area of the second portion and/or a second surface area of the second portion and a fourth surface area of the second portion can further increase the reliability of the foldable apparatus. For example, providing a consistent interface between the first portion and/or second portion that extends beyond the corresponding edge surface can reduce interfacial strain and/or stress as well as reduce stress concentrations on the corresponding portion. In further embodiments, an incidence of mechanical instabilities can be reduced by providing a small thickness (e.g., about 5 millimeters or less, from about 1 millimeter to about 5 millimeters) of the polymer-based portion from one or more of the first surface area of the first portion, the second surface area of the first portion, the third surface area of the second portion, and/or the fourth surface area of the second portion. In further embodiments, providing a contact surface of the polymer-based portion and/or adhesive portion extending from the first portion to the second portion can provide a uniform interface for other components to attach to, which can reduce stress concentration and reduce the incidence of folding-induced failure.

Providing an inorganic layer (e.g., glass-based substrate, ceramic-based substrate, sapphire) disposed over at least the polymer-based portion (e.g., between the polymer-based portion and a user) can also provide increased impact resistance and/or increased puncture resistance while simultaneously facilitating good folding performance. For example, the inorganic layer can increase a pen drop height that the foldable apparatus can withstand of a central portion of the foldable apparatus comprising the polymer-based portion. Limiting a width of the inorganic layer (e.g., from about 100% to about 200% of the minimum distance between the first portion and the second portion) can provide increased pen drop performance will minimizing an amount of material in the substrate. In further embodiments, the inorganic layer can provide a consistent major surface with the rest of the foldable apparatus, for example, by providing a recessed portion of the first portion and/or second portion configured to receive the substrate. Providing a consistent major surface comprising the first portion, the second portion, and the inorganic layer can enable a smooth surface of the foldable apparatus that can reduce optical distortions and/or enable a perceived continuous surface for a user of the foldable apparatus.

Providing a neutral stress configuration when the foldable apparatus is in a bent configuration can decrease the force to fold the foldable apparatus to a predetermined parallel plate distance. Further, providing a neutral stress configuration when the foldable apparatus is in a bent state can reduce the maximum stress and/or the maximum strain experienced by the polymer-based portion during normal use conditions, which can, for example, enable increased durability and/or reduced fatigue of the foldable apparatus. In some embodiments, the polymer-based portion can comprise a low (e.g., substantially zero and/or negative) coefficient of thermal expansion, which can mitigate warp caused by volume changes during curing of the polymer-based portion. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by folding a ribbon at an elevated temperature (e.g., when the ribbon comprises a viscosity in a range from about $10^4$ Pascal-seconds and about $10^7$ Pascal-seconds).

Providing a coating can reduce folding-induced stresses of the first portion, second portion, and/or polymer-based portion. Providing a coating can reduce the force to achieve a small parallel plate distance (e.g., about 10 Newtons (N) or less to achieve a parallel plate distance of 10 mm, about 3 N or less to achieve a parallel plate distance of about 3 mm). Providing a coating can also improve the scratch resistance, the impact resistance, and/or the puncture resistance of the foldable apparatus while simultaneously facilitating good folding performance. In some embodiments, a substrate can be disposed over at least the polymer-based portion (e.g., between the polymer-based portion and a user). The coating can enable low forces to achieve small parallel plate distances, for example, by shifting a neutral axis of the polymer-based portion away from the coating (e.g., surface facing the user) when the coating has an elastic modulus less than an elastic modulus of a glass-based substrate and/or the coating has a thickness of about 200 µm or less. Further, providing a coating on the substrate can provide low-velocity ejection of shards upon failure of the foldable apparatus (e.g., when it is pushed beyond its design limits) and/or can comprise shards comprising an aspect ratio of about 3 or less.

Some example embodiments of the disclosure are described below with the understanding that any of the features of the various embodiments may be used alone or in combination with one another.

Embodiment 1. A foldable apparatus comprises a first portion comprising a first surface area and a second surface area opposite the first surface area. A first edge surface is defined between the first surface area and the second surface area. A first thickness is defined between the first surface area and the second surface area. A second portion comprises a third surface area and a fourth surface area opposite the third surface area. A second edge surface is defined between the third surface area and the fourth surface area. A second thickness is defined between the third surface area and the fourth surface area. The foldable apparatus comprises a polymer-based portion positioned between the first edge surface and the second edge surface. The polymer-based portion comprises a third contact surface and a fourth contact surface opposite the third contact surface. The polymer-based portion comprises an index of refraction. The foldable apparatus comprises a neutral stress configuration when the foldable apparatus is in a bent configuration.

Embodiment 2. The foldable apparatus of embodiment 1, wherein a movement of the foldable apparatus from a flat configuration to the neutral stress configuration corresponds to a maximum magnitude of a deviatoric strain of the polymer-based portion in a range from about 1% to about 8%.

Embodiment 3. The foldable apparatus of embodiment 2, wherein the maximum magnitude of the deviatoric strain is in a range from about 2% to about 6%.

Embodiment 4. The foldable apparatus of any one of embodiments 1-3, wherein the polymer-based portion comprises a negative coefficient of thermal expansion.

Embodiment 5. The foldable apparatus of any one of embodiments 1-4, wherein the polymer-based portion contacts the second surface area of the first portion and the fourth surface area of the second portion. The polymer-based portion further comprises a polymer thickness of about 50 micrometers or less measured from the second surface area of the first portion in a direction of the first thickness.

Embodiment 6. The foldable apparatus of any one of embodiments 1-4, wherein the polymer-based portion contacts the first surface area of the first portion and the third surface area of the second portion. The polymer-based portion further comprises a polymer thickness of about 50 micrometers or less measured from the first surface area of the first portion in a direction of the first thickness.

Embodiment 7. A foldable apparatus comprises a first portion comprising a first surface area and a second surface area opposite the first surface area. A first edge surface is defined between the first surface area and the second surface area. A first thickness is defined between the first surface area and the second surface area. The foldable apparatus comprises a second portion comprising a third surface area and a fourth surface area opposite the third surface area. A second edge surface is defined between the third surface area and the fourth surface area. A second thickness is defined between the third surface area and the fourth surface area. The foldable apparatus comprises a polymer-based portion positioned between the first edge surface and the second edge surface. The polymer-based portion contacts the second surface area of the first portion and the fourth surface area of the second portion. The polymer-based portion comprises a third contact surface and a fourth contact surface opposite the third contact surface. The polymer-based portion comprises a polymer thickness of about 50 micrometers or less measured from the second surface area of the first portion in a direction of the first thickness.

Embodiment 8. A foldable apparatus comprises a first portion comprising a first surface area and a second surface area opposite the first surface area. A first edge surface is defined between the first surface area and the second surface area. A first thickness is defined between the first surface area and the second surface area. The foldable apparatus comprises a second portion comprising a third surface area and a fourth surface area opposite the third surface area. A second edge surface is defined between the third surface area and the fourth surface area. A second thickness is defined between the third surface area and the fourth surface area. The foldable apparatus comprises a polymer-based portion positioned between the first edge surface and the second edge surface. The polymer-based portion contacts the first surface area of the first portion and the third surface area of the second portion. The polymer-based portion comprises a third contact surface and a fourth contact surface opposite the third contact surface. The polymer-based portion comprises an index of refraction and a polymer thickness of about 50 micrometers or less measured from the first surface area of the first portion in a direction of the first thickness.

Embodiment 9. The foldable apparatus of any one of embodiments 5-8, wherein the polymer thickness is in a range from about 10 micrometers to about 30 micrometers.

Embodiment 10. The foldable apparatus of any one of embodiments 5-8, wherein the polymer thickness in a range from about 1 micrometer to about 5 micrometers.

Embodiment 11. The foldable apparatus of any one of embodiments 1-6, further comprising a first adhesive layer comprising a first contact surface and a second contact surface opposite the first contact surface. The second contact surface faces the first surface area and the third surface area.

Embodiment 12. The foldable apparatus of embodiment 11, wherein a thickness of the first adhesive layer defined between the first contact surface and the second contact surface is in a range from about 1 micrometer to about 30 micrometers.

Embodiment 13. The foldable apparatus of embodiment 12, wherein the thickness of the first adhesive layer is in a range from about 1 micrometer to about 5 micrometers.

Embodiment 14. The foldable apparatus of any one of embodiments 11-13, wherein the third contact surface of the polymer-based portion contacts the second contact surface of the first adhesive layer.

Embodiment 15. The foldable apparatus of any one of embodiments 11-14, wherein the first surface area of the first portion contacts the second contact surface of the first adhesive layer. The third surface area of the second portion contacts the second contact surface of the first adhesive layer.

Embodiment 16. The foldable apparatus of any one of embodiments 11-15, wherein the first adhesive layer comprises an elastic modulus is in a range from about 0.001 MegaPascals to about 0.5 MegaPascals.

Embodiment 17. The foldable apparatus of any one of embodiments 11-15, wherein the first adhesive layer comprises an elastic modulus is in a range from about 250 MegaPascals to about 4 GigaPascals.

Embodiment 18. The foldable apparatus of embodiment 17, wherein the first adhesive layer comprises an acrylate-based polymer, an epoxy-based material, and/or a polyurethane-based material.

Embodiment 19. The foldable apparatus of any one of embodiments 11-18, wherein a magnitude of a difference between an index of refraction of the first adhesive layer and the index of refraction of the polymer-based portion is about 0.1 or less.

Embodiment 20. The foldable apparatus of any one of embodiments 1-4 and embodiments 7-8 inclusive, further comprising a second adhesive layer comprising a fifth contact surface and a sixth contact surface opposite the fifth contact surface. The fifth contact surface faces the second surface area of the first portion and the fourth surface area of the second portion.

Embodiment 21. The foldable apparatus of embodiment 20, wherein a thickness of the second adhesive layer defined between the fifth contact surface and the sixth contact surface is in a range from about 1 micrometer to about 30 micrometers.

Embodiment 22. The foldable apparatus of embodiment 21, wherein the thickness of the second adhesive layer is in a range from about 1 micrometer to about 5 micrometers.

Embodiment 23. The foldable apparatus of any one of embodiments 20-22, wherein the fourth contact surface of the polymer-based portion contacts the fifth contact surface of the second adhesive layer.

Embodiment 24. The foldable apparatus of any one of embodiments 20-23, wherein the second surface area of the first portion contacts the fifth contact surface of the second adhesive layer. The fourth surface area of the second portion contacts the fifth contact surface of the second adhesive layer.

Embodiment 25. The foldable apparatus of any one of embodiments 20-24, wherein the second adhesive layer comprises an elastic modulus in a range from about 0.001 MegaPascals to about 0.5 MegaPascals.

Embodiment 26. The foldable apparatus of any one of embodiments 20-24, wherein the second adhesive layer comprises an elastic modulus in a range from about 250 MegaPascals to about 4 GigaPascals.

Embodiment 27. The foldable apparatus of any one of embodiments 20-24, wherein the second adhesive layer comprises an elastic modulus of about 1 GigaPascal or more.

Embodiment 28. The foldable apparatus of any one of embodiments 26-27, wherein the second adhesive layer comprises an acrylate-based polymer, an epoxy-based material, and/or a polyurethane-based material.

Embodiment 29. The foldable apparatus of any one of embodiments 20-28, wherein a magnitude of a difference between an index of refraction of the second adhesive layer and an index of refraction of the polymer-based portion is about 0.1 or less.

Embodiment 30. The foldable apparatus of any one of embodiments 1-29, further comprising a first substrate comprising a first substrate thickness defined between a first major surface and a second major surface opposite the second major surface. The second major surface of the first substrate faces the first surface area of the first portion and the third surface area of the second portion.

Embodiment 31. A foldable apparatus comprises a first substrate comprising a first substrate thickness defined between a first major surface and a second major surface opposite the second major surface. The foldable apparatus comprises a first adhesive layer comprising a first contact surface facing the first major surface of the first substrate and a second contact surface opposite the first contact surface. The foldable apparatus comprises a first portion comprising a first surface area facing the second contact surface of the first adhesive layer. A first edge surface is defined between the first surface area and a second surface area opposite the first surface area. A first thickness is defined between the first surface area and the second surface area. The foldable apparatus comprises a second portion comprising a third surface area facing the second contact surface of the first adhesive layer. A second edge surface is defined between the third surface area and a fourth surface area opposite the third surface area. A second thickness is defined between the third surface area and the fourth surface area. The foldable apparatus comprises a polymer-based portion comprising a third contact surface facing the first major surface of the first substrate and a fourth contact surface opposite the third contact surface. The polymer-based portion comprises an index of refraction. The polymer-based portion is positioned between the first edge surface of the first portion and the second edge surface of the second portion.

Embodiment 32. The foldable apparatus of embodiment 31, wherein the third contact surface of the polymer-based portion contacts the second contact surface of the first adhesive layer.

Embodiment 33. The foldable apparatus of any one of embodiments 31-32, wherein the first surface area of the first portion contacts the second contact surface of the first adhesive layer. The third surface area of the second portion contacts the second contact surface of the first adhesive layer.

Embodiment 34. The foldable apparatus of any one of embodiments 31-33, wherein a magnitude of a difference between an index of refraction of the first substrate and the index of refraction of the polymer-based portion is about 0.1 or less.

Embodiment 35. The foldable apparatus of any one of embodiments 30-34, wherein the first substrate thickness is in a range from about 10 micrometers to about 60 micrometers.

Embodiment 36. The foldable apparatus of any one of embodiments 30-35, wherein the first substrate comprises a ceramic-based substrate.

Embodiment 37. The foldable apparatus of any one of embodiments 30-35, wherein the first substrate comprises a glass-based substrate.

Embodiment 38. The foldable apparatus of any one of embodiments 30-37, further comprising a fifth compressive stress region at the first major surface of the first substrate and a sixth compressive stress region at the second major surface of the first substrate.

Embodiment 39. The foldable apparatus of embodiment 38, wherein the fifth compressive stress region comprises a fifth maximum compressive stress in a range from about 100 MegaPascals to about 1,500 MegaPascals. The sixth compressive stress region comprises a sixth maximum compressive stress in a range from about 100 MegaPascals to about 1,500 MegaPascals.

Embodiment 40. The foldable apparatus of any one of embodiments 1-39, further comprising a second substrate disposed over the second surface area of the first portion and the fourth surface area of the second portion.

Embodiment 41. The foldable apparatus of embodiment 40, wherein the second substrate comprises a glass-based substrate.

Embodiment 42. The foldable apparatus of embodiment 40, wherein the second substrate comprises a ceramic-based substrate.

Embodiment 43. The foldable apparatus of any one of embodiments 40-42, wherein the second substrate comprises a second substrate thickness in a range from about 10 micrometers to about 60 micrometers.

Embodiment 44. The foldable apparatus of any one of embodiments 30-43, further comprising a coating disposed over the second major surface of the first substrate. The coating comprises a coating thickness in a range from about 0.1 micrometers to about 200 micrometers.

Embodiment 45. The foldable apparatus of any one of embodiments 1-43, further comprising a coating disposed over the first portion, the second portion, and the polymer-based portion. The coating comprises a coating thickness in a range from about 0.1 micrometers to about 200 micrometers.

Embodiment 46. A foldable apparatus comprises a first portion comprising a first surface area and a second surface area opposite the first surface area. A first edge surface is defined between the first surface area and the second surface area. A first thickness is defined between the first surface area and the second surface area. The foldable apparatus comprises a second portion comprising a third surface area and a fourth surface area opposite the third surface area. A second edge surface is defined between the third surface area and the fourth surface area. A second thickness is defined between the third surface area and the fourth surface area. The foldable apparatus comprises a polymer-based portion positioned between the first edge surface and the second edge surface. The polymer-based portion comprises an index of refraction. The foldable apparatus comprises a coating disposed over the first portion, the second portion, and the polymer-based portion. The coating comprises a coating thickness in a range from about 0.1 micrometers to about 30 micrometers.

Embodiment 47. The foldable apparatus of any one of embodiments 44-46, wherein the coating thickness is in a range from about 5 micrometers to about 30 micrometers.

Embodiment 48. The foldable apparatus of any one of embodiments 44-47, wherein the coating comprises one or more of an ethylene-acid copolymer, a polyurethane-based polymer, an acrylate resin, or a mercapto-ester resin.

Embodiment 49. The foldable apparatus of any one of embodiments 1-48, further comprising an inorganic layer disposed over the third contact surface of the polymer-based portion.

Embodiment 50. The foldable apparatus of embodiment 49, wherein the inorganic layer comprises sapphire.

Embodiment 51. The foldable apparatus of any one of embodiments 49-50, wherein the inorganic layer comprises a thickness in a range from about 1 micrometer to about 70 micrometers.

Embodiment 52. The foldable apparatus of any one of embodiments 49-51, wherein a length of the inorganic layer in a direction of the length of the foldable apparatus is in a range from about 100% to about 200% of a minimum distance between the first edge surface of the first portion and the second edge surface of the second portion.

Embodiment 53. The foldable apparatus of any one of embodiments 1-51, wherein the foldable apparatus achieves an effective bend radius of about 20 millimeters.

Embodiment 54. The foldable apparatus of any one of embodiments 1-51, wherein the foldable apparatus achieves an effective bend radius of about 10 millimeters.

Embodiment 55. The foldable apparatus of any one of embodiments 1-51, wherein the foldable apparatus achieves an effective bend radius of about 6 millimeters.

Embodiment 56. The foldable apparatus of any one of embodiments 53-55, wherein a minimum distance between the first edge surface of the first portion and the second edge surface of the second portion is in a range from about twice an effective minimum bend radius to about 60 millimeters.

Embodiment 57. The foldable apparatus of any one of embodiments 53-55, wherein a minimum distance between the first edge surface of the first portion and the second edge surface of the second portion is in a range from about twice an effective minimum bend radius to about 30 millimeters.

Embodiment 58. The foldable apparatus of any one of embodiments 1-55, wherein a minimum distance between the first edge surface of the first portion and the second edge surface of the second portion is in a range from about 1 millimeter to about 100 millimeters.

Embodiment 59. The foldable apparatus of embodiment 58, wherein the minimum distance is in a range from about 10 millimeters to about 60 millimeters.

Embodiment 60. The foldable apparatus of embodiment 58, wherein the minimum distance is in a range from about 2 millimeters to about 30 millimeters.

Embodiment 61. The foldable apparatus of any one of embodiments 58-60, wherein the minimum distance is in a range from about 5 millimeters to about 20 millimeters.

Embodiment 62. The foldable apparatus of any one of embodiments 1-61, wherein the polymer-based portion comprise an elastomer.

Embodiment 63. The foldable apparatus of any one of embodiments 1-62, wherein the polymer-based portion comprises an elastic modulus in a range from about 0.01 MegaPascals to about 10 GigaPascals.

Embodiment 64. The foldable apparatus of embodiment 63, wherein the elastic modulus of the polymer-based portion is from about 0.01 MegaPascals to about 1,000 MegaPascals.

Embodiment 65. The foldable apparatus of embodiment 63, wherein the elastic modulus of the polymer-based portion is from about 20 MegaPascals to about 3 GigaPascals.

Embodiment 66. The foldable apparatus of any one of embodiments 63-65, wherein the polymer-based portion comprises a block copolymer comprising one or more of polystyrene, polydichlorophosphazene, and poly(5-ethylidene-2-norbornene).

Embodiment 67. The foldable apparatus of any one of embodiments 1-62, wherein the polymer-based portion comprises an elastic modulus of about 200 MegaPascals or more.

Embodiment 68. The foldable apparatus of embodiment 67, wherein the elastic modulus of the polymer-based portion is in a range from about 1 GigaPascal to about 5 GigaPascals.

Embodiment 69. The foldable apparatus of any one of embodiments 62-68, wherein the elastic modulus of the polymer-based portion is less than an elastic modulus of the first portion, and the elastic modulus of the polymer-based portion is less than an elastic modulus of the second portion.

Embodiment 70. The foldable apparatus of any one of embodiments 63-69, wherein the polymer-based portion exhibits linear elasticity over at least a strain from 0% to about 10%.

Embodiment 71. The foldable apparatus of any one of embodiments 63-69, wherein the polymer-based portion exhibits linear elasticity over at least a strain from 0% to about 20%.

Embodiment 72. The foldable apparatus of any one of embodiments 1-71, wherein a magnitude of a difference between an index of refraction of the first portion and the index of refraction of the polymer-based portion is about 0.1 or less.

Embodiment 73. The foldable apparatus of any one of embodiments 1-72, wherein the first edge surface comprises a first blunted edge surface. The second edge surface comprises a second blunted edge surface.

Embodiment 74. The foldable apparatus of embodiment 73, wherein the first blunted edge surface of the first edge surface comprises a curved edge surface. The second blunted edge surface of the second edge surface comprises a curved edge surface.

Embodiment 75. The foldable apparatus of embodiment 74, wherein the curved edge surface of the first blunted edge surface comprises an elliptical edge surface. The elliptical edge surface is defined by a major axis in a direction of the first thickness and a minor axis in a direction perpendicular to the major axis. A length of the major axis is greater than a length of the minor axis.

Embodiment 76. The foldable apparatus of embodiment 75, wherein a ratio of the length of the major axis to the length of the minor axis is in a range from greater than 1 to about 4.

Embodiment 77. The foldable apparatus of embodiment 75, wherein the curved edge surface of the first blunted edge surface of the first edge surface further comprises a radius of curvature in a range from about 10 micrometers to about 100 micrometers.

Embodiment 78. The foldable apparatus of embodiment 75, wherein the curved edge surface of the first blunted edge surface of the first edge surface further comprises a radius of curvature in a range from about 30% to about 70% of the first thickness.

Embodiment 79. The foldable apparatus of any one of embodiments 77-78, wherein the curved edge surface of the first blunted edge surface further comprises a second radius of curvature less than the first radius of curvature.

Embodiment 80. The foldable apparatus of any one of embodiments 74-79, wherein the curved edge surface of the first edge surface comprises the entire first edge surface.

Embodiment 81. The foldable apparatus of any one of embodiments 1-80, wherein the polymer-based portion comprises a width in a direction of a fold axis of the foldable apparatus. The width of the polymer-based portion is substantially equal to a width of the foldable apparatus in the direction of the fold axis.

Embodiment 82. The foldable apparatus of any one of embodiments 1-81, wherein the first portion comprises a first polymer-based portion. The second portion comprises a second polymer-based portion.

Embodiment 83. The foldable apparatus of any one of embodiments 1-81, wherein the first portion comprises a first ceramic-based portion. The second portion comprises a second ceramic-based portion.

Embodiment 84. The foldable apparatus of any one of embodiments 1-81, wherein the first portion comprises a first glass-based portion. The second portion comprises a second glass-based portion.

Embodiment 85. The foldable apparatus of any one of embodiments 1-84, wherein an elastic modulus of the first portion is about 5 GigaPascals or more. An elastic modulus of the second portion is about 5 GigaPascals or more.

Embodiment 86. The foldable apparatus of any one of embodiments 1-85, wherein the first thickness is in a range from about 10 micrometers to about 200 micrometers.

Embodiment 87. The foldable apparatus of embodiment 86, wherein the first thickness is in a range from about 25 micrometers to about 60 micrometers.

Embodiment 88. The foldable apparatus of any one of embodiments 86-87, wherein the second thickness is substantially equal to the first thickness.

Embodiment 89. The foldable apparatus of any one of embodiments 1-88, wherein the first portion comprises a first compressive stress region at the first surface area. The first portion comprises a second compressive stress region at the second surface area. The second portion comprises a third compressive stress region at the third surface area. The second portion comprises a fourth compressive stress region at the fourth surface area.

Embodiment 90. The foldable apparatus of embodiment 89, wherein the first compressive stress region comprises a first maximum compressive stress in a range from about 100 MegaPascals to about 1,500 MegaPascals. The second compressive stress region comprises a second maximum compressive stress in a range from about 100 MegaPascals to about 1,500 MegaPascals. The third compressive stress region comprises a third maximum compressive stress in a range from about 100 MegaPascals to about 1,500 MegaPascals. The fourth compressive stress region comprises a fourth maximum compressive stress in a range from about 100 MegaPascals to about 1,500 MegaPascals.

Embodiment 91. The foldable apparatus of any one of embodiments 1-90, wherein the foldable apparatus resists failure for a pen drop height of 15 centimeters over a location of the first portion.

Embodiment 92. The foldable apparatus of any one of embodiments 1-90, wherein the foldable apparatus resists failure for a pen drop height of 20 centimeters over a location of the first portion.

Embodiment 93. The foldable apparatus of any one of embodiments 1-90, wherein the foldable apparatus resists failure for a pen drop height of 5 centimeters over a location of the polymer-based portion between the first portion and the second portion.

Embodiment 94. The foldable apparatus of any one of embodiments 1-93, wherein a force per width to bend the foldable apparatus from a flat configuration to a parallel plate distance of about 10 millimeters is about 0.010 Newtons/meter or less. A width of the foldable apparatus extending in the direction of the fold axis.

Embodiment 95. The foldable apparatus of any one of embodiments 1-93, wherein a force per width to bend the foldable apparatus from a flat configuration to a parallel plate distance of about 3 millimeters is about 0.003 Newtons/meter or less. A width of the foldable apparatus extending in the direction of the fold axis.

Embodiment 96. A consumer electronic product comprises a housing comprising a front surface, a back surface, and side surfaces. The consumer electronic product comprises electrical components at least partially within the housing. The electrical components comprising a controller, a memory, and a display. The display is at or adjacent to the front surface of the housing. The consumer electronic product comprises a cover substrate disposed over the display. At least one of a portion of the housing or the cover substrate comprises the foldable apparatus of any one of embodiments 1-95.

Embodiment 97. A method of making a foldable apparatus comprises spacing a first portion apart from a second portion. A first thickness of the first portion is defined between a first surface area and a second surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion to form a polymer-based portion comprising an index of refraction. The method comprises disposing a first adhesive layer over the first portion, the polymer-based portion, and the second portion. The first adhesive layer comprises a first contact surface and a second contact surface opposite the first contact surface. The method comprises disposing a first substrate over the first adhesive layer.

Embodiment 98. A method of making a foldable apparatus comprises spacing a first portion apart from a second portion. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion to form a polymer-based portion comprising an index of refraction. The polymer-based portion covers at least a portion of the second surface area of the first portion and the fourth surface area of the second portion. The polymer-based portion comprises a polymer thickness of about 50 micrometers or less measured from the second surface area of the first portion in a direction of the first thickness of the first portion.

Embodiment 99. A method of making a foldable apparatus comprises spacing a first portion apart from a second portion. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion to form a polymer-based portion comprising an index of refraction. The polymer-based portion covers at least a portion of the first surface area of the first portion and the third surface area of the second portion. The polymer-based portion comprises a polymer thickness of about 50 micrometers or less measured from the first surface area of the first portion in a direction of a first thickness of the first portion.

Embodiment 100. The method of any one of embodiments 98-99, wherein the polymer thickness is in a range from about 10 micrometers to about 30 micrometers.

Embodiment 101. The method of any one of embodiments 98-100, wherein the polymer thickness is in a range from about 1 micrometer to about 5 micrometers.

Embodiment 102. The method of any one of embodiments 97-101, further comprising disposing a coating over the first portion, the second portion, and the polymer-based portion. The coating comprises a coating thickness in a range from about 0.1 micrometers to about 30 micrometers.

Embodiment 103. A method of making a foldable apparatus comprises spacing a first portion apart from a second portion. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion to form a polymer-based portion comprising an index of refraction. The method comprises disposing a coating over the first portion, the second portion, and the polymer-based portion. The coating comprises a coating thickness in a range from about 0.1 micrometers to about 30 micrometers.

Embodiment 104. The method of any one of embodiments 97-103, wherein filling the region comprises filling the region with a liquid and curing the liquid to form a polymer-based portion. The polymer-based portion expands as a result of curing.

Embodiment 105. A method of making a foldable apparatus comprises spacing a first portion apart from a second portion. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion with a liquid. The method comprises curing the liquid to form a polymer-based portion comprising an index of refraction. The polymer-based portion expands as a result of curing.

Embodiment 106. The method of any one of embodiments 104-105, wherein the polymer-based portion comprises a negative coefficient of thermal expansion.

Embodiment 107. The method of embodiment 106, wherein the polymer-based portion comprises particles of one or more of copper oxide, beta-quartz, a tungstate, a vanadate, a pyrophosphate, or a nickel-titanium alloy.

Embodiment 108. The method of any one of embodiments 104-105, wherein curing the polymer-based portion comprises a ring-opening metathesis polymerization.

Embodiment 109. The method of any one of embodiments 97-103, wherein filling the region comprises filling the region with a liquid and curing the liquid to form a polymer-based portion. The foldable apparatus is in a bent configuration during the curing. A movement of the foldable apparatus from a flat configuration to a neutral stress configuration corresponds to a maximum magnitude of a deviatoric strain of the polymer-based portion in a range from about 1% to about 8%.

Embodiment 110. A method of making a foldable apparatus comprises spacing a first portion apart from a second portion. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area. The method comprises filling a region defined between the first portion and the second portion with a liquid. The method comprises curing the liquid to form a polymer-based portion comprising an index of refraction. The foldable apparatus is in a bent configuration during the curing. A movement of the foldable apparatus from a flat configuration to a neutral stress configuration corresponds to a maximum magnitude of a deviatoric strain of the polymer-based portion in a range from about 1% to about 8%.

Embodiment 111. The method of embodiment 104 or embodiment 110, wherein spacing the first portion apart from the second portion comprises disposing a first adhesive layer over a first substrate. The first adhesive layer comprises a first contact surface and a second contact surface opposite the first contact surface. The spacing comprises disposing the first portion over the first adhesive layer. The spacing comprises disposing the second portion over the first adhesive layer.

Embodiment 112. The method of embodiment 104 or embodiment 110, further comprising disposing the first adhesive layer over the first portion, the polymer-based portion, and the second portion. The method further comprises disposing the first substrate over the first adhesive layer.

Embodiment 113. A method of making a foldable apparatus comprises disposing a first adhesive layer over a first substrate. The first adhesive layer comprises a first contact surface and a second contact surface opposite the first contact surface. The method comprises disposing a first portion over the first adhesive layer. The method comprises disposing a second portion over the first adhesive layer. The method comprises disposing a polymer-based portion over the first adhesive layer between the first portion and the second portion. The polymer-based portion comprises an index of refraction. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area.

Embodiment 114. The method of embodiment 113, further comprising bending the first substrate into a bent configuration while the first substrate comprises a viscosity in a range from about $10^4$ Pascal-seconds and about $10^7$ Pascal-seconds before disposing the first adhesive layer over the first substrate.

Embodiment 115. A method of making a foldable apparatus comprises bending a first substrate into a bent configuration while the first substrate comprises a viscosity in a range from about $10^4$ Pascal-seconds and about $10^7$ Pascal-seconds. The method comprises disposing a first adhesive layer, a first portion, a second portion, and a polymer-based portion over the first substrate. The polymer-based portion is positioned between the first portion and the second portion. The polymer-based portion comprises an index of refraction. The first adhesive layer comprises a first contact surface and a second contact surface opposite the first contact surface. The first portion comprises a first surface area and a second surface area opposite the first surface area. A first edge surface of the first portion is defined between the first surface area and the second surface area. The second portion comprises a third surface area and a fourth surface area opposite the third surface area. A second edge surface of the second portion is defined between the third surface area and the fourth surface area.

Embodiment 116. The method of embodiment 115, wherein the disposing comprises disposing the first adhesive layer over the first substrate. The disposing comprises disposing the first portion over the first adhesive layer. The disposing comprises disposing the second portion over the first adhesive layer. The disposing comprises disposing the polymer-based portion between the first portion and the second portion.

Embodiment 117. The method of embodiment 115, wherein the disposing comprises attaching the first portion to the polymer-based portion. The disposing comprises attaching the second portion to the polymer-based portion. The disposing comprises disposing the first portion, polymer-based portion, and second portion over the first adhesive layer.

Embodiment 118. The method of any one of embodiments 114-117, wherein a movement of the foldable apparatus from a flat configuration to a neutral stress configuration corresponds to a maximum magnitude of a deviatoric strain of the polymer-based portion in a range from about 1% to about 8%.

Embodiment 119. The method of embodiment 118, wherein the maximum magnitude of the deviatoric strain is in a range from about 2% to about 6%.

Embodiment 120. A method of making a foldable apparatus comprises attaching a first portion to a polymer-based portion comprising an index of refraction. The first portion comprises a first surface area and a second surface area opposite the first surface area. A first edge surface of the first portion is defined between the first surface area and the second surface area. The method comprises attaching a second portion to the polymer-based portion. The second portion comprises a third surface area and a fourth surface area opposite the third surface area. A second edge surface of the second portion is defined between the third surface area and the fourth surface area. The method comprises disposing a first adhesive layer over the first portion, the polymer-based portion, and the second portion. The method comprises disposing the first substrate over the first adhesive layer. The first adhesive layer comprises a first contact surface and a second contact surface opposite the first contact surface.

Embodiment 121. A method of making a foldable apparatus comprises attaching a first portion to a polymer-based portion comprising an index of refraction. The first portion comprises a first surface area and a second surface area opposite the first surface area. A first edge surface of the first portion is defined between the first surface area and the second surface area. The method comprises attaching a second portion to the polymer-based portion. The second portion comprises a third surface area and a fourth surface area opposite the third surface area. A second edge surface of the second portion is defined between the third surface area and the fourth surface area. The polymer-based portion covers at least a portion of the second surface area of the first portion and the fourth surface area of the second portion. The polymer-based portion comprises a polymer thickness of about 50 micrometers or less measured from the second surface area of the first portion in a direction of a first thickness of the first portion.

Embodiment 122. A method of making a foldable apparatus comprises attaching a first portion to a polymer-based portion comprising an index of refraction. The first portion comprises a first surface area and a second surface area opposite the first surface area. A first edge surface of the first portion is defined between the first surface area and the second surface area. The method comprises attaching a second portion to the polymer-based portion. The second portion comprises a third surface area and a fourth surface area opposite the third surface area. A second edge surface of the second portion is defined between the third surface area and the fourth surface area. The polymer-based portion covers at least a portion of the second surface area of the first portion and the fourth surface area of the second portion. The polymer-based portion comprises a polymer thickness of about 50 micrometers or less measured from the first surface area of the first portion in a direction of a first thickness of the first portion.

Embodiment 123. The method of any one of embodiments 121-122, wherein the polymer thickness is in a range from about 10 micrometers to about 30 micrometers.

Embodiment 124. The method of any one of embodiments 121-122, wherein the polymer thickness is in a range from about 1 micrometer to about 5 micrometers.

Embodiment 125. The method of any one of embodiments 121-124, further comprising disposing a coating over the first portion, the second portion, and the polymer-based portion, wherein the coating comprises a coating thickness in a range from about 0.1 micrometers to about 200 micrometers.

Embodiment 126. A method of making a foldable apparatus comprises attaching a first portion to a polymer-based portion comprising an index of refraction. The first portion comprises a first surface area and a second surface area opposite the first surface area. A first edge surface of the first portion is defined between the first surface area and the second surface area. The method comprises attaching a second portion to the polymer-based portion. The second portion comprises a third surface area and a fourth surface area opposite the third surface area. A second edge surface of the second portion is defined between the third surface area and the fourth surface area. The method comprises disposing a coating over the first portion, the second portion, and the polymer-based portion. The coating comprises a coating thickness in a range from about 0.1 micrometers to about 30 micrometers.

Embodiment 127. The method of any one of embodiments 125-126, wherein the coating thickness is in a range from about 5 micrometers to about 30 micrometers.

Embodiment 128. The method of any one of embodiments 125-127, wherein the coating comprises one or more of an ethylene-acid copolymer, a polyurethane-based polymer, an acrylate resin, or a mercapto-ester resin.

Embodiment 129. The method of any one of embodiments 125-128, wherein disposing the coating comprises attaching the coating to the first portion, the second portion, and the polymer-based portion using a first adhesive layer. The first adhesive layer comprises a first contact surface and a second contact surface opposite the first contact surface.

Embodiment 130. The method of any one of embodiments 125-128, wherein the foldable apparatus further comprises a first adhesive layer comprising a first contact surface and a second contact surface opposite the first contact surface. The second contact surface faces the first surface area. The second contact surface faces the third surface area.

Embodiment 131. The method of any one of embodiment 97 and embodiments 111-130 inclusive, wherein a first adhesive thickness of the first adhesive layer defined between the first contact surface and the second contact surface is in a range from about 1 micrometer to about 30 micrometers.

Embodiment 132. The method of embodiment 131, wherein the first adhesive thickness of the first adhesive layer is in a range from about 1 micrometer to about 5 micrometers.

Embodiment 133. The method of any one of embodiments 129-132, wherein an elastic modulus of the first adhesive layer is about 1 GigaPascal or more.

Embodiment 134. The method of any one of embodiments 129-132, wherein the first adhesive layer comprises an elastic modulus is in a range from about 0.001 MegaPascals to about 0.5 MegaPascals.

Embodiment 135. The method of any one of embodiments 129-132, wherein the first adhesive layer comprises an elastic modulus is in a range from about 250 MegaPascals to about 4 GigaPascals.

Embodiment 136. The method of embodiment 135, wherein the first adhesive layer comprises an acrylate-based polymer, an epoxy-based material, and/or a polyurethane-based material.

Embodiment 137. The method of any one of embodiments 111-136, wherein a magnitude of a difference between an index of refraction of the first portion and an index of refraction of the first adhesive layer is about 0.1 or less.

Embodiment 138. The method of any one of embodiments 97-136, wherein a magnitude of a difference between an index of refraction of the first portion and the index of refraction of the polymer-based portion is about 0.1 or less.

Embodiment 139. The method of any one of embodiments 97-138, wherein the polymer-based portion comprises an elastomer.

Embodiment 140. The method of any one of embodiments 97-139, wherein the polymer-based portion comprises a block copolymer comprising one or more of polystyrene, polydichlorophosphazene, or poly(5-ethylidene-2-norbornene).

Embodiment 141. The method of any one of embodiments 97-140, wherein the polymer-based portion comprises an elastic modulus in a range from about 0.01 MegaPascals to about 10 GigaPascals.

Embodiment 142. The method of embodiment 141, wherein the elastic modulus of the polymer-based portion is from about 0.01 MegaPascals to about 1,000 MegaPascals.

Embodiment 143. The method of embodiment 141, wherein the polymer-based portion comprises an elastic modulus in a range from about 20 MegaPascals to about 3 GigaPascals.

Embodiment 144. The method of any one of embodiments 141-143, wherein the polymer-based portion comprises an elastic modulus of about 200 MegaPascals or more.

Embodiment 145. The method of any one of embodiments 141-144, wherein the elastic modulus of the polymer-based portion is less than an elastic modulus of the first portion. The elastic modulus of the polymer-based portion is less than an elastic modulus of the second portion.

Embodiment 146. The method of embodiment 145, wherein the elastic modulus of the first portion is about 5 GigaPascals or more. The elastic modulus of the second portion is about 5 GigaPascals or more.

Embodiment 147. The method of any one of embodiments 97-146, wherein the polymer-based portion exhibits linear elasticity over at least a strain from 0% to about 10%.

Embodiment 148. The method of any one of embodiments 97-146, wherein the polymer-based portion exhibits linear elasticity over at least a strain from 0% to about 20%.

Embodiment 149. The method of any one of embodiments 97-148, further comprising an inorganic layer disposed over a third contact surface of the polymer-based portion.

Embodiment 150. The method of embodiment 149, wherein the inorganic layer comprises sapphire.

Embodiment 151. The method of any one of embodiments 149-150, wherein the inorganic layer comprises a thickness in a range from about 1 micrometer to about 70 micrometers.

Embodiment 152. The method of any one of embodiments 149-151, wherein a length of the inorganic layer in a direction of the length of the foldable apparatus is in a range from about 100% to about 200% of a minimum distance between the first edge surface of the first portion and the second edge surface of the second portion.

Embodiment 153. The method of any one of embodiments 97-151, wherein the foldable apparatus achieves an effective bend radius of about 20 millimeters.

Embodiment 154. The method of any one of embodiments 97-151, wherein the foldable apparatus achieves an effective bend radius of about 10 millimeters.

Embodiment 155. The method of any one of embodiments 97-151, wherein the foldable apparatus achieves an effective bend radius of about 6 millimeters.

Embodiment 156. The method of any one of embodiments 153-155, wherein a minimum distance between the first edge surface of the first portion and the second edge surface of the second portion is in a range from about twice an effective minimum bend radius to about 60 millimeters.

Embodiment 157. The method of any one of embodiments 153-155, wherein a minimum distance between the first edge surface of the first portion and the second edge surface of the second portion is in a range from about twice an effective minimum bend radius to about 30 millimeters.

Embodiment 158. The method of any one of embodiments 97-151 and Embodiments 153-155 inclusive, wherein a minimum distance between a first edge surface of the first portion and a second edge surface of the second portion is in a range from about 1 millimeter to about 100 millimeters.

Embodiment 159. The method of embodiment 158, wherein the minimum distance is in a range from about 2 millimeters to about 30 millimeters.

Embodiment 160. The method of any one of embodiments 158-159, wherein the minimum distance is in a range from about 5 millimeters to about 20 millimeters.

Embodiment 161. The method of any one of embodiments 97-160, wherein the polymer-based portion comprises a width in a direction of a fold axis the foldable apparatus. The width of the polymer-based portion is substantially equal to a width of the first substrate in the direction of the fold axis.

Embodiment 162. The method of any one of embodiments 97-161, wherein the first thickness is in a range from about 10 micrometers to about 200 micrometers.

Embodiment 163. The method of embodiment 162, wherein the first thickness is in a range from about 10 to about 60 micrometers.

Embodiment 164. The method of embodiment 163, wherein a second thickness defined between the fourth surface area of the second portion and the third surface area of the second portion is substantially equal to the first thickness.

Embodiment 165. The method of any one of embodiments 97-164, wherein the first edge surface comprises a first blunted edge surface and the second edge surface comprises a second blunted edge surface.

Embodiment 166. The method of embodiment 165, wherein the first blunted edge surface of the first edge surface comprises a curved edge surface. The second blunted edge surface of the second edge surface comprises a curved edge surface.

Embodiment 167. The method of embodiment 166, wherein the curved edge surface of the first blunted edge surface comprises an elliptical edge surface. The elliptical edge surface is defined by a major axis in a direction of the first thickness and a minor axis in a direction perpendicular to the major axis. A length of the major axis is greater than a length of the minor axis.

Embodiment 168. The method of embodiment 167, wherein a ratio of the length of the major axis to the length of the minor axis is in a range from greater than 1 to about 4.

Embodiment 169. The method of embodiment 167, wherein the curved edge surface of the first blunted edge surface of the first edge surface further comprises a radius of curvature in a range from about 10 micrometers to about 100 micrometers.

Embodiment 170. The method of embodiment 167, wherein the curved edge surface of the first blunted edge surface of the first edge surface further comprises a radius of curvature in a range from about 30% to about 70% of the first thickness.

Embodiment 171. The method of any one of embodiments 169-170, wherein the curved edge surface of the first blunted edge surface further comprises a second radius of curvature less than the first radius of curvature.

Embodiment 172. The method of any one of embodiments 166-171, wherein the curved edge surface of the first edge surface comprises the entire first edge surface.

Embodiment 173. The method of any one of embodiments 97-172, wherein the first portion comprises a glass-based material. The second portion comprises a glass-based material.

Embodiment 174. The method of any one of embodiments 97-172, wherein the first portion comprises a ceramic-based material. The second portion comprises a ceramic-based material.

Embodiment 175. The method of any one of embodiments 97-172, wherein the first portion comprises a polymer-based material. The second portion comprises a polymer-based material.

Embodiment 176. The method of any one of embodiments 97-175, further comprising a second adhesive layer comprising a fifth contact surface and a sixth contact surface opposite the fifth contact surface. The fifth contact surface faces the second surface area of the first portion and the fourth surface area of the second portion.

Embodiment 177. The method of embodiment 176, wherein a second adhesive thickness of the second adhesive layer defined between the fifth contact surface and the sixth contact surface is in a range from about 1 micrometer to about 30 micrometers.

Embodiment 178. The method of embodiment 177, wherein the second adhesive thickness of the second adhesive layer is in a range from about 1 micrometer to about 5 micrometers.

Embodiment 179. The method of any one of embodiments 176-178, wherein the fourth contact surface of the polymer-based portion contacts the fifth contact surface of the second adhesive layer.

Embodiment 180. The method of any one of embodiments 176-179, wherein the second surface area of the first portion contacts the fifth contact surface of the second adhesive layer. The fourth surface area of the second portion contacts the fifth contact surface of the second adhesive layer.

Embodiment 181. The method of any one of embodiments 176-180, wherein the second adhesive layer comprises an elastic modulus in a range from about 0.001 MegaPascals to about 0.5 MegaPascals.

Embodiment 182. The method of any one of embodiments 176-180, wherein the second adhesive layer comprises an elastic modulus in a range from about 250 MegaPascals to about 4 GigaPascals.

Embodiment 183. The method of any one of embodiments 176-180, wherein the second adhesive layer comprises an elastic modulus of about 1 GigaPascal or more.

Embodiment 184. The method of any one of embodiments 182-183, wherein the second adhesive layer comprises an acrylate-based polymer, an epoxy-based material, and/or a polyurethane-based material.

Embodiment 185. The method of any one of embodiments 176-184, wherein a magnitude of a difference between an index of refraction of the second adhesive layer and the index of refraction of the polymer-based portion is about 0.1 or less.

Embodiment 186. The method of any one of embodiments 97-185, further comprising a second substrate disposed over the second surface area of the first portion and the fourth surface area of the second portion.

Embodiment 187. The method of embodiment 186, wherein the second substrate comprises a glass-based material.

Embodiment 188. The method of embodiment 186, wherein the second substrate comprises a ceramic-based material.

Embodiment 189. The method of any one of embodiments 186-188, wherein the second substrate comprises a second substrate thickness in a range from about 25 micrometers to about 60 micrometers.

BRIEF DESCRIPTION OF THE DRAWINGS

The above and other features and advantages of embodiments of the present disclosure are better understood when the following detailed description is read with reference to the accompanying drawings, in which:

FIG. 9 is a schematic view of example foldable apparatus of embodiments of the disclosure, wherein a schematic view of the flat configuration may appear as shown in FIG. 1;

FIG. 10 is a cross-sectional view of a testing apparatus to determine the effective minimum bend radius of an example modified foldable apparatus along line 10-10 of FIG. 9;

Figure 1:
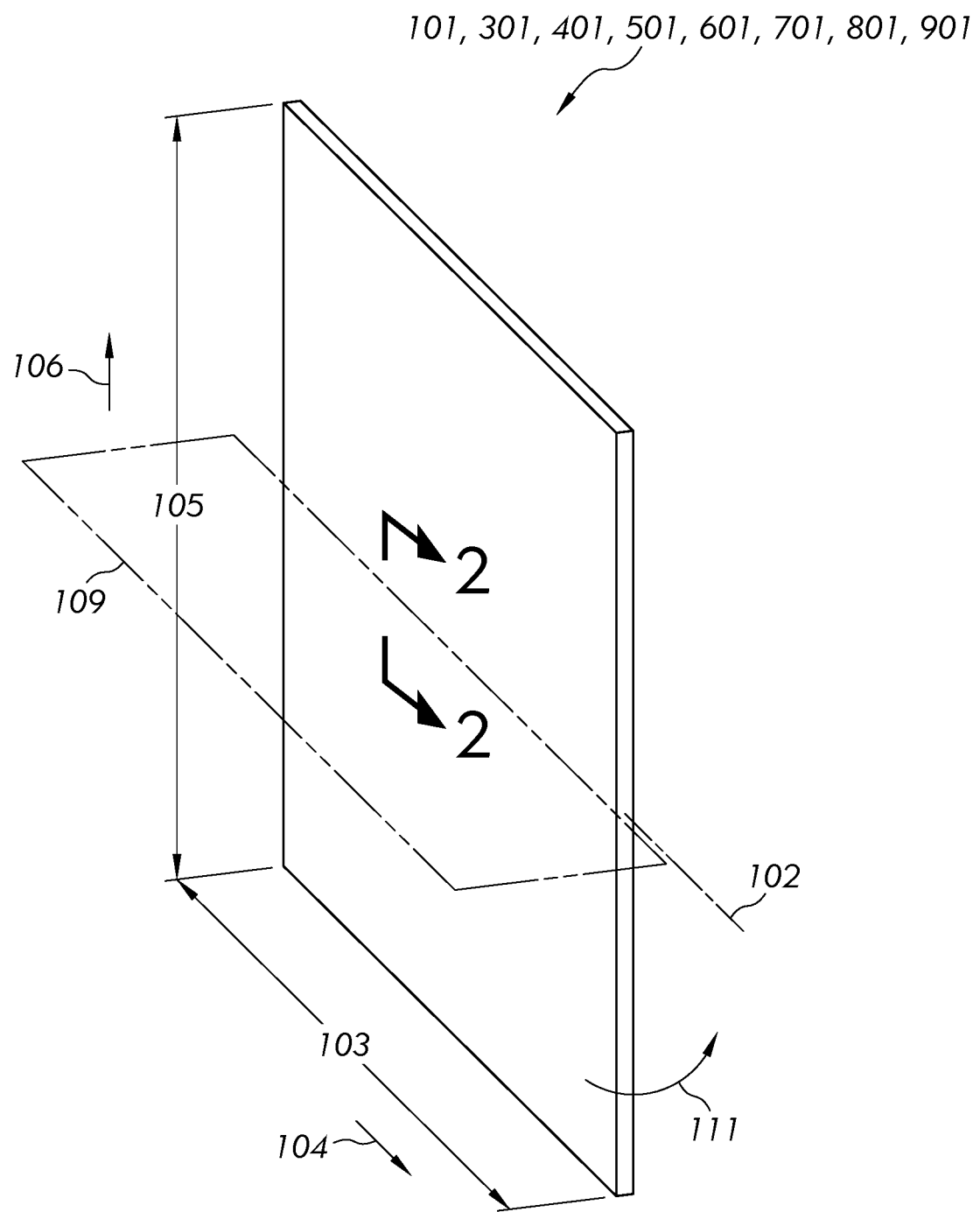
FIG. 1 is a schematic view of an example foldable apparatus in a flat configuration according to some embodiments, wherein a schematic view of the folded configuration may appear as shown in FIG. 9.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to the embodiments set forth herein.

FIGS. 1-10 illustrate views of foldable apparatus 101, 301, 401, 501, 601, 701, and 801 and/or foldable test apparatus 901 in accordance with embodiments of the disclosure. Unless otherwise noted, a discussion of features of embodiments of one foldable apparatus can apply equally to corresponding features of any of the embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

Figure 2:
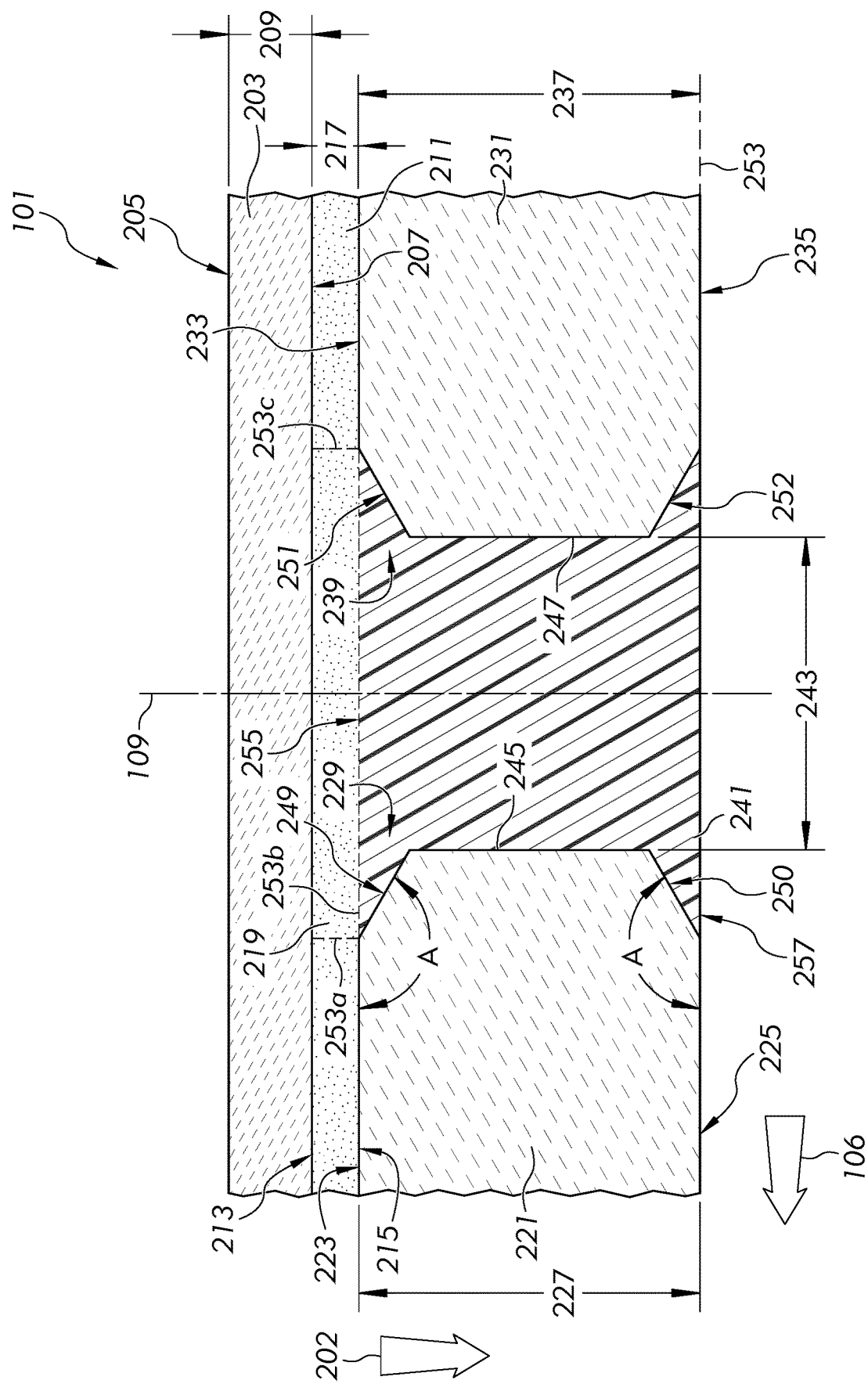
FIGS. 2-8 are cross-sectional views of the foldable apparatus along line 2-2 of FIG. 1 according to some embodiments.
Figure 3:
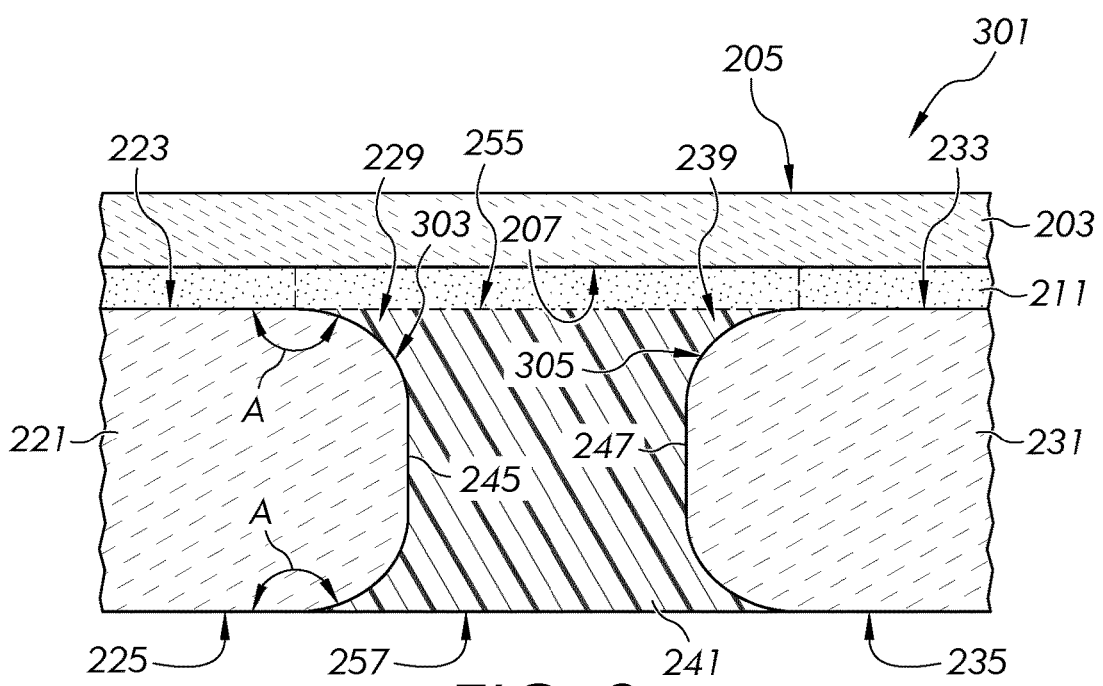
Figure 4:
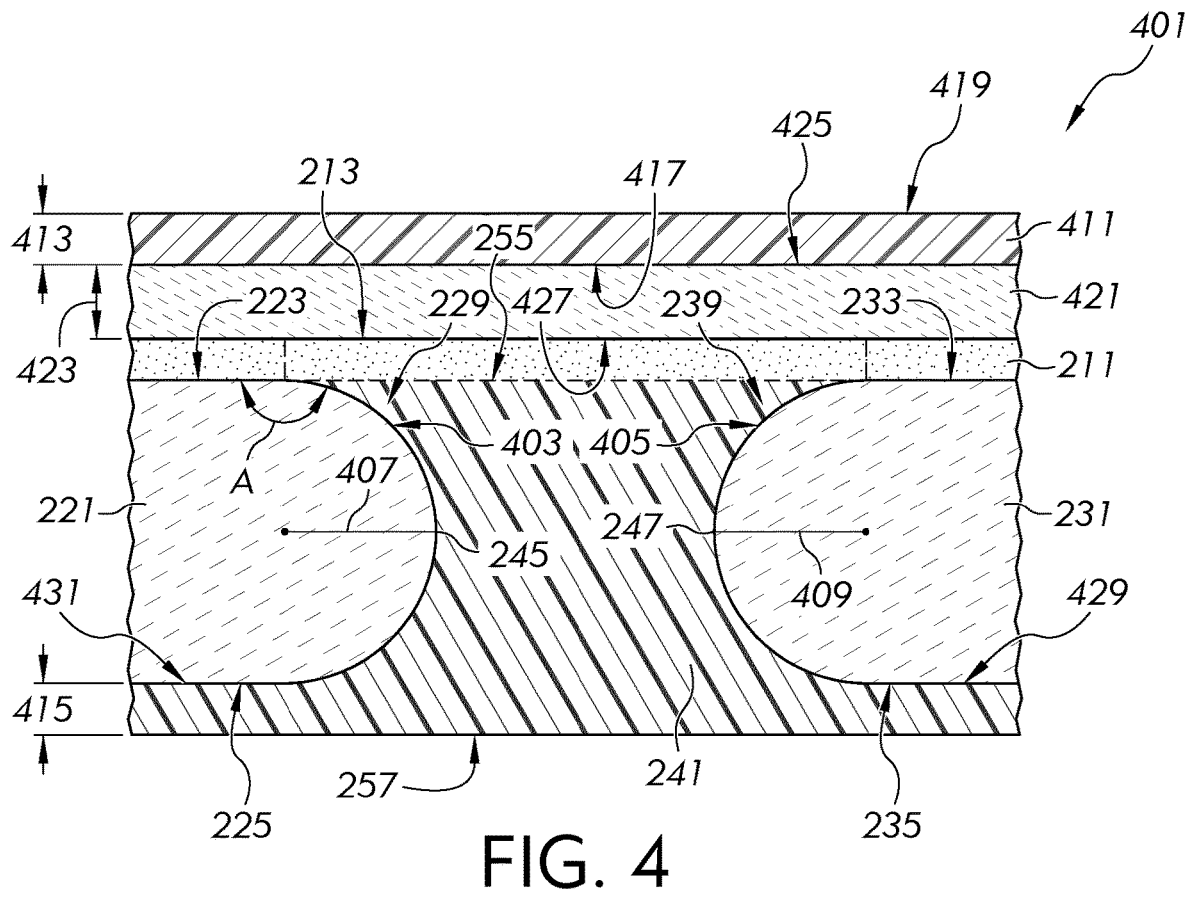
Figure 5:
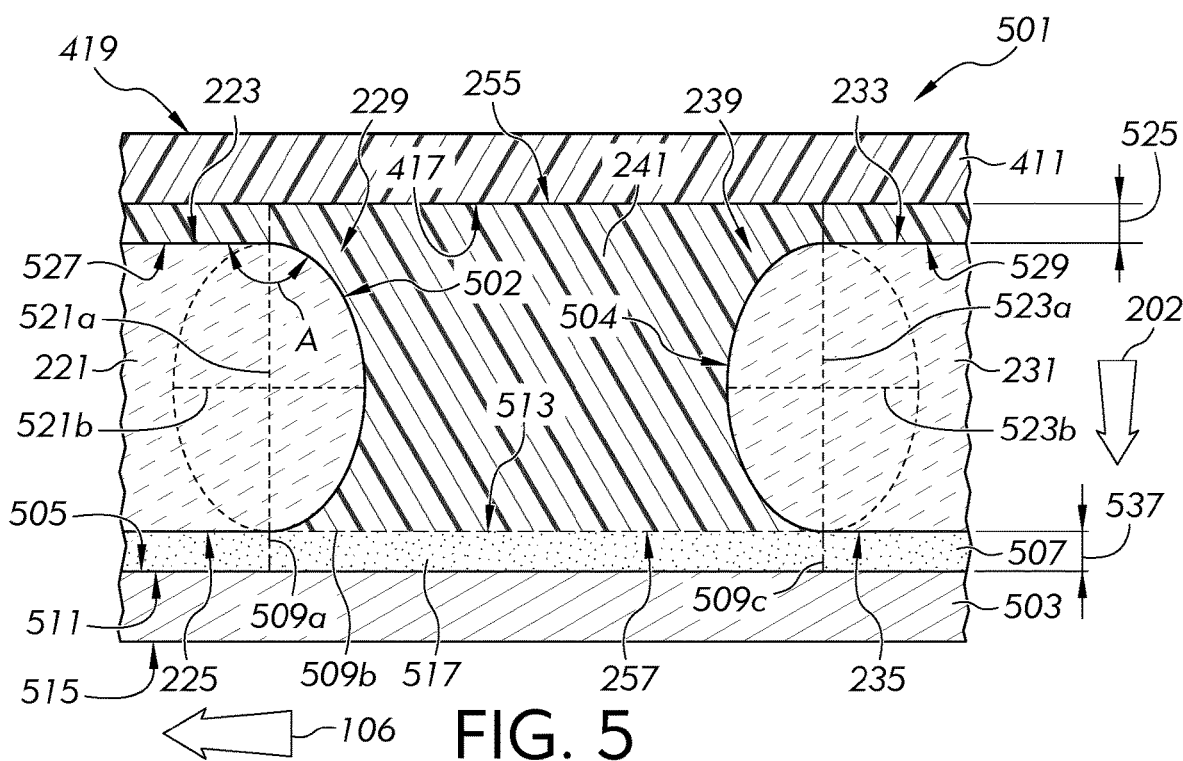
Figure 6:
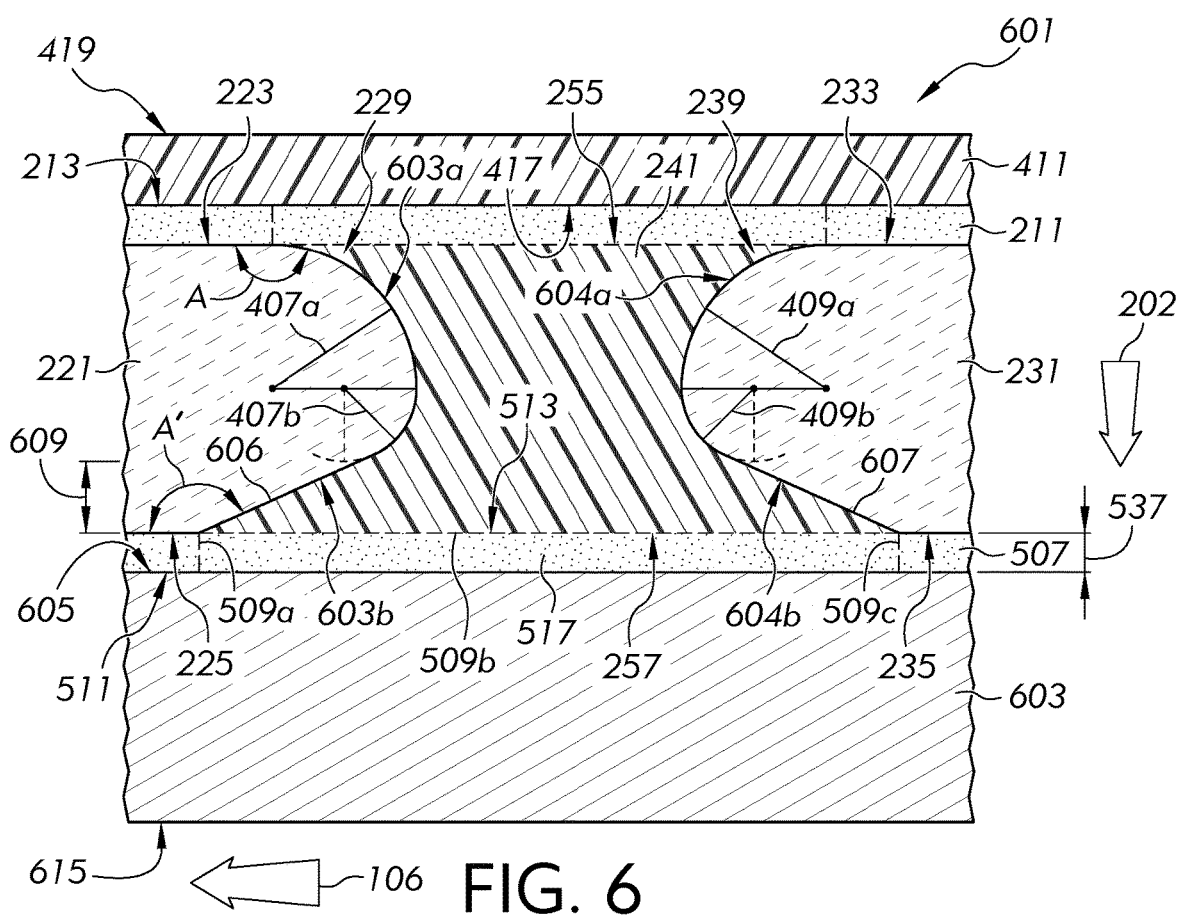
Figure 7:
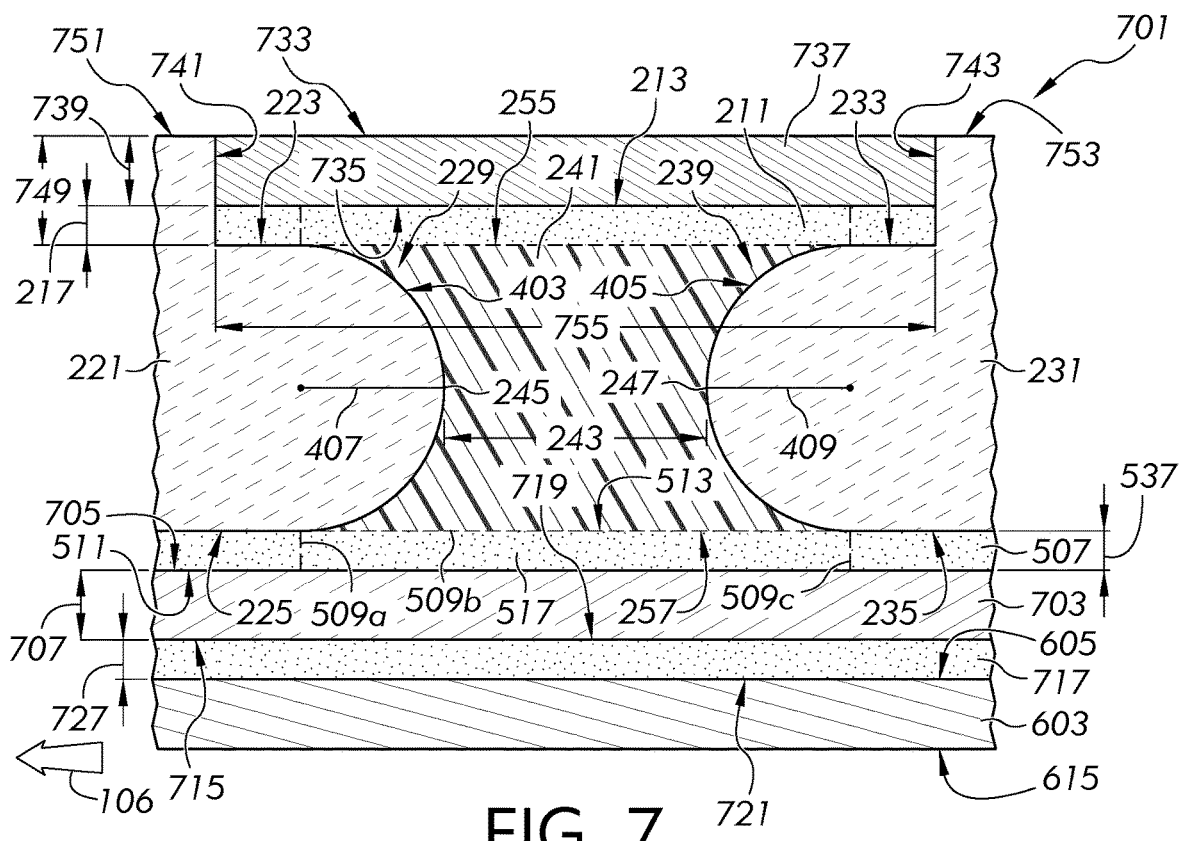
Figure 8:
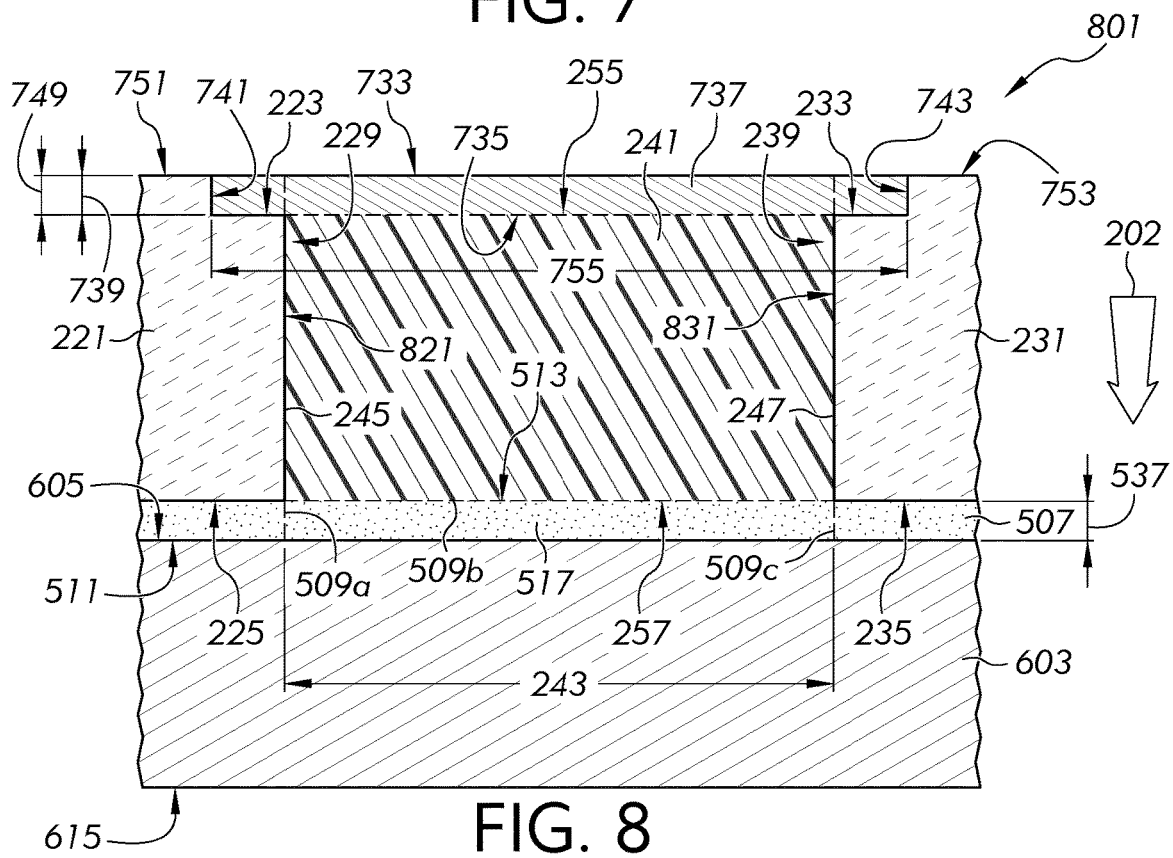

FIGS. 1-8 schematically illustrate example embodiments of foldable apparatus 101, 301, 401, 501, 601, 701, and 801 in accordance with embodiments of the disclosure in an unfolded (e.g., flat) configuration while FIGS. 9-10 demonstrate a foldable test apparatus 901 in accordance with embodiments of the disclosure in a folded configuration. As shown in FIGS. 2-8 and 10, the foldable apparatus 101, 301, 401, 501, 601, 701, and 801 and/or foldable test apparatus 901 can comprise a first portion 221, a second portion 231, and a polymer-based portion 241. In some embodiments, as shown in FIGS. 4-6, the foldable apparatus 401, 501, and 601 can comprise a coating 411. In some embodiments, as shown in FIGS. 2-3 and 10, the foldable apparatus 101 and 301 and/or foldable test apparatus 901 can comprise a first substrate 203. In some embodiments, as shown in FIG. 7, the foldable apparatus 701 can comprise an inorganic layer 737 disposed over the polymer-based portion 241. In some embodiments, as shown in FIG. 5, the foldable apparatus 501 can comprise a release liner 503 although other substrates (e.g., a substrate similar or identical to the first substrate 203 discussed throughout the application) may be used in further embodiments rather than the illustrated release liner 503. In some embodiments, as shown in FIGS. 6-8, the foldable apparatus 601, 701, and 801 can comprise a display device 603. In some embodiments, as shown in FIG. 7, the foldable apparatus 701 can comprise a second substrate 703. It is to be understood that the coating 411 can be present with or without a backing substrate 421 and that a first substrate 203 can have a coating 411 disposed over it. It is to be understood that any of the foldable apparatus of the disclosure can comprise a first substrate 203, a coating 411, and/or a backing substrate 421. It is to be understood that any of the foldable apparatus of the disclosure can comprise a second substrate (e.g., second substrate 703, similar or identical to the first substrate 203), a release liner 503, and/or a display device 603.

Throughout the disclosure, with reference to FIG. 1, the width 103 of the foldable apparatus 101, 301, 401, 501, 601, 701, and 801 and/or foldable test apparatus 901 is considered the dimension of the foldable apparatus taken between opposed edges of the foldable apparatus in a direction 104 of a fold axis 102 of the foldable apparatus, wherein the direction 104 also comprises the direction of the width 103. Furthermore, throughout the disclosure, the length 105 of the foldable apparatus is considered the dimension of the foldable apparatus taken between opposed edges of the foldable apparatus in a direction 106 perpendicular to the fold axis 102 of the foldable apparatus. In some embodiments, the foldable apparatus can be folded in a direction 111 (e.g., see FIG. 1) about the fold axis 102 extending in a direction 104 of the width 103 to form a folded configuration (e.g., see FIGS. 9-10). As shown, the foldable apparatus may include a single fold axis to allow the foldable apparatus to comprise a bifold wherein, for example, the foldable apparatus may be folded in half. In further embodiments, the foldable apparatus may include two or more fold axes with each fold axis including a corresponding polymer-based portion similar or identical to the polymer-based portion 241 discussed herein. For example, providing two fold axes can allow the foldable apparatus to comprise a trifold wherein, for example, the foldable apparatus may be folded with three portions comprising the first portion 221, the second portion 231, and a third portion similar or identical to the first portion or second portion.

As shown in FIGS. 2-8 and 10, the foldable apparatus 101, 301, 401, 501, 601, 701, and 801 and/or foldable test apparatus 901 can comprise the first portion 221. The first portion 221 will now be described with reference to the foldable apparatus 101 of FIG. 2 with the understanding that such description of the first portion 221, unless otherwise stated, can also apply to any embodiments of the disclosure, for example, the foldable apparatus 301, 401, 501, 601, 701, and 801 and/or foldable test apparatus 901 illustrated in FIGS. 3-8 and 10. As shown in FIG. 2, the first portion 221 can comprise a first surface area 223. As shown in FIGS. 2-8, the first portion 221 can comprise a second surface area 225 opposite the first surface area 223. In some embodiments, as shown, the second surface area 225 of the first portion 221 can comprise a planar surface. In further embodiments, as shown, the second surface area 225 can be parallel to the first surface area 223. A first thickness 227 can be defined between the first surface area 223 of the first portion 221 and the second surface area 225 of the first portion 221. In some embodiments, the first thickness 227 can be substantially uniform across the first surface area 223. In some embodiments, the first thickness 227 can be about 10 micrometers (μm) or more, 25 μm or more, about 30 μm or more, about 50 μm or more, 80 μm or more, about 100 μm or more, about 125 μm or more, about 2 millimeters (mm) or less, about 500 μm or less, about 400 μm or less, about 200 μm or less, or about 125 μm or less. In some embodiments, the first thickness 227 can be in a range from about 10 μm to about 2 mm, 25 μm to about 2 mm, from about 30 μm to about 2 mm, from about 50 μm to about 2 mm, from about 80 μm to about 2 mm, from about 125 μm to about 2 mm, from about 10 μm to about 500 μm, from about 25 μm to about 500 μm, from about 30 μm to about 500 μm, from about 50 μm to about 500 μm, from about 80 μm to about 500 μm, from about 80 μm to about 400 μm, from about 80 μm to about 200 μm, from about 80 μm to about 125 μm, from about 100 μm to about 500 μm, from about 100 μm to about 400 μm, from about 100 μm to about 200 μm, from about 100 μm to about 125 μm, from about 125 μm to about 500 μm, from about 125 μm to about 400 μm, from about 125 μm to about 200 μm, or any range or subrange therebetween. In some embodiments, the first thickness 227 can be in a range from about 10 µm to about 200 µm, from about 25 µm to about 200 µm, from about 25 µm to about 125 µm, from about 25 µm to about 60 µm, from about 25 µm to about 50 µm, from about 30 µm to about 200 µm, from about 30 µm to about 125 µm, from about 30 µm to about 50 µm, or any range or subrange therebetween. In some embodiments, the first thickness 227 of the first portion 221 may be substantially uniform between the first surface area 223 and the second surface area 225 across its corresponding length (i.e., in the direction of the length 105 of the foldable apparatus) and/or its corresponding width (i.e., in the direction of the width 103 of the foldable apparatus).

In some embodiments, the first portion 221 can be optically transparent. As used herein, "optically transparent" or "optically clear" means an average transmittance of 70% or more in the wavelength range of 400 nm to 700 nm through a 1.0 mm thick piece of a material. In some embodiments, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

In some embodiments, the first portion 221 can comprise a glass-based portion. As used herein, "glass-based" includes both glasses and glass-ceramics, wherein glass-ceramics have one or more crystalline phases and an amorphous, residual glass phase. Glass-based material can cool or has already cooled into a glass, glass-ceramic, and/or that upon further processing becomes a glass-ceramic material. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more embodiments, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In some embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, ZnOx$Al_2O_3$xn$SiO_2$ (i.e. ZAS system), and/or glass-ceramics that include a predominant crystal phase including β-quartz solid solution, β-spodumene, cordierite, petalite, and/or lithium disilicate. The glass-ceramic substrates may be strengthened using the strengthening processes described herein. In one or more embodiments, MAS-System glass-ceramic substrates may be strengthened in $Li_2SO_4$ molten salt, whereby an exchange of $2Li^+$ for $Mg^{2+}$ can occur.

In some embodiments, the first portion 221 can comprise a glass-based portion and/or a ceramic-based portion having a pencil hardness of 8H or more, for example, 9H or more. In some embodiments, the first portion 221 can comprise a ceramic-based portion, which may or may not be strengthened. As used herein, "ceramic-based" includes both ceramics and glass-ceramics, wherein glass-ceramics have one or more crystalline phases and an amorphous, residual glass phase. In some embodiments, a ceramic-based material can be formed by heating a glass-based material to form ceramic (e.g., crystalline) portions. In further embodiments, ceramic-based materials may comprise one or more nucleating agents that can facilitate the formation of crystalline phase(s). In some embodiments, the ceramic-based materials can comprise one or more oxide, nitride, oxynitride, carbide, boride, and/or silicide. Example embodiments of ceramic oxides include zirconia ($ZrO_2$), zircon ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxide, beryllium oxide, vanadium oxide ($VO_2$), fused quartz, mullite (a mineral comprising a combination of aluminum oxide and silicon dioxide), and spinel ($MgAl_2O_4$). Example embodiments of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example embodiments of oxynitride ceramics include silicon oxynitride, aluminum oxynitride, and a SiAlON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example embodiments of carbides and carbon-containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example embodiments of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example embodiments of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

In some embodiments, the first portion 221 can comprise a first polymer-based portion. The first polymer-based portion can comprise a rigid polymer (e.g., comprising an elastic modulus at 25° C. of about 3 GigaPascals (GPa) or more, about 8 GPa or more, about 9 GPa or more, or about 10 GPa or more). Example embodiments of rigid polymers include but are not limited to blends, nanoparticle, and/or fiber composites of one or more of styrene-based polymers (e.g., polystyrene (PS), styrene acrylonitrile (SAN), styrene maleic anhydride (SMA)), phenylene-based polymer (e.g., polyphenylene sulfide (PPS)), polyvinylchloride (PVC), polysulfone (PSU), polyphthalmide (PPA), polyoxymethylene (POM), polylactide (PLA), polyimides (PI), polyhydroxybutyrate (PHB), polyglycolides (PGA), polyethyleneterephthalate (PET), and/or polycarbonate (PC).

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 25° C. and 50% relative humidity with a type I dogbone shaped sample. Throughout the disclosure, an elastic modulus (e.g., Young's modulus) and/or a Poisson's ratio is measured using ISO 527-1:2019. In some embodiments, the first portion 221 can comprise an elastic modulus of about 1 GigaPascal (GPa) or more, about 3 GPa or more, about 5 GPa or more, about 10 GPa or more, about 100 GPa or less, about 80 GPa or less, about 60 GPa or less, or about 20 GPa or less. In some embodiments, the first portion 221 can comprise an elastic modulus in a range from about 1 GPa to about 100 GPa, from about 1 GPa to about 80 GPa, from about 3 GPa to about 80 GPa, from about 3 GPa to about 60 GPa, from about 5 GPa to about 60 GPa, from about 5 GPa to about 20 GPa, from about 10 GPa to about 20 GPa, or any range or subrange therebetween. In further embodiments, the first portion 221 can comprise a glass-based portion or a ceramic-based portion comprising an elastic modulus in a range from about 10 GPa to about 100 GPa, from about 40 GPa to about 100 GPa, from about 60 GPa to about 100 GPa, from about 60 GPa to about 80 GPa, from about 80 GPa to about 100 GPa, or any range or subrange therebetween. In some embodiments, the first portion 221 can comprise a polymer-based portion comprising an elastic modulus in a range from about 1 GPa to about 20 GPa, from about 3 GPa to about 20 GPa, from about 3 GPa to about 10 GPa, from about 3 GPa to about 5 GPa, from about 1 GPa to about 10 GPa, from about 1 GPa to about 5 GPa, from about 1 GPa to about 3 GPa, from about 5 GPa to about 20 GPa, from about 5 GPa to about 10 GPa, or any range or subrange therebetween.

The first portion 221 can comprise a first edge surface 229 defined between the first surface area 223 and the second surface area 225. The first edge surface 229 comprises an outer peripheral portion 245. In some embodiments, as shown, the first edge surface 229 can comprise a blunted edge surface. As used herein, a portion is considered to have a blunted edge surface if a surface of the edge forms an obtuse internal angle with the first surface area at an intersection between the first surface area and the surface of the edge and/or if a surface of the edge forms an obtuse internal angle with the second surface area at an intersection between the second surface area and the surface of the edge. As used herein, an internal angle is measured internally within the portion. As used herein, an obtuse angle is defined as an angle that is greater than 90 degrees and less than 180 degrees.

With reference to FIG. 2, the first edge surface 229 is a blunted edge surface because it comprises a first chamfered edge surface 249 that forms an internal angle "A" with the first surface area 223 that is obtuse at an intersection between the first surface area 223 and the first chamfered edge surface 249. In addition or alternatively, the first edge surface 229 is also a blunted edge surface because it comprises a second chamfered edge surface 250 that forms an internal angle "A" with the second surface area 225 that is obtuse at an intersection between the second surface area 225 and the second chamfered edge surface 250. If the edge surface of the portion comprises a curved surface at the intersection between the surface area of the portion and the curved surface, the edge surface is a blunted edge surface if a plane tangent to the curved surface at the intersection comprises an obtuse internal angle with the surface area of the portion. As used herein, the plane tangent to the curved surface is taken where the curved surface deviated from the first surface area (e.g., planar surface). For example, the curved surface shown in FIGS. 3-7 comprises an angle of less than 180 degrees.

With reference to FIG. 3, the first edge surface 229 of the first portion 221 is a blunted edge surface at least because a plane tangent to a curved edge surface 303 of the first portion 221 at the intersection comprises an internal angle "A" of greater than 90 degrees and less than or equal to 180 degrees with the first surface area 223 of the first portion 221. As shown, the curved edge surface 303 can comprise an outwardly convex surface although the blunted edge surface could comprise an outwardly concave surface in further embodiments.

With reference to FIGS. 4-7, the first edge surface 229 of the first portion 221 is a blunted edge surface. For example, in FIG. 4, a plane tangent to a rounded edge surface 403 of the first portion 221 at the intersection comprises an internal angle "A" with the first surface area 223 of the first portion 221 that is obtuse. As shown, the rounded edge surface 403 can comprise an outwardly convex surface. The first edge surface 229 in FIG. 7 resembles the rounded edge surface 403 shown in FIG. 4. Likewise, as shown in FIG. 5, a plane tangent to an elliptical edge surface 502 of the first portion 221 at the intersection comprises an internal angle "A" with the first surface area 223 of the first portion 221 that is obtuse. Also, as shown in FIG. 6, a plane tangent to a compound edge surface comprising an upper portion 603a of the first portion 221 at the intersection comprises an internal angle "A" with the first surface area 223 of the first portion 221 that is obtuse.

In some embodiments, as shown in FIG. 8, the first edge surface 229 of the first portion 221 can comprise a non-blunted edge surface 821 and/or the second edge surface 239 of the second portion 231 can comprise a non-blunted edge surface 831. The non-blunted edge surface is not blunted because it forms a 90-degree angle with the first surface area 223 of the first portion and/or the third surface area 233 of the second portion 631.

In some embodiments, as discussed above for FIGS. 2-6, the entire first edge surface 229 and/or the entire second edge surface 239 can comprise a blunted edge surface. In some embodiments, as shown in FIG. 7, a portion of the first edge surface 229 and/or a portion of the second edge surface 239 can comprise a blunted edge surface. For example, as shown in FIG. 7, the portion of the first edge surface 229 between the first surface area 223 and the second surface area 225 is a blunted edge surface like in FIG. 4. Likewise, as shown in FIG. 7, the portion of the second edge surface 239 between the third surface area 233 and the fourth surface area 235 is a blunted edge surface like in FIG. 4. However, the first portion 221 comprises a first outer edge surface 741 between a first outer surface 751 and the first surface area 223 that is non-blunted because it comprises an internal angle of 90°. Likewise, the second portion comprises a second outer edge surface 743 between a second outer surface 753 and the third surface area 233 that is non-blunted because it comprises an internal angle of 90°. In some embodiments, as shown in FIG. 8, the first edge surface 229 and/or the second edge surface 239 can comprise a non-blunted edge surface.

As discussed previously, in some embodiments, as shown in FIG. 2, the blunted edge surface of the first edge surface 229 can comprise a first chamfered edge surface 249 and/or a second chamfered edge surface 250. In further embodiments, the chamfered edge surface 250 can extend for a distance in the direction 106 of the length for about 20 μm or more, 50 μm or more, about 100 μm or more, about 200 μm or more, about 5 millimeters (mm) or less, about 2 mm or less, about 1 mm or less, about 500 μm or less, or about 200 μm or less. In some embodiments, as shown in FIG. 3, the blunted edge surface of the first edge surface 229 can comprise a curved edge surface 303, for example, the outwardly convex curved edge surface 303. In further embodiments, the curved edge surface 303 can extend for a distance in the direction 106 of the length for about 20 μm or more, 50 μm or more, about 100 μm or more, about 200 μm or more, about 5 millimeters (mm) or less, about 2 mm or less, about 1 mm or less, about 500 μm or less, or about 200 μm or less. In some embodiments, the convex curved edge surface 303 can comprise a cross-sectional profile taken perpendicular to the edge surface that is the shape of an ellipse. For example, as shown in FIG. 5, the blunted edge surface of the first edge surface 229 comprises an elliptical edge surface 502. In further embodiments, as shown, the elliptical edge surface 502 can be defined by a major axis 521*a* extending in a direction 202 of the first thickness 227 and a minor axis 521*b* extending in a direction 106 substantially perpendicular to the direction 202 of the first thickness 227. In even further embodiments, as shown, a length of the major axis 521*a* can be greater than a length of the minor axis. In still further embodiments, as shown, the length of the major axis 521*a* can be substantially equal to the first thickness 227. In still further embodiments, the elliptical edge surface 502 can comprise the entire first edge surface 229. In still further embodiments, a ratio of the major axis 521*a* to the minor axis 521*b* can be greater than 1 (e.g., about 1.01 or more), about 1.5 or more, about 2 more, about 3 or more, about 4 or more, about 5 or more, about 100 or less, about 50 or less, about 20 or less, about 10 or less, about 5 or less, about 4 or less, or about 3 or less. In still further embodiments, a ratio of the major axis 521*a* to the minor axis 521*b* can be in a range from greater than 1 to about 4, from about 1.01 to about 100, from about 1.01 to about 50, from about 1.01 to about 20, from about 1.01 to about 10, from about 1.01 to about 5, from about 1.5 to about 100, from about 1.5 to about 50, from about 1.5 to about 20, from about 1.5 to about 10, from about 1.5 to about 5, or any range or subrange therebetween. In yet further embodiments, the ratio of the major axis 521*a* to the minor axis 521*b* can be in a range from about 1.5 to about 4, from about 2 to about 4, from about 3 to about 4, from about 3.5 to about 4, from about 2 to about 5, from about 3 to about 5, from about 4 to about 5, from about 1.5 to about 3, from about 1.5 to about 2, or any range or subrange therebetween. In further embodiments, although not shown, the position of the major axis and the minor axis can be swapped.

In some embodiments, the convex curved edge surface 303 shown in FIG. 3 can comprise a rounded edge surface that joins the first surface area 223 to the outer peripheral portion 245 that can comprise a flat surface area. As further shown, another rounded edge surface similar to the convex curved edge surface 303 can also be provided that joins the second surface area 225 to the outer peripheral portion 245 comprising the illustrated flat surface area. In alternative embodiments, the first edge surface 229 can comprise a cross-sectional profile taken perpendicular to the edge surface that is the shape of an arc of a circle. For example, as shown in FIG. 4, the blunted edge surface of the first edge surface 229 comprises a convex rounded edge surface 403 that, in some embodiments, extends the entire first edge surface 229 from the first surface area 223 to the second surface area 225 although the convex rounded edge surface 403 may extend less than the entire first edge surface 229 in further embodiments. In further embodiments, as shown, the rounded edge surface 403 comprises a radius of curvature 407. In even further embodiments, as shown, the radius of curvature 407 can be about 50% of the first thickness 227. The first edge surface 229 can comprise further rounded edge surfaces in the shape of an arc of a circle that includes the radius of curvature 407 as a percentage of the first thickness 227 can be about 30% or more, about 40% or more, about 45% or more, about 49% or more, about 70% or less, about 60% or less, about 55% or less, or about 51% or less. In even further embodiments, the radius of curvature 407 as a percentage of the first thickness 227 can in a range from about 30% to about 70%, from about 30% to about 60%, from about 30% to about 55%, from about 30% to about 51%, from about 40% to about 70%, from about 40% to about 60%, from about 40% to about 55%, from about 40% to about 51%, from about 45% to about 70%, from about 45% to about 60%, from about 45% to about 55%, from about 45% to about 51%, from about 49% to about 70%, from about 49% to about 60%, from about 49% to about 55%, from about 49% to about 51%, or any range or subrange therebetween. In still further embodiments, as shown, the rounded edge surface 403 can comprise the outer peripheral portion 245 extending along a line parallel to the fold axis and bisecting the rounded edge surface 403 of the first edge surface 229.

In some embodiments, as shown in FIG. 6, the blunted edge surface can comprise a compound edge surface profile. In further embodiments, a compound edge surface profile can comprise one or more of a chamfered profile, a curved profile (e.g., rounded, circular, elliptical), other curvilinear designs, and/or a combination thereof. In even further embodiments, as shown in FIG. 6, the first edge surface can comprise an upper portion 603*a* comprising a first radius of curvature 407*a* as well as a lower portion 603*b* comprising a different edge surface profile than the upper portion 603*a*. In still further embodiments, as shown, the lower portion 603*b* can comprise a second radius of curvature 407*b* that is less than the first radius of curvature 407*a*. In still further embodiments, as shown, the lower portion 603*b* can comprise a flat (e.g., linear, chamfered) portion 606 that intersects the second surface area 225 to form an obtuse internal angle "A" with the second surface area 225. In yet further embodiments, as shown, the flat portion can extend for a first distance in a direction 106 in a direction of the length 105 that is greater than a second distance 609 that the flat portion extends in a direction 202 of the first thickness 227. In yet further embodiments, although not shown, the flat portion can extend for a first distance in a direction 106 in a direction of the length 105 that is less than a second distance 609 that the flat portion extends in a direction 202 of the first thickness 227. It is to be understood that the discussion of the flat portion in FIG. 6 is also applicable to the chamfered edge surface in FIG. 2. In still further embodiments, the compound edge surface can comprise the entire first edge surface 229. Although not shown, in some embodiments, the curved edge surface can comprise other curvilinear surface profile.

In some embodiments, as shown in FIG. 7, a portion the first edge surface 229 can comprise a blunted edge surface like the first edge surface 229 shown in FIG. 4. However, the first portion 221 comprises a first outer edge surface 741 between the first outer surface 751 and the first surface area 223 that is non-blunted because it comprises an internal angle of 90°.

In some embodiments, as shown in FIGS. 2 and 8, the outer peripheral portion 245 of the first portion 221 can comprise a substantially flat surface although other surfaces may be provided in further embodiments (e.g., rectilinear, curvilinear including convex and/or concave). In some embodiments, as shown in FIGS. 2 and 8, the flat surface of the outer peripheral portion 245 of the first portion 221 can extend in the direction 202 of the first thickness 227 of the first portion 221.

By providing a blunted edge surface for the first edge, stresses on the interface between the first portion 221 and the polymer-based portion 241 can be reduced (e.g., minimized, decreased) by reducing stress concentrations and/or reducing interfacial strain (see FIGS. 23-26). Providing a rounded edge surface for the first edge can further reduce stress concentrations. Likewise, providing a blunted edge surface (e.g., rounded, curved) that comprises the entire first edge can further reduce stress concentrations. Without wishing to be bound by theory, reduced stresses and/or stress concentrations can reduce (e.g., decrease, reduce, prevent) failure of the foldable apparatus and/or facilitate lower effective bend radii than would be achievable with other edge profiles.

As shown in FIGS. 2-8 and 10, the foldable apparatus 101, 301, 401, 501, 601, 701, and 801 and/or foldable test apparatus 901 can comprise the second portion 231. The second portion 231 will now be described with reference to the foldable apparatus 101 of FIG. 2 with the understanding that such description of the second portion 231, unless otherwise stated, can also apply to any embodiments of the disclosure, for example, the foldable apparatus 301, 401, 501, 601, 701, and 801 and/or foldable test apparatus 901 illustrated in FIGS. 3-8 and 10. As shown in FIG. 2, the second portion 231 can comprise a third surface area 233. In some embodiments, the third surface area 233 of the second portion 231 can be a planar surface. In further embodiments, the third surface area 233 of the second portion 231 can be in a common plane with the first surface area 223 of the first portion 221. As shown in FIGS. 2-8, the second portion 231 can comprise a fourth surface area 235 opposite the third surface area 233. In some embodiments, as shown, the fourth surface area 235 of the second portion 231 can comprise a planar surface. In further embodiments, as shown, the fourth surface area 235 can be parallel to the third surface area 233. In further embodiments, the fourth surface area 235 of the second portion 231 can be in a common plane with the second surface area 225 of the first portion 221.

In some embodiments, as shown in FIGS. 7-8, the first portion 221 can comprise the first outer surface 751 that stands proud from the first surface area 223 by a recess depth 749. In further embodiments, the recess depth 749 can be about 5 μm or more, about 10 μm or more, about 20 μm or more, about 40 μm or more, about 60 μm or more, about 500 μm or less, about 200 μm or less, about 160 μm or less, about 120 μm or less, or about 80 μm or less. In further embodiments, the recess depth 749 can be in a range from about 5 μm to about 500 μm, from about 10 μm to about 500 μm, from about 10 μm to about 200 μm, from about 20 μm to about 200 μm, from about 20 μm to about 160 μm, from about 40 μm to about 160 μm, from about 40 μm to about 120 μm, from about 60 μm to about 120 μm, from about 60 μm to about 80 μm, or any range or subrange therebetween. In further embodiments, as shown in FIGS. 7-8, the first outer edge surface 741 can be defined between the first surface area 223 and the first outer surface 751. In even further embodiments, as shown, the first outer edge surface 741 can comprise a non-blunted surface, although blunted surfaces can be provided in other embodiments.

A second thickness 237 can be defined between the third surface area 233 of the second portion 231 and the fourth surface area 235 of the second portion 231. In some embodiments, the second thickness 237 can be within the range discussed above with regards to the first thickness 227. In further embodiments, as shown, the second thickness 237 can be substantially equal to the first thickness 227. In some embodiments, the first substrate 203 can comprise a first substrate thickness 209 that can be less than or substantially equal to the first thickness 227 and/or the second thickness 237. In some embodiments, the second thickness 237 of the second portion 231 may be substantially uniform between the third surface area 233 and the fourth surface area 235. In some embodiments, the second portion 231 can be optically transparent. In some embodiments, the second portion 231 can comprise an elastic modulus within one or more of the ranges discussed above for the first portion (e.g., first glass-based portion, first ceramic-based portion, first polymer-based portion). The second portion 231 can comprise any of the material compositions of the first portion 221 discussed above. In some embodiments, the first portion 221 can comprise the same material composition as the second portion 231.

As shown in FIGS. 1-2, the foldable apparatus of any of the embodiments of the disclosure can comprise a fold plane 109 that includes the fold axis 102 and the direction 202 of the first thickness 227 of the first portion 221 when the foldable apparatus is in the flat configuration (e.g., see FIG. 1). As shown in FIGS. 2-8, embodiments of the disclosure can provide the second portion 231 with a second edge surface 239 that can be a mirror image of the first edge surface 229 about the fold plane 109; however, the second edge surface 239 may not be a mirror image of the first edge surface 229 in further embodiments.

As shown in FIGS. 2-8, the second edge surface 239 of the second portion 231 can be defined between the third surface area 233 and the fourth surface area 235. The second edge surface 239 comprises an outer peripheral portion 247. In some embodiments, as shown, the second edge surface 239 can comprise a blunted edge surface, as defined above with regards to the first edge surface 229.

In some embodiments, as shown in FIG. 2, the blunted edge surface of the second edge surface 239 can comprise a chamfered edge surface 251 that may be similar or identical to the chamfered edge surface 249 of the first edge surface 229. As further shown in FIG. 2, the blunted edge surface of the second edge surface 239 can comprise a chamfered edge surface 252 that may be similar or identical to the chamfered edge surface 250 of the first edge surface 229. As shown in FIG. 2, the chamfered edge surface 250 can comprise a mirror image of the chamfered edge surface 249, wherein the mirror image is taken about a plane positioned half the distance between the first surface area 223 and the second surface area 225 and parallel to the first surface area 223. Likewise, the chamfered edge surface 252 can comprise a mirror image of the chamfered edge surface 251, wherein the mirror image is taken about a plane positioned half the distance between the third surface area 233 and the fourth surface area 235 and parallel to the third surface area 233.

In some embodiments, as shown in FIG. 3, the blunted edge surface of the second edge surface 239 comprises a curved edge surface 305 that may be similar or identical to the curved edge surface 303 of the first edge surface 229 discussed above. As shown in FIG. 3, an interface between the first edge surface 229 and the second surface area 225 can comprise a mirror image of the curved edge surface 303, wherein the mirror image is taken about a plane positioned half the distance between the first surface area 223 and the second surface area 225 and parallel to the first surface area 223. Likewise, an interface between second edge surface 239 and the fourth surface area 235 can comprise a mirror image of the curved edge surface 305, wherein the mirror image is taken about a plane positioned half the distance between the third surface area 233 and the fourth surface area 235 and parallel to the third surface area 233.

In some embodiments, as shown in FIG. 4, the blunted edge surface of the second edge surface 239 comprises a rounded edge surface 405 that may be similar or identical to the rounded edge surface 403 of the first edge surface 229 discussed above. In some embodiments, the radius of curvature 409 for the second edge surface 239 can be substantially equal to the radius of curvature 407 for the first edge surface 229, although other relationships may be provided in other embodiments.

In some embodiments, as shown in FIG. 5, the blunted edge surface of the second edge surface 239 comprises an elliptical edge surface 504 that may be similar or identical to the elliptical edge surface 502 of the first edge surface 229 discussed above. As shown in FIG. 5, a mirror image of the elliptical edge surface 502 defined by the major axis 521a and the minor axis 521b for the first edge surface 229 can be the elliptical edge surface 504 defined by a major axis 523a and a minor axis 523b for the second edge surface 239, wherein the mirror image is taken about the fold plane 109. In some embodiments, the major axis 523a and the minor axis 523b for the second edge surface 239 can be substantially equal to the major axis 521a and the minor axis 521b for the first edge surface 229, respectively, although other relationships may be provided in other embodiments.

In some embodiments, as shown in FIG. 6, the blunted edge surface of the second edge surface 239 comprises a compound edge surface comprising an upper portion 604a and a lower portion 604b that may be similar or identical to the upper portion 603a and the lower portion 603b of the compound edge surface of the first edge surface 229 discussed above, respectively. In some embodiments, second edge surface 239 can comprise the upper portion 604a comprising a first radius of curvature 409a that can be substantially equal to the first radius of curvature 407a for the first edge surface 229. In some embodiments, the second edge surface 239 can comprise the lower portion 604b comprising a second radius of curvature 409b that can be substantially equal to the second radius of curvature 407b for the first edge surface 229. In some embodiments, the second edge surface 239 can comprise the lower portion 604b comprising a flat portion 607 that can be substantially equal to the flat portion 606 of the first edge surface 229. In some embodiments, as shown in FIGS. 2-3, the outer peripheral portion 245 of the first portion 221 and/or the outer peripheral portion 247 of the second portion 231 can comprise a substantially flat surface although other surfaces may be provided in further embodiments (e.g., rectilinear, curvilinear including convex and/or concave).

In some embodiments, as shown in FIG. 7, a portion the second edge surface 239 can comprise a blunted edge surface like the second edge surface 239 shown in FIG. 4. However, the second portion 231 comprises a second outer edge surface 743 between the second outer surface 753 and the third surface area 233 that is non-blunted because it comprises an internal angle of 90°.

In some embodiments, as shown in FIGS. 2 and 8, the outer peripheral portion 247 of the second portion 231 can comprise a substantially flat surface although other surfaces may be provided in further embodiments (e.g., rectilinear, curvilinear including convex and/or concave). In some embodiments, as shown in FIGS. 2 and 8, the flat surface of the outer peripheral portion 247 of the second portion 231 can extend in the direction 202 of the first thickness 227.

In some embodiments, as shown in FIGS. 7-8, the second portion 231 can comprise the second outer surface 753 that stands proud from the third surface area 233 by the recess depth 749. In further embodiments, as shown in FIGS. 7-8, the second outer edge surface 743 can be defined between the third surface area 233 and the second outer surface 753. In even further embodiments, as shown, the second outer edge surface 743 can comprise a non-blunted surface, although blunted surfaces can be provided in other embodiments.

In some embodiments, the second portion 231 can comprise a glass-based portion. In further embodiments, the second portion 231 can comprise a composition within the ranges discussed above for glass-based materials with regards to the first portion 221. For example, both the first portion 221 and the second portion 231 can comprise glass-based portions. For example, the first portion 221 can comprise a glass-based portion while the second portion 231 can comprise a ceramic-based portion. In some embodiments, the first substrate 203 can comprise a ceramic-based substrate. In further embodiments, the second portion 231 can comprise a composition within the ranges discussed above for ceramic-based materials with regards to the first portion 221. For example, both the first portion 221 and the second portion 231 can comprise ceramic-based portions. For example, the first portion 221 can comprise a ceramic-based portion while the second portion 231 can comprise a glass-based portion. In some embodiments, the second portion 231 can comprise a polymer-based portion. In further embodiments, the second portion 231 can comprise one or more of the materials discussed above for polymer-based materials with regards to the first portion 221. For example, both the first portion 221 and the second portion 231 can comprise polymer-based portions.

As shown in FIGS. 2-8 and 10, in some embodiments, the polymer-based portion 241 can be positioned between the first portion 221 and the second portion 231. In further embodiments, as shown, the polymer-based portion 241 can be positioned between the first edge surface 229 (e.g., first blunted edge surface) of the first portion 221 and the second edge surface 239 (e.g., second blunted edge surface) of the second portion 231. In further embodiments, as shown, the polymer-based portion 241 may contact the first edge surface 229 of the first portion 221. In even further embodiments, as shown, the polymer-based portion 241 may contact the outer peripheral portion 245 of the first edge surface 229. In still further embodiments, as shown, the polymer-based portion 241 may contact the entire edge surface of the first edge surface 229. In further embodiments, as shown, the polymer-based portion 241 may contact the second edge surface 239 of the second portion 231. In even further embodiments, as shown, the polymer-based portion 241 may contact the outer peripheral portion 247 of the second edge surface 239. In still further embodiments, as shown, the polymer-based portion 241 may contact the entire edge surface of the second edge surface 239. In some embodiments, the polymer-based portion 241 can comprise a width in a direction 104 of the width 103 of the foldable apparatus, and the width of the polymer-based portion 241 can be substantially equal to the width 103 of the foldable apparatus.

As shown in FIGS. 2-8, the polymer-based portion 241 can comprise a third contact surface 255 and a fourth contact surface 257 opposite the third contact surface 255. In some embodiments, the third contact surface 255 can comprise a planar surface. In some embodiments, as shown in FIGS. 2-4 and 6-8, the third contact surface 255 may be substantially coplanar (e.g., extend along a common plane) with the first surface area 223 and the third surface area 233. In some embodiments, in addition to the third contact surface 255 being substantially coplanar with the first surface area 223 and the third surface areas 233, as shown in FIGS. 2-3 and 6-8, the fourth contact surface 257 can be substantially coplanar (e.g., extend along a common plane) with the second surface area 225 and the fourth surface area 235. As shown in FIGS. 2-3 and 6-8, the polymer-based portion 241 may extend in a direction 202 of the first thickness 227 of the first portion 221 that is substantially coextensive with (e.g., equal to) the first thickness 227 of the first portion 221. In further embodiments, as shown in FIG. 4, the polymer-based portion 241 may extend beyond a plane defined by the second surface area 225 and the fourth surface area 235. In some embodiments, the fourth contact surface 257 can comprise a planar surface. In some embodiments, as shown in FIGS. 2-3 and 5-8, the fourth contact surface 257 may be substantially coplanar (e.g., extend along a common plane) with the second surface area 225 and the fourth surface area 235. In further embodiments, as shown in FIGS. 2-3 and 6-8, third contact surface 255 may be substantially coplanar (e.g., extend along a common plane) with the first surface area 223 and the third surface area 233. In further embodiments, as shown in FIG. 5, the polymer-based portion 241 may extend beyond a plane defined by the first surface area 223 and the third surface area 233. In further embodiments, essentially a combination of the polymer-based portion 241 shown in FIGS. 4-5, the polymer-based portion 241 may extend beyond a plane defined by the first surface area 223 and the third surface area 233 as well as may extend beyond a plane defined by the second surface area 225 and the fourth surface area 235.

In some embodiments, as shown in FIG. 4, the polymer-based portion 241 can comprise a first inner surface area 431 facing the second surface area 225. In further embodiments, as shown, the first inner surface area 431 can contact the second surface area 225. In further embodiments, as shown, the polymer-based portion 241 can comprise a second inner surface area 429 facing the fourth surface area 235. In even further embodiments, the second inner surface area 429 can contact the fourth surface area 235. In further embodiments, a polymer thickness 415 can be defined between the second surface area 225 of the first portion 221 and the fourth contact surface 257 of the polymer-based portion 241. In even further embodiments, the polymer thickness 415 can be about 1 µm or more, about 5 µm or more, about 10 µm or more, about 20 µm or more, about 30 µm or more, about 80 µm or less, about 60 µm or less, about 50 µm or less, about 40 µm or less, about 30 µm or less, about 20 µm or less, or about 10 µm or less. In even further embodiments, the polymer thickness 415 can be in a range from about 1 µm to about 80 µm, from about 1 µm to about 60 µm, from about 1 µm to about 50 µm, from about 1 µm to about 40 µm, from about 1 µm to about 30 µm, from about 1 µm to about 20 µm, from about 1 µm to about 10 µm, from about 5 µm to about 60 µm, from about 5 µm to about 50 µm, from about 5 µm to about 40 µm, from about 5 µm to about 30 µm, from about 5 µm to about 20 µm, from about 5 µm to about 10 µm, from about 10 µm to about 60 µm, from about 10 µm to about 50 µm, from about 10 µm to about 40 µm, from about 10 µm to about 30 µm, from about 10 µm to about 20 µm, from about 20 µm to about 60 µm, from about 20 µm to about 50 µm, from about 20 µm to about 40 µm, from about 20 µm to about 30 µm, from about 30 µm to about 60 µm, from about 30 µm to about 50 µm, from about 30 µm to about 40 µm, from about 40 µm to about 50 µm, or any range or subrange therebetween. In even further embodiments, as discussed below with reference to Examples II-KK, providing a polymer thickness 415 of about 5 µm or less (e.g., from about 1 µm to about 5 µm) can reduce (e.g., mitigate, delay, eliminate) the onset of mechanical instabilities in folding.

In some embodiments, as shown in FIGS. 2-8, in a flat orientation, the second surface area 225 of the first portion 221 and the fourth surface area 235 of the second portion 231 can extend along a common plane 253 (see FIG. 2). In further embodiments, as shown in FIG. 2, a recess can be defined between the first edge surface 229 of the first portion 221, the second edge surface 239 of the second portion 231, the common plane 253, and a second contact surface 215 of a first adhesive layer 211. In even further embodiments, as shown, the recess can be filled by the polymer-based portion 241 (discussed below). In even further embodiments, although not shown, the recess may not be totally filled, for example, to leave room for electronic devices and/or mechanical devices.

In some embodiments, as shown in FIG. 5, the polymer-based portion 241 can comprise a first inner surface area 527 facing the first surface area 223. In further embodiments, as shown, the first inner surface area 527 can contact the first surface area 223. In further embodiments, as shown, the polymer-based portion 241 can comprise a second inner surface area 529 facing the third surface area 233. In even further embodiments, the second inner surface area 529 can contact the third surface area 233. In further embodiments, a polymer thickness 525 can be defined between the first surface area 223 of the first portion 221 and the third contact surface 255 of the polymer-based portion 241. In even further embodiments, the polymer thickness 525 can be within one or more of the ranges discussed above with regards to the polymer thickness 415.

By providing a polymer-based portion 241 contacting a surface area (e.g., first surface area 223, second surface area 225, third surface area 233, fourth surface area 235) of the first portion 221 and/or second portion 231, bend-induced stresses on a coating (e.g., coating 411) and/or substrate (e.g., first substrate 203, backing substrate 421) can be reduced, for example, by shifting a neutral axis of the coating and/or substrate closer to the polymer-based portion 241 than a mid-plane of the coating and/or substrate. Furthermore, providing a polymer-based portion 241 contacting a surface area (e.g., first surface area 223, second surface area 225) of the first portion 221 and a surface area (e.g., third surface area 233, fourth surface area 235) of the second portion 231 can reduce optical distortions when viewing an image (e.g., from a display device or other electronic device). Furthermore, providing a polymer-based portion 241 contacting a first surface area 223 of the first portion 221 and a third surface area 233 of the second portion 231 can provide a third contact surface 255 covering the first portion 221 and the second portion 231 and presenting the third contact surface 255 with consistent properties across its length and/or width for coupling a coating (e.g., coating 411) and/or substrate (e.g., first substrate 203, backing substrate 421). Furthermore, providing a polymer-based portion 241 contacting a second surface area 225 of the first portion 221 and a fourth surface area 235 of the second portion 231 can provide a fourth contact surface 257 covering the first portion 221 and the second portion 231 and presenting the fourth contact surface 257 with consistent properties across its length and/or width for coupling a substrate (e.g., second substrate), a release liner 503, and/or a display device 603 thereto.

In some embodiments, the polymer-based portion 241 comprises a polymer (e.g., optically transparent polymer). In further embodiments, the polymer-based portion 241 can comprise one or more of an optically transparent: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In further embodiments, the polymer-based portion 241 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and/or polyether ether ketone (PEEK). Example embodiments of polyolefins include low molecular weight polyethylene (LDPE), high molecular weight polyethylene (HDPE), ultra-high molecular weight polyethylene (UHMWPE), and polypropylene (PP). Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example embodiments of elastomers include rubbers (e.g., polybutadiene, polyisoprene, chloroprene rubber, butyl rubber, nitrile rubber), polyurethanes, and block copolymers (e.g., styrene-butadiene, high-impact polystyrene, polydichlorophosphazene) comprising one or more of polystyrene, polydichlorophosphazene, and/or poly(5-ethylidene-2-norbornene). In some embodiments, the polymer-based portion 241 can further comprise nanoparticles, for example, carbon black, carbon nanotubes, silica nanoparticles, or nanoparticles comprising a polymer. In some embodiments, the polymer-based portion can further comprise fibers to form a polymer-fiber composite.

In some embodiments, the polymer-based portion 241 can comprise a negative coefficient of thermal expansion (CTE). As used herein, a coefficient of thermal expansion is measured in accordance with ASTM E289-17 using a Picoscale Michelson Interferometer between −20° C. and 40° C. In some embodiments, the polymer-based portion 241 can comprise particles of one or more of copper oxide, beta-quartz, a tungstate, a vanadate, a pyrophosphate, and/or a nickel-titanium alloy. In some embodiments, the polymer-based portion 241 can comprise a CTE of about $-20\times10^{-7}$ °C.$^{-1}$ or more, about $-10\times10^{-7}$ °C.$^{-1}$ or more, about $-5\times10^{-7}$ °C.$^{-1}$ or more, about $-2\times10^{-7}$ °C.$^{-1}$ or more, about $10\times10^{-7}$ °C.$^{-1}$ or less, about $5\times10^{-7}$ °C.$^{-1}$ or less, about $2\times10^{-7}$ °C.$^{-1}$ or less, about $1\times10^{-7}$ °C.$^{-1}$ or less, or $0°$ C.$^{-1}$ or less. In some embodiments, the polymer-based portion 241 can comprise a CTE in a range from about $-20\times10^{-7}$ °C.$^{-1}$ to about $10\times10^{-7}$ °C.$^{-1}$, from about $-20\times10^{-7}$ °C.$^{-1}$ to about $5\times10^{-7}$ °C.$^{-1}$, from about $-10\times10^{-7}$ °C.$^{-1}$ to about $5\times10^{-7}$ °C.$^{-1}$, from about $-10\times10^{-7}$ °C.$^{-1}$ to about $2\times10^{-7}$ °C.$^{-1}$, from about $-10\times10^{-7}$ °C.$^{-1}$ to $0°$ C.$^{-1}$, from about $-5\times10^{-7}$ °C.$^{-1}$ to $0°$ C.$^{-1}$, from about $-2\times10^{-7}$ °C.$^{-1}$ to about $0°$ C.$^{-1}$, or any range or subrange therebetween. By providing a polymer-based portion comprising a low (e.g., negative) coefficient of thermal expansion, warp caused by volume changes during curing of the polymer-based portion can be mitigated.

Throughout the disclosure, a tensile strength, ultimate elongation (e.g., strain at failure), and yield point of a polymeric material (e.g., adhesive, polymer-based portion) is determined using ASTM D638 using a tensile testing machine, for example, an Instron 3400 or Instron 6800, at 25° C. and 50% relative humidity with a type I dogbone shaped sample. Throughout the disclosure, an elastic modulus (e.g., Young's modulus) and/or a Poisson's ratio is measured using ISO 527-1:2019. In some embodiments, the polymer-based portion 241 can comprise an elastic modulus of about 0.01 MegaPascals (MPa) or more, about 1 MPa or more, about 10 MPa or more, about 20 MPa or more, about 100 MPa or more, about 10,000 MPa or less, about 3,000 MPa or less, about 1,000 MPa or less, about 500 MPa or less, or about 300 MPa or less. In some embodiments, the polymer-based portion 241 can comprise an elastic modulus in a range from about 0.01 MPa to about 10,000 MPa, from about 0.01 MPa to about 3,000 MPa, from about 1 MPa to about 3,000 MPa, from about 10 MPa to about 3,000 MPa, from about 20 MPa to about 3,000 MPa, from about 20 MPa to about 1,000 MPa, from about 20 MPa to about 300 MPa, from about 100 MPa to about 300 MPa, from about 200 MPa to about 300 MPa, or any range or subrange therebetween. In some embodiments, the elastic modulus of the polymer-based portion 241 can be in a range from about 0.01 MPa to about 1,000 MPa, from about 0.01 MPa to about 500 MPa, from about 0.01 MPa to about 300 MPa, from about 1 MPa to about 300 MPa, from about 10 MPa to about 300 MPa, or any range or subrange therebetween. In some embodiments, the elastic modulus of the polymer-based portion 241 can be in a range from about 1 GPa to about 20 GPa, from about 1 GPa to about 18 GPa, from about 1 GPa to about 10 GPa, from about 1 GPa to about 5 GPa, from about 1 GPa to about 3 GPa, or any range or subrange therebetween. By providing a polymer-based portion 241 with an elastic modulus in a range from about 0.01 MPa to about 3,000 MPa (e.g., in a range from about 20 MPa to about 3 GPa), folding of the foldable apparatus without failure can be facilitated. In some embodiments, the first adhesive layer 211 comprises an elastic modulus greater than the elastic modulus of the polymer-based portion 241, which arrangement provides improved performance in puncture resistance. In some embodiments, the elastic modulus of the polymer-based portion 241 can be less than the elastic modulus of the first portion 221 and/or the second portion 231.

In some embodiments, the first adhesive layer 211 may comprise an elastic modulus within one or more of the ranges of the elastic modulus of the polymer-based portion 241. In further embodiments, the first adhesive layer 211, second adhesive layer 507, and/or third adhesive layer 717 may comprise substantially the same elastic modulus as the elastic modulus of the polymer-based portion 241. In further embodiments, as in Examples LL-OO, the elastic modulus of the first adhesive layer 211, the second adhesive layer 507, and/or the third adhesive layer 717 can be in a range from about 250 MPa to about 20 GPa, 1 GPa to about 20 GPa, from about 1 GPa to about 18 GPa, from about 1 GPa to about 10 GPa, from about 1 GPa to about 5 GPa, from about 1 GPa to about 3 GPa, from about 3 GPa to about 10 GPa, from about 5 GPa to about 10 GPa, from about 5 GPa to about 8 GPa, or any range or subrange therebetween. In further embodiments, the elastic modulus of the first adhesive layer 211, the second adhesive layer 507, and/or the third adhesive layer 717 can be in a range from about 250 MPa to about 5 GPa, from about 250 MPa to about 4 GPa, from about 400 MPa to about 4 GPa, from about 400 MPa to about 1 GPa, from about 500 MPa to about 1 GPa, or any range or subrange therebetween. In further embodiments, as in Examples AA-QQ, the elastic modulus of the polymer-based portion 241, first adhesive layer 211, second adhesive layer 507, and/or third adhesive layer 717 can be in a range from about 0.001 MPa to about 50 MPa, from about 0.01 MPa to about 50 MPa, from about 0.01 MPa to about 20 MPa, from about 0.05 MPa to about 20 MPa, from about 0.05 MPa to about 10 MPa, from about 0.1 MPa to about 5 MPa, from about 0.5 MPa to about 5 MPa, from about 1 MPa to about 5 MPa, from about 0.001 MPa to about 0.5 MPa, from about 0.01 MPa to about 0.5 MPa, from about 0.01 MPa to about 0.1 MPa, from about 0.05 MPa to about 0.1 MPa, or any range or subrange therebetween.

Throughout the disclosure, tension set of a sample is measured using ASTM D-412 as the strain at zero stress after the sample is stretched to a specified strain. In some embodiments, the first adhesive layer 211, the second adhesive layer 507, the third adhesive layer 717, and/or the polymer-based portion 241 can comprise a tension set after being extended to a strain of 40% at a strain rate of 10% strain per minute at 25° C. In further embodiments, the tension set can be about 2% or less, about 1% or less, about 0.5% or less, or 0% or more. In further embodiments, the tension set can be in a range from 0% to about 2%, from 0% to about 1%, from 0% to about 0.5%, or any range or subrange therebetween. In further embodiments, the first adhesive layer 211, the second adhesive layer 507, the third adhesive layer 717, and/or the polymer-based portion 241 can fully recover after being extended to a strain of 40% at a strain rate of 10% strain per minute at 25° C. In some embodiments, the first adhesive layer 211, the second adhesive layer 507, the third adhesive layer 717, and/or the polymer-based portion 241 can fully recover after being extended to a strain of 40% at a strain rate of 10% strain per minute at 0° C. In some embodiments, the first adhesive layer 211, the second adhesive layer 507, the third adhesive layer 717, and/or the polymer-based portion 241 can comprise a tension set after 200 cycles extending the polymer-based portion to a strain of 40% at a strain rate of 10% strain per minute at 25° C. In further embodiments, the tension set can be about 2% or less, about 1% or less, about 0.5% or less, or 0% or more. In further embodiments, the tension set can be in a range from 0% to about 2%, from 0% to about 1%, from 0% to about 0.5%, or any range or subrange therebetween.

As used herein, a material exhibits linear elasticity to a predetermined strain if the relationship between stress and strain going from 0 strain to the predetermined strain is substantially linear. In some embodiments, the first adhesive layer 211, the second adhesive layer 507, the third adhesive layer 717, and/or the polymer-based portion 241 can comprise linear elasticity to a strain of about 5% or more, about 8% or more, about 10% or more, about 12% or more, about 15% or more, about 18% or more, about 20% or more, about 22% or more, about 25% or more, about 30% or more, or about 50% or more. In some embodiments, the first adhesive layer 211, the second adhesive layer 507, the third adhesive layer 717, and/or the polymer-based portion 241 can remain within an elastic deformation regime under nominal use conditions (e.g., folding of the foldable apparatus comprising the corresponding adhesive layer(s) and/or polymer-based portion to a parallel plate distance of at least 10 mm, 5 mm, 3 mm, etc.). As used herein, an elastic deformation regime includes the range of the deformations that a material can recover 99% of its original dimension after being deformed to that deformation (e.g., a strain set of about 1% or less). Without wishing to be bound by theory, a first material may remain within its elastic deformation regime when the tensile strength of the first material is less than the product of the first material's elastic modulus and the first material's thickness divided by the product of twice the first material's volume fraction and the effective minimum bend radius of the foldable apparatus when the thickness of the first material divided by the effective minimum bend radius of the foldable apparatus is less than the first material's yield strain. As used herein, a tensile strength is a stress on the material at yield. As used herein, a yield strain is a material's strain at yield. As used herein, the first material's volume fraction means the ratio of a combined volume of the first material in a region between the central surface area and the second material surface circumscribed by an outer periphery of the shattered pane to the total volume of the region between the central surface area and the second material surface circumscribed by an outer periphery of the shattered pane. For example, a first material would be within its elastic deformation regime if it is in a foldable apparatus comprising an effective minimum bend radius of 1 mm as the thickness of the first material is 100 μm as long as the yield strain of the first material is 0.1 and the tensile strength of the first material is more than 10 times the elastic modulus of the first material. In some embodiments, the first adhesive layer 211, the second adhesive layer 507, the third adhesive layer 717, and/or the polymer-based portion 241 can comprise a strain at yield of about 5% or more, about 8% or more, about 10% or more, about 12% or more, or about 20% or more. In some embodiments, the first adhesive layer 211, the second adhesive layer 507, the third adhesive layer 717, and/or the polymer-based portion 241 can comprise a strain at yield in a range from about 5% to about 10,000%, from about 5% to about 5,000%, from about 8% to about 1,000%, from about 8% to about 500%, from about 10% to about 300%, from about 10% to about 100%, from about 12% to about 100%, from about 20% to about 100%, from about 20% to about 50%, or any range or subrange therebetween. As discussed below, curing the material in a bent configuration can reduce the effective maximum strain on the first material as the foldable apparatus is folded between unfolded and folded configurations, which can allow more materials to be used while still keeping the first material within its elastic deformation regime.

In some embodiments, as shown in FIGS. 4-6, the foldable apparatus 401, 501, and 601 can comprise a coating 411. As shown, the coating 411 can comprise a third major surface 419 and a fourth major surface 417 opposite the third major surface 419. A coating thickness 413 can be defined between the third major surface 419 and the fourth major surface 417. In further embodiments, the coating thickness can be about 0.1 μm or more, about 1 μm or more, about 5 μm or more, about 10 μm or more, about 15 μm or more, about 20 μm or more, about 25 μm or more, about 40 μm or more, about 50 μm or more, about 60 μm or more, about 70 μm or more, about 80 μm or more, about 90 μm or more, about 200 μm or less, about 100 μm or less, or about 50 μm or less, about 30 μm or less, about 25 μm or less, about 20 μm or less, about 20 μm or less, about 15 μm or less, or about 10 µm or less. In some embodiments, the coating thickness 413 can be in a range from about 0.1 µm to about 200 µm, from about 1 µm to about 200 µm, from about 10 µm to about 200 µm, from about 50 µm to about 200 µm, from about 0.1 µm to about 100 µm, from about 1 µm to about 100 µm, from about 10 µm to about 100 µm, from about 20 µm to about 100 µm, from about 30 µm to about 100 µm, from about 40 µm to about 100 µm, from about 50 µm to about 100 µm, from about 60 µm to about 100 µm, from about 70 µm to about 100 µm, from about 80 µm to about 100 µm, from about 90 µm to about 100 µm, from about 0.1 µm to about 50 µm, from about 1 µm to about 50 µm, from about 10 µm to about 50 µm, or any range or subrange therebetween. In further embodiments, the coating thickness 413 can be in a range from about 0.1 µm to about 50 µm, from about 0.1 µm to about 30 µm, from about 0.1 µm to about 25 µm, from about 0.1 µm to about 20 µm, from about 0.1 µm to about 15 µm, from about 0.1 µm to about 10 µm. In some embodiments, the coating thickness 413 can be in a range from about 1 µm to about 30 µm, from about 1 µm to about 25 µm, from about 1 µm to about 20 µm, from about 1 µm to about 15 µm, from about 1 µm to about 10 µm. In some embodiments, the coating thickness 413 can be in a range from about 5 µm to about 30 µm, from about 5 µm to about 25 µm, from about 5 µm to about 20 µm, from about 5 µm to about 15 µm, from about 5 µm to about 10 µm, from about 10 µm to about 30 µm, from about 10 µm to about 25 µm, from about 10 µm to about 20 µm, from about 10 µm to about 15 µm, from about 15 µm to about 30 µm, from about 15 µm to about 25 µm, from about 15 µm to about 20 µm, from about 20 µm to about 30 µm, from about 20 µm to about 25 µm, or any range or subrange therebetween. In some embodiments, the coating thickness 413 can be in a range from about 5 µm to about 30 µm, from about 5 µm to about 25 µm, from about 10 µm to about 25 µm, from about 10 µm to about 20 µm, from about 10 µm to about 15 µm, or any range or subrange therebetween.

In some embodiments, as shown in FIGS. 4-6, the coating 411 can be disposed over the first portion 221, the second portion 231, and the polymer-based portion 241. In further embodiments, as shown, the coating 411 can be disposed over the first surface area 223 of the first portion 221, the third surface area 233 of the second portion 231, and the third contact surface 255 of the polymer-based portion 241. In even further embodiments, as shown in FIG. 5, the third contact surface 255 of the polymer-based portion 241 can contact the fourth major surface 417 of the coating 411.

As used herein, if a first layer and/or component is described as "disposed over" a second layer and/or component, other layers may or may not be present between the first layer and/or component and the second layer and/or component. Furthermore, as used herein, "disposed over" does not refer to a relative position with reference to gravity. For example, a first layer and/or component can be considered "disposed over" a second layer and/or component, for example, when the first layer and/or component is positioned underneath, above, or to one side of a second layer and/or component. As used herein, a first layer and/or component described as "bonded to" a second layer and/or component means that the layers and/or components are bonded to each other, either by direct contact and/or bonding between the two layers and/or components or via an adhesive layer.

In some embodiments, the coating 411 can comprise a polymeric hard coating. In further embodiments, the polymeric hard coating can comprise one or more of an ethylene-acid copolymer, a polyurethane-based polymer, an acrylate resin, and/or a mercapto-ester resin. Example embodiments of ethylene-acid copolymers include ethylene-acrylic acid copolymers, ethylene-methacrylic acid copolymers, and ethylene-acrylic-methacrylic acid terpolymers (e.g., Nucrel, manufactured by DuPont), ionomers of ethylene acid copolymers (e.g., Surlyn, manufactured by DuPont), and ethylene-acrylic acid copolymer amine dispersions (e.g., Aquacer, manufactured by BYK). Example embodiments of polyurethane-based polymers include aqueous modified polyurethane dispersions (e.g., Eleglas®, manufactured by Axalta). Example embodiments of acrylate resins which can be UV curable include acrylate resins (e.g., Uvekol® resin, manufactured by Allnex), cyanoacrylate adhesives (e.g., Permabond® UV620, manufactured by Krayden), and UV radical acrylic resins (e.g., Ultrabond windshield repair resin, for example, Ultrabond (45CPS)). Example embodiments of mercapto-ester resins include mercapto-ester triallyl isocyanates (e.g., Norland optical adhesive NOA 61). In further embodiments, the polymeric hard coating can comprise ethylene-acrylic acid copolymers and ethylene-methacrylic acid copolymers, which may be ionomerized to form ionomer resins through neutralization of the carboxylic acid residue with typically alkali metal ions, for example sodium and potassium, and also zinc. Such ethylene-acrylic acid and ethylene-methacrylic acid ionomers may be dispersed within water and coated onto the substrate to form an ionomer coating. Alternatively, such acid copolymers may be neutralized with ammonia which, after coating and drying liberates the ammonia to reform the acid copolymer as the polymeric hard coating. By providing a coating comprising a polymeric hard coating, the foldable apparatus can comprise low energy fracture.

In some embodiments, the coating 411 can comprise a polymeric coating comprising an optically transparent polymeric hard-coat layer. Suitable materials for an optically transparent polymeric hard-coat layer include, but are not limited to: a cured acrylate resin material, an inorganic-organic hybrid polymeric material, an aliphatic or aromatic hexafunctional urethane acrylate, a siloxane-based hybrid material, and a nanocomposite material, for example, an epoxy and urethane material with nanosilicate. In some embodiments, an optically transparent polymeric hard-coat layer may consist essentially of one or more of these materials. In some embodiments, an optically transparent polymeric hard-coat layer may consist of one or more of these materials. As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. More specifically, suitable materials for an optically transparent polymeric (OTP) hard-coat layer include, but are not limited to, a polyimide, a polyethylene terephthalate (PET), a polycarbonate (PC), a poly methyl methacrylate (PMMA), organic polymer materials, inorganic-organic hybrid polymeric materials, and aliphatic or aromatic hexafunctional urethane acrylates. In some embodiments, an OTP hard-coat layer may consist essentially of an organic polymer material, an inorganic-organic hybrid polymeric material, or aliphatic or aromatic hexafunctional urethane acrylate. In some embodiments, an OTP hard-coat layer may consist of a polyimide, an organic polymer material, an inorganic-organic hybrid polymeric material, or aliphatic or aromatic hexafunctional urethane acrylate. In some embodiments, an OTP hard-coat layer may include a nanocomposite material. In some embodiments, an OTP hard-coat layer may include a nano-silicate at least one of epoxy and urethane materials. Suitable compositions for such an OTP hard-coat layer are described in U.S. Pat. Pub. No. 2015/0110990, which is hereby incorporated by reference in its entirety by reference thereto. As used herein, "organic polymer material" means a polymeric material comprising monomers with only organic components. In some embodiments, an OTP hard-coat layer may comprise an organic polymer material manufactured by Gunze Limited and having a hardness of 9H, for example, Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, for example, inorganic particulates dispersed within an organic matrix. In some embodiments, the inorganic-organic hybrid polymeric material may include polymerized monomers comprising an inorganic silicon-based group, for example, a silsesquioxane polymer. A silsesquioxane polymer may be, for example, an alky-silsesquioxane, an aryl-silsesquioxane, or an aryl alkyl-silsesquioxane having the following chemical structure: $(RSiO_{1.5})_n$, where R is an organic group for example, but not limited to, methyl or phenyl. In some embodiments, an OTP hard-coat layer may comprise a silsesquioxane polymer combined with an organic matrix, for example, SILPLUS manufactured by Nippon Steel Chemical Co., Ltd. In some embodiments, an OTP hard-coat layer may comprise 90 wt % to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In some embodiments, an OTP hard-coat layer composed of an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate. An OTP hard-coat layer may have a coating thickness 413 in a range of 1 µm to 150 µm, including subranges. For example, the coating thickness 413 can be in a range from 10 µm to 140 µm, from 20 µm to 130 µm, 30 µm to 120 µm, from 40 µm to 110 µm, from 50 µm to 100 µm, from 60 µm to 90 µm, 70 µm, 80 µm, 2 µm to 140 µm, from 4 µm to 130 µm, 6 µm to 120 µm, from 8 µm to 110 µm, from 10 µm to 100 µm, from 10 µm to 90 µm, 10 µm, 80 µm, 10 µm, 70 µm, 10 µm, 60 µm, 10 µm, 50 µm, or within a range having any two of these values as endpoints. In some embodiments, an OTP hard-coat layer may be a single monolithic layer. In some embodiments, an OTP hard-coat layer may be an inorganic-organic hybrid polymeric material layer or an organic polymer material layer having a thickness in the range of 80 µm to 120 µm, including subranges. For example, an OTP hard-coat layer comprising an inorganic-organic hybrid polymeric material or an organic polymer material may have a thickness of from 80 µm to 110 µm, 90 µm to 100 µm, or within a range having any two of these values as endpoints. In some embodiments, an OTP hard-coat layer may be an aliphatic or aromatic hexafunctional urethane acrylate material layer having a thickness in the range of 10 µm to 60 µm, including subranges. For example, an OTP hard-coat layer comprising an aliphatic or aromatic hexafunctional urethane acrylate material may have a thickness of 10 µm to 55 µm, 10 µm to 50 µm, 10 µm to 40 µm, 10 µm to 45 µm, 10 µm to 40 µm, 10 µm to 35 µm, 10 µm to 30 µm, 10 µm to 25 µm, 10 µm to 20 µm, or within a range having any two of these values as endpoints.

In some embodiments, the coating 411, if provided, may also comprise one or more of an easy-to-clean coating, a low-friction coating, an oleophobic coating, a diamond-like coating, a scratch-resistant coating, and/or an abrasion-resistant coating. A scratch-resistant coating may comprise an oxynitride, for example, aluminum oxynitride or silicon oxynitride with a thickness of about 500 micrometers or more. In such embodiments, the abrasion-resistant layer may comprise the same material as the scratch-resistant layer. In some embodiments, a low friction coating may comprise a highly fluorinated silane coupling agent, for example, an alkyl fluorosilane with oxymethyl groups pendant on the silicon atom. In such embodiments, an easy-to-clean coating may comprise the same material as the low friction coating. In other embodiments, the easy-to-clean coating may comprise a protonatable group, for example an amine, or an alkyl aminosilane with oxymethyl groups pendant on the silicon atom. In such embodiments, the oleophobic coating may comprise the same material as the easy-to-clean coating. In some embodiments, a diamond-like coating comprises carbon and may be created by applying a high voltage potential in the presence of a hydrocarbon plasma.

As shown in FIG. 4, the backing substrate 421 of embodiments of the disclosure can comprise a first major surface 425 and a second major surface 427 opposite the first major surface 425. A backing thickness 423 can be defined between the first major surface 425 and the second major surface 427. In further embodiments, the backing thickness 423 can be about 5 µm or more, about 10 µm or more, about 25 µm or more, about 125 µm or less, about 100 µm or less, about 75 µm or less, or about 50 µm or less. In further embodiments, the backing thickness 423 can be in a range from about 5 µm to about 125 µm, from about 5 µm to about 100 µm, from about 10 µm to about 100 µm, from about 25 µm to about 100 µm, from about 25 µm to about 75 µm, from about 25 µm to about 50 µm, or any range or subrange therebetween.

In some embodiments, as shown in FIG. 4, the first major surface 425 of the backing substrate 421 can face the fourth major surface 417 of the coating 411. In further embodiments, as shown, the first major surface 425 of the backing substrate 421 can contact (e.g., be bonded to) the fourth major surface 417 of the coating 411. In further embodiments, as shown, the second major surface 427 of the backing substrate 421 can face the third contact surface 255 of the polymer-based portion. In further embodiments, as shown, the second major surface 427 of the backing substrate 421 can face the first surface area 223 of the first portion 221. In further embodiments, as shown, the second major surface 427 of the backing substrate 421 can face the third surface area 233 of the second portion 231. In further embodiments, the backing substrate 421 can be positioned between the fourth major surface 417 of the coating 411 and the third contact surface 255 of the polymer-based portion 241. In further embodiments, although not shown, a backing substrate 421 could be positioned between the coating 411 and the third contact surface 255 in FIG. 5 similar to the arrangement shown in FIG. 4.

In some embodiments, the backing substrate 421 can comprise a glass-based substrate. In some embodiments, the backing substrate 421 can comprise a ceramic-based substrate. In some embodiments, the backing substrate 421 can comprise a polymer-based substrate. In further embodiments, the backing substrate 421 can comprise one or more of an acrylic (e.g., polymethylmethacrylate (PMMA)), an epoxy, silicone, a polyimide, and/or a polyurethane. Examples of epoxies include bisphenol-based epoxy resins, novolac-based epoxies, cycloaliphatic-based epoxies, and glycidylamine-based epoxies. In further embodiments, the backing substrate 421 can comprise one or more of a polyolefin, a polyamide, a polyimide, a halide-containing polymer (e.g., polyvinylchloride or a fluorine-containing polymer), an elastomer, a urethane, phenolic resin, parylene, polyethylene terephthalate (PET), and/or polyether ether ketone (PEEK). Example embodiments of polyolefins include low molecular weight polyethylene (LDPE), high molecular weight polyethylene (HDPE), ultrahigh molecular weight polyethylene (UHMWPE), and polypropylene (PP). Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example embodiments of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene).

In some embodiments, as shown in FIGS. 2-3, the foldable apparatus 101 and 301 can comprise a first substrate 203. In some embodiments, the first substrate 203 comprising the glass-based substrate can be optically transparent. As shown, the first substrate 203 can comprise a first major surface 205 and a second major surface 207 opposite the first major surface 205. As shown, the first major surface 205 can extend along a first plane. The second major surface 207 can extend along a second plane. In some embodiments, as shown, the second plane can be parallel to the first plane. As shown in FIG. 2, a first substrate thickness 209 can be defined between the second major surface 207 and the first major surface 205. In some embodiments, the first substrate thickness 209 may be substantially equal to a minimum distance between the first plane and the second plane. In some embodiments, the first substrate thickness 209 may be substantially uniform across a length 105 of the foldable apparatus (e.g., see FIG. 1) and/or a width 103 of the foldable apparatus (e.g., see FIG. 1). In some embodiments, the first substrate 203 can comprise a glass-based substrate. In some embodiments, the first substrate 203 can comprise a ceramic-based substrate. In some embodiments, when the first substrate 203 comprises a glass-based material and/or a ceramic-based material, the first substrate thickness 209 can be in a range from about 10 μm to about 100 μm, from about 10 μm to about 80, from about 10 μm to about 60 μm, from about 20 μm to about 60 μm, from about 25 μm to about 60 μm, from about 40 μm to about 60 μm, from about 20 μm to about 50 μm, from about 25 μm to about 50 μm, from about 40 μm to about 50 μm, from about 20 μm to about 40 μm, from about 25 μm to about 40 μm, from about 20 μm to about 30 μm, from about 25 μm to about 30 μm, or any range or subrange therebetween. In some embodiments, the first substrate 203 can comprise a polymer-based substrate. In further embodiments, the first substrate 203 can comprise one or more of the materials discussed above for the polymer-based substrate with regards to backing substrate 421. In further embodiments, when the first substrate 203 comprises a polymer-based material, the first substrate thickness 209 can be about 10 μm or more, about 20 μm or more, about 40 μm or more, about 80 μm more, about 125 μm or more, about 500 μm or more, about 2 mm or less, about 1 mm or less, about 500 μm or less, about 125 μm or less, or about, or about 60 μm or less. In some embodiments, the first substrate thickness 209 can be in a range from about 10 μm to about 2 mm, from about 20 μm to about 2 mm, from about 40 μm to about 2 mm, from about 80 μm to about 2 mm, from about 125 μm to about 2 mm, from about 500 μm to about 2 mm. In some embodiments, the first substrate thickness 209 can be in a range from about 20 μm to about 1 mm, from about 40 μm to about 1 mm, from about 80 μm to about 1 mm, from about 125 μm to about 1 mm, from about 500 μm to about 1 mm. In some embodiments, the first substrate thickness 209 can be in a range from about 20 μm to about 500 μm, from about 40 μm to about 500 μm, from about 80 μm to about 500 μm, from about 125 μm to about 500 μm, from about 20 μm to about 125 μm, from about 40 μm to about 125 μm, from about 80 μm to about 125 μm, from about 10 μm to about 60 μm, from about 20 μm to about 60 μm, from about 40 μm to about 60 μm or any range or subrange therebetween.

In some embodiments, as shown in FIG. 2, the first substrate 203 can be disposed over the first portion 221, the second portion 231, and the polymer-based portion 241. In some embodiments, as shown, the first substrate 203 can be disposed over the first surface area 223 of the first portion 221. In further embodiments, as shown, the second major surface 207 of the first substrate 203 can face the first surface area 223 of the first portion 221. In some embodiments, as shown, the first substrate 203 can be disposed over the third surface area 233 of the second portion 231. In further embodiments, as shown, the second major surface 207 of the first substrate 203 can face the third surface area 233 of the second portion 231. In some embodiments, although not shown, a coating can be disposed over the first major surface 205 of the first substrate 203. The coating can comprise one or more of a coating, an easy-to-clean coating, a low-friction coating, an oleophobic coating, a diamond-like coating, a scratch-resistant coating, and/or an abrasion-resistant coating, as discussed above with regards to coating 411.

In some embodiments, as shown in FIGS. 7-8, the foldable apparatus 701 and 801 can comprise an inorganic layer 737 disposed over the polymer-based portion 241. In further embodiments, as shown, the inorganic layer can be disposed over a portion of the first portion 221 and/or a portion of the second portion 231. In further embodiments, as shown, the inorganic layer 737 can comprise a seventh major surface 733 and an eighth major surface 735 opposite the seventh major surface 733. An inorganic layer thickness 739 can be defined between the seventh major surface 733 and the eighth major surface 735. In some embodiments, the inorganic layer thickness 739 can be within one or more of the ranges discussed above for the first substrate thickness 209 of the first substrate and/or the coating thickness 413 of the coating 411. In some embodiments, the inorganic layer thickness 739 can be in a range from about 1 μm to about 70 μm, from about 1 μm to about 60 μm, from about 5 μm to about 60 μm, from about 5 μm to about 50 μm, from about 10 μm to about 50 μm, from about 10 μm to about 30 μm, from about 15 μm to about 30 μm, from about 15 μm to about 20 μm, or any range or subrange therebetween. In some embodiments, the inorganic layer 737 can comprise a glass-based material and/or a ceramic-based material. In further embodiments, the inorganic layer 737 can comprise one or more ceramic oxides (e.g., zirconia, zircon, titania, indium tin oxide, spinel, fused quartz), ceramic nitrides (e.g., silicon nitride, tungsten nitride), inorganic oxynitrides (e.g., silicon oxynitride, aluminum oxynitride, a SiAlON), or combinations thereof. In some embodiments, the inorganic layer 737 can comprise quartz, diamond, a diamond-like coating, sapphire, fused silica, or combinations thereof. An exemplary embodiment of the inorganic layer 737 is a 30 μm thick piece of sapphire.

In some embodiments, as shown in FIGS. 7-8, the eighth major surface 735 of the inorganic layer can be disposed over the first surface area 223 of the first portion 221 and/or the third surface area 233 of the second portion 231. In further embodiments, as shown in FIG. 8, the eighth major surface 735 of the inorganic layer 737 can contact the third contact surface 255 of the polymer-based portion 241. In even further embodiments, as shown in FIG. 8, the eighth major surface 735 of the inorganic layer 737 can contact the first surface area 223 of the first portion 221 and/or the third surface area 233 of the second portion 231. In further embodiments, as shown in FIG. 7, the eighth major surface 735 of the inorganic layer 737 can contact the first adhesive layer 211 (e.g., first contact surface 213). In further embodiments, as shown in FIGS. 7-8, the eighth major surface 735 can comprise a planar surface. In some embodiments, although not shown, the polymer-based portion 241 can extend into (e.g., replace) the first adhesive layer 211 shown in FIG. 7, for example, such that the third contact surface 255 of the polymer-based portion may contact the eighth major surface 735 of the inorganic layer 737.

In some embodiments, as shown in FIGS. 7-8, the seventh major surface 733 of the inorganic layer 737 can be coplanar with the first outer surface 751 of the first portion 221 and/or the second outer surface 753 of the second portion 231. In further embodiments, as shown, the first portion 221 can comprise the first outer surface 751 that stands proud from the first surface area 223 by a recess depth 749, and/or the second portion 231 can comprise the second outer surface 753 that stands proud from the third surface area 233 by the recess depth 749. In even further embodiments, as shown, the first outer surface 751, the second outer surface 753, and/or the seventh major surface 733 can comprise planar surfaces. In even further embodiments, as shown in FIG. 8, the recess depth 749 can be substantially equal to the inorganic layer thickness 739. In even further embodiments, as shown in FIG. 7, the recess depth 749 can be substantially equal to the sum of the first adhesive thickness 217 and the inorganic layer thickness 739. In even further embodiments, as shown in FIGS. 7-8, the first portion 221 can comprise the first outer edge surface 741 defined between the first outer surface 751 and the first surface area 223 and/or the second portion 231 can comprise the second outer edge surface 743 defined between the second outer surface 753 and the third surface area 233. In still further embodiments, as shown, the inorganic layer 737 can be positioned between the first outer edge surface 741 and the second outer edge surface 743. In yet further embodiments, as shown, the inorganic layer 737 can contact the first outer edge surface 741 and the second outer edge surface 743. Although not shown, in some embodiments, the adhesive layer can extend between the inorganic layer and the first outer edge surface and/or the second outer edge surface. Providing a seventh major surface of the inorganic layer that is substantially coplanar with the first outer surface of the first portion and the second outer surface of the second portion can enable a smooth surface of the foldable apparatus that can reduce optical distortions and/or enable a perceived continuous surface for a user of the foldable apparatus.

As shown in FIGS. 7-8, an inorganic layer width 755 of the inorganic layer 737 can be defined in the direction 106 of the length 105 of the foldable apparatus 701. In some embodiments, as shown, the inorganic layer width 755 can be greater than the minimum distance 243 between the first portion 221 and the second portion 231. In some embodiments, the inorganic layer width 755 as a percentage of the minimum distance 243 can be about 100% or more, about 105% or more, about 110% or more, about 120% or more, about 130% or more, or about 140% or more, about 500% or less, about 300% or less, about 200% or less, about 180% or less, about 160% or less, about 150% or less, or about 140% or less. In some embodiments, the inorganic layer width 755 as a percentage of the minimum distance 243 can be in a range from about 100% to about 500%, from about 100% to about 300%, from about 100% to about 200%, from about 105% to about 200%, from about 105% to about 180%, from about 110% to about 180%, from about 110% to about 160%, from about 120% to about 160%, from about 120% to about 150%, from about 130% to about 150%, from about 130% to about 140%, or any range or subrange therebetween. In some embodiments, the inorganic layer width 755 can be about 5 mm or more, about 10 mm or more, about 20 mm or more, about 30 mm or more, about 40 mm or more, about 200 mm or less, about 100 mm or less, about 80 mm or less, about 60 mm or less, or about 50 mm or less. In some embodiments, the inorganic layer width 755 can be in a range from about 5 mm to about 200 mm, from about 5 mm to about 100 mm, from about 10 mm to about 100 mm, from about 10 mm to about 80 mm, from about 20 mm to about 80 mm, from about 20 mm to about 60 mm, from about 30 mm to about 60 mm, from about 30 mm to about 50 mm, from about 40 mm to about 50 mm, or any range or subrange therebetween. Providing an inorganic layer disposed over the polymer-based portion can increase the impact resistance and/or puncture resistance of the foldable apparatus.

As shown in FIGS. 2-4 and 6-7, the foldable apparatus 101, 301, 401, 601, and 701 can comprise a first adhesive layer 211. As shown, the first adhesive layer 211 can comprise a first contact surface 213 and a second contact surface 215 opposite the first contact surface 213. In some embodiments, as shown in FIGS. 2-4 and 6-7, the second contact surface 215 of the first adhesive layer 211 can comprise a planar surface. A first adhesive thickness 217 of the first adhesive layer 211 can be defined between the first contact surface 213 and the second contact surface 215. In some embodiments, the first adhesive thickness 217 of the first adhesive layer 211 can be about 1 μm or more, about 5 μm or more, about 10 μm or more, about 100 μm or less, about 60 μm or less, about 30 μm or less, or about 20 μm or less. In some embodiments, the first adhesive thickness 217 of the first adhesive layer 211 can be in a range from about 1 μm to about 100 μm, from about 5 μm to about 100 μm, from about 10 μm to about 100 μm, from about 1 μm to about 60 μm, from about 5 μm to about 60 μm, from about 10 μm to about 60 μm, from about 1 μm to about 30 μm, from about 5 μm to about 30 μm, from about 10 μm to about 30 μm, from about 1 μm to about 20 μm, from about 5 μm to about 20 μm, from about 10 μm to about 20 μm, or any range or subrange therebetween. In further embodiments, as demonstrated in Examples II-JJ, providing a first adhesive thickness 217 of about 5 μm or less (e.g., from about 1 μm to about 5 μm) can reduce (e.g., mitigate, delay, eliminate)

the onset of mechanical instabilities in folding. In some embodiments, a second adhesive thickness 537 of the second adhesive layer 507 (see FIGS. 7-8) and/or a third adhesive thickness 727 of the third adhesive layer 717 (see FIG. 7) can be within one or more of the ranges discussed above in this paragraph with reference to the first adhesive thickness 217.

In some embodiments, as shown in FIGS. 2-3, the first contact surface 213 of the first adhesive layer 211 can face the second major surface 207 of the first substrate 203. In further embodiments, as shown, the first contact surface 213 of the first adhesive layer 211 can contact the second major surface 207 of the first substrate 203. In some embodiments, as shown in FIGS. 4 and 6, the first contact surface 213 of the first adhesive layer 211 can face the coating 411. In further embodiments, the first contact surface 213 can face the fourth major surface 417 of the coating 411. In even further embodiments, as shown in FIG. 6, the first contact surface 213 of the first adhesive layer 211 can contact the fourth major surface 417 of the coating 411. In even further embodiments, as shown in FIG. 4, the backing substrate 421 can be positioned between the coating 411 and the first adhesive layer 211. In even further embodiments, as shown, the first contact surface 213 of the first adhesive layer 211 can face the second major surface 427 of the backing substrate 421. In even further embodiments, the first contact surface 213 of the first adhesive layer 211 can contact the second major surface 427 of the backing substrate 421. In some embodiments, as shown in FIG. 7, the first contact surface 213 of the first adhesive layer 211 can face the eighth major surface 735 of the inorganic layer 737. In further embodiments, as shown, the first contact surface 213 of the first adhesive layer 211 can contact the eighth major surface 735 of the inorganic layer 737.

The first adhesive layer 211 will now be described with reference to the foldable apparatus 101 of FIG. 2 with the understanding that such description of the first adhesive layer 211 can also apply to the foldable apparatus 301, 401, 601, and/or 701 and/or foldable test apparatus 901 illustrated in FIGS. 3-4, 6-7, and 10. In some embodiments, as shown in FIG. 2, the second contact surface 215 of the first adhesive layer 211 can face the first surface area 223 of the first portion 221. In further embodiments, as shown, the second contact surface 215 of the first adhesive layer 211 can contact the first surface area 223 of the first portion 221. In some embodiments, as shown, the second contact surface 215 of the first adhesive layer 211 can face the third surface area 233 of the second portion 231. In further embodiments, as shown, the second contact surface 215 of the first adhesive layer 211 can contact the third surface area 233 of the second portion 231. In some embodiments, as shown, the second contact surface 215 of the first adhesive layer 211 can face the third contact surface 255 of the polymer-based portion 241. In further embodiments, as shown, the second contact surface 215 of the first adhesive layer 211 can contact the third contact surface 255 of the polymer-based portion 241. In even further embodiments, as shown, the first adhesive layer 211 may occupy a central region 219 defined by dashed portions 253a-c and the second major surface 207 of the first substrate 203. In some embodiments, as indicated by the dashed lines in FIG. 2, although not shown, the polymer-based portion 241 may occupy a central region 219. In further embodiments, the third contact surface 255 may be defined by the dashed portions 253a, 253c and a portion of the polymer-based portion 241 facing the second major surface 207 of the first substrate 203. For example, in some embodiments, the third contact surface 255 of the polymer-based portion 241 can face the first adhesive layer 211 via portions 253a and 253c while simultaneously facing the second major surface 207 of the first substrate 203. In some embodiments, as shown in FIG. 5, the first adhesive layer 211 may not be present and instead the polymer-based portion 241 may occupy the region occupied by the first adhesive layer 211 shown in FIGS. 2-4 and 6. In some embodiments, although not shown in FIG. 4, the region occupied by the first adhesive layer 211 can comprise the same material as the polymer-based portion 241, for example, by extending the polymer-based portion 241 to occupy the region shown as occupied by the first adhesive layer 211 or by choosing a first adhesive layer 211 comprising the same material as the polymer-based portion 241. In some embodiments, as shown in FIGS. 5 and 8, the first adhesive layer 211 may not be present.

In some embodiments, the first adhesive layer 211 can comprise one or more of a polyolefin, a polyamide, a halide-containing polymer (e.g., polyvinylchloride or a fluorine-containing polymer), an elastomer, a urethane, phenolic resin, parylene, polyethylene terephthalate (PET), and/or polyether ether ketone (PEEK). Example embodiments of polyolefins include low molecular weight polyethylene (LDPE), high molecular weight polyethylene (HDPE), ultra-high molecular weight polyethylene (UHMWPE), and polypropylene (PP). Example embodiments of fluorine-containing polymers include polytetrafluoroethylene (PTFE), polyvinylfluoride (PVF), polyvinylidene fluoride (PVDF), perfluoropolyether (PFPE), perfluorosulfonic acid (PFSA), a perfluoroalkoxy (PFA), fluorinated ethylene propylene (FEP) polymers, and ethylene tetrafluoro ethylene (ETFE) polymers. Example embodiments of elastomers include rubbers (e.g., polybutadiene, polyisoprene, chloroprene rubber, butyl rubber, nitrile rubber) and block copolymers (e.g., styrene-butadiene, high-impact polystyrene, poly(dichlorophosphazene). In further embodiments, the first adhesive layer 211 can comprise an optically clear adhesive. In further embodiments, the first adhesive layer 211 can comprise an optically clear adhesive. In even further embodiments, the optically clear adhesive can comprise one or more optically transparent polymers: an acrylic (e.g., polymethylmethacrylate (PMMA)), an epoxy, silicone, and/or a polyurethane. Examples of epoxies include bisphenol-based epoxy resins, novolac-based epoxies, cycloaliphatic-based epoxies, and glycidylamine-based epoxies. In even further embodiments, the optically clear adhesive can comprise, but is not limited to, acrylic adhesives, for example, 3M 8212 adhesive, or an optically transparent liquid adhesive, for example, a LOCTITE optically transparent liquid adhesive. Exemplary embodiments of optically clear adhesives comprise transparent acrylics, epoxies, silicones, and polyurethanes. For example, the optically transparent liquid adhesive could comprise one or more of LOCTITE AD 8650, LOCTITE AA 3922, LOCTITE EA E-05MR, LOCTITE UK U-09LV, which are all available from Henkel.

As shown in FIGS. 5-8, the second adhesive layer 507 can comprise a fifth contact surface 513 and sixth contact surface 511 opposite the fifth contact surface 513. A second adhesive thickness 537 can be defined between the fifth contact surface 513 and the sixth contact surface 511. In some embodiments, the second adhesive thickness 537 can be within one or more of the ranges discussed above with regards to the first adhesive thickness 217 of the first adhesive layer 211. In further embodiments, the second adhesive thickness 537 can be substantially equal to the first adhesive thickness 217. In some embodiments, the second adhesive layer 507 can comprise one or more of the materials discussed above with regards to the first adhesive layer 211. In further embodiments, the second adhesive layer 507 can comprise the same material(s) and/or composition as the first adhesive layer 211.

In some embodiments, as shown in FIGS. 5-8, the second adhesive layer 507 can be disposed over the second surface area 225 of the first portion 221. In further embodiments, as shown, the fifth contact surface 513 of the second adhesive layer 507 can contact the second surface area 225 of the first portion 221. In some embodiments, as shown, the second adhesive layer 507 can be disposed over the fourth surface area 235 of the second portion 231. In further embodiments, as shown, the fifth contact surface 513 of the second adhesive layer 507 can contact the fourth surface area 235 of the second portion 231. In some embodiments, as shown, the fifth contact surface 513 of the second adhesive layer 507 can contact the fourth contact surface 257 of the polymer-based portion 241. In further embodiments, as shown, the second adhesive layer 507 can occupy: a central region 517 defined by dashed portions 509a-c and the second major surface 505 of the release liner 503 (see FIG. 5); the central region 517 defined by dashed portions 509a-c and the second major surface 605 of the display device 603 (see FIGS. 6 and 8); and/or the central region 517 defined by the dashed portions 509a-c and the fifth major surface 705 of the second substrate 703 (see FIG. 7). In some embodiments, as shown in FIGS. 5-8, the fourth contact surface 257 of the polymer-based portion 241 can face the second adhesive layer 507. In further embodiments, although not shown in FIGS. 5-8, the polymer-based portion 241 can occupy the central region 517, wherein the fourth contact surface 257 can be defined about the central region 517 and can face (e.g., contact) the dashed portions 509a and 509c of the second adhesive layer 507 while also facing (e.g., contacting) a portion of the second major surface 505 of the release liner 503 (e.g., see FIG. 5), facing (e.g., contacting) a portion of the second major surface 605 of the display device 603 (e.g., see FIGS. 6 and 8), and/or facing (e.g., contacting) a portion of the fifth major surface 705 of the second substrate 703 (See FIG. 7). In further embodiments, although not shown in FIGS. 5-8, the region occupied by the second adhesive layer 507 can comprise the same material as the polymer-based portion 241, for example, by extending the polymer-based portion 241 to occupy the region shown as occupied by the second adhesive layer 507 or by choosing a second adhesive layer 507 comprising the same material as the polymer-based portion 241.

In some embodiments, as shown in FIG. 7, the foldable apparatus 701 can comprise the second substrate 703. In further embodiments, as shown, the second substrate 703 can be disposed over the second adhesive layer 507. In even further embodiments, as shown, the second substrate 703 can directly contact (e.g., be bonded to) the sixth contact surface 511 of the second adhesive layer 507. In even further embodiments, the second substrate 703 can contact the fourth contact surface 257 of the polymer-based portion 241, for example, when the polymer-based portion occupies the central region 517. The second substrate 703 can comprise a fifth major surface 705 and a sixth major surface 715 opposite the fifth major surface 705. A second substrate thickness 707 can be defined between the fifth major surface 705 and the sixth major surface 715. In some embodiments, the second substrate thickness 707 can be within one or more of the ranges discussed above with reference to the first substrate thickness 209. In some embodiments, as shown, the fifth major surface 705 can comprise a planar surface and/or the sixth major surface 715 can comprise a planar surface. In some embodiments, as shown, the second substrate 703 can be disposed on the second adhesive layer 507 by attaching the sixth contact surface 511 of the second adhesive layer 507 to the fifth major surface 705 of the second substrate 703.

In further embodiments, as shown in FIG. 7, the foldable apparatus 701 can comprise the third adhesive layer 717 disposed over the second substrate 703. As shown, the third adhesive layer 717 can comprise a seventh contact surface 721 and an eighth contact surface 719 opposite the seventh contact surface 721. A third adhesive thickness 727 can be defined between the seventh contact surface 721 and the eighth contact surface 719. In some embodiments, the third adhesive thickness 727 can be within one or more of the range discussed above with reference to the first adhesive thickness 217 and/or the second adhesive thickness 537. In some embodiments, the third adhesive layer 717 can comprise one or more of the materials discussed above with reference to the first adhesive layer 211. In some embodiments, as shown, the eighth contact surface 719 can face (e.g., contact) the sixth major surface 715 of the second substrate 703. In some embodiments, as shown, the eighth contact surface 719 can comprise a planar surface and/or the sixth major surface 715 of the second substrate 703 can comprise a planar surface. In some embodiments, as shown, the seventh contact surface 721 can face (e.g., contact) second major surface 605 of the display device 603. In some embodiments, as shown, the seventh contact surface 721 can comprise a planar surface and/or the second major surface 605 of the display device 603 can comprise a planar surface.

In some embodiments, as shown in FIG. 5, the foldable apparatus 501 can comprise the release liner 503 although other substrates (e.g., second substrate 703 discussed above, another substrate similar or identical to the first substrate 203 discussed throughout the application) may be used in further embodiments rather than the illustrated release liner 503. In further embodiments, as shown, the release liner 503, or other substrate, can be disposed over the second adhesive layer 507. In even further embodiments, as shown, the release liner 503, or other substrate, can directly contact (e.g., be bonded to) the sixth contact surface 511 of the second adhesive layer 507. In even further embodiments, the release liner 503, or other substrate, can contact the fourth contact surface 257 of the polymer-based portion 241, for example, when the polymer-based portion occupies the central region 517. The release liner 503, or other substrate, can comprise a first major surface 515 and a second major surface 505 opposite the first major surface 515. As shown, the release liner 503, or other substrate, can be disposed on the second adhesive layer 507 by attaching the sixth contact surface 511 of the second adhesive layer 507 to the second major surface 505 of the release liner 503, or other substrate. In some embodiments, as shown, the first major surface 515 of the release liner 503, or other substrate, can comprise a planar surface. In some embodiments, as shown, the second major surface 505 of the release liner 503, or other substrate, can comprise a planar surface. In further embodiments, although not shown, the release liner can be disposed over the second substrate and/or the third adhesive layer similar to the display device shown in FIG. 7. A foldable apparatus comprising the release liner 503 can comprise a paper and/or a polymer. Exemplary embodiments of paper comprise kraft paper, machine-finished paper, polycoated paper (e.g., polymer-coated, glassine paper, siliconized paper), or clay-coated paper. Exemplary embodiments of polymers comprise polyesters (e.g., polyethylene terephthalate (PET)) and polyolefins (e.g., low-density polyethylene (LDPE), high-density polyethylene (HDPE), polypropylene (PP)).

In some embodiments, as shown in FIGS. 6-8, the foldable apparatus 601 can comprise a display device 603. In further embodiments, as shown in FIGS. 6-8, the display device 603 can be disposed over the second adhesive layer 507. In further embodiments, as shown in FIGS. 6 and 8, the display device 603 can contact (e.g., be bonded to) to the sixth contact surface 511 of the second adhesive layer 507. In further embodiments, as shown in FIGS. 6-8, the display device 603 can be disposed over the polymer-based portion 241 (e.g., fourth contact surface 257). In even further embodiments, although not shown, the display device 603 can contact the fourth contact surface 257 of the polymer-based portion 241, for example, if the display device was attached to the fourth contact surface 257 of the polymer-based portion 241 shown in FIG. 4. In some embodiments, producing the foldable apparatus 601 may be achieved by removing the release liner 503 (e.g., of the foldable apparatus 501 of FIG. 5) and attaching the display device 603 to the sixth contact surface 511 of the second adhesive layer 507. Alternatively, the foldable apparatus 601 may be produced without the extra step of removing a release liner 503 before attaching the display device 603 to the sixth contact surface 511 of the second adhesive layer 507, for example, when a release liner 503 is not applied to the sixth contact surface 511 of the second adhesive layer 507. The display device 603 can comprise a first major surface 615 and a second major surface 605 opposite the first major surface 615. In some embodiments, as shown in FIGS. 6 and 8, the display device 603 can be disposed on the second adhesive layer 507 by attaching the sixth contact surface 511 of the second adhesive layer 507 to the second major surface 605 of the display device 603. In some embodiments, as shown in FIG. 7, the display device 603 can be disposed over the second substrate 703, for example, with the second major surface 605 of the display device 603 facing the sixth major surface 715 of the second substrate 703. In further embodiments, as shown in FIG. 7, the display device 603 can be disposed on the third adhesive layer 717 by attaching the seventh contact surface 721 of the third adhesive layer 717 to the second major surface 605 of the display device 603. In some embodiments, as shown, the first major surface 615 of the display device 603 can comprise a planar surface. In some embodiments, as shown, the second major surface 605 of the display device 603 can comprise a planar surface. The display device 603 can comprise a liquid crystal display (LCD), an electrophoretic displays (EPD), an organic light emitting diode (OLED) display, or a plasma display panel (PDP). In some embodiments, the display device 603 can be part of a portable electronic device, for example, a consumer electronic product, a smartphone, a tablet, a wearable device, or a laptop. A consumer electronic product may include a housing comprising a front surface, a back surface, and side surfaces. The consumer electronic product can comprise electrical components at least partially within the housing. The electrical components can comprise a controller, a memory, and a display. The display can be at or adjacent to the front surface of the housing. The foldable apparatus can comprise a cover substrate disposed over the display, wherein at least one of a portion of the housing or the cover substrate comprises the foldable apparatus described herein.

In some embodiments, the first portion 221 and/or the second portion 231 can comprise glass-based portions and/or ceramic-based portions, as described above. In further embodiments, the first portion 221 comprises a first glass-based portion and the second portion 231 comprises a second glass-based portion. In further embodiments, the first portion 221 comprises a first ceramic-based portion and the second portion 231 comprises a second ceramic-based portion. In some embodiments, one or more portions of the first portion and/or second portion may comprise a compressive stress region. In some embodiments, the first substrate 203, if present, may comprise a compressive stress region. In some embodiments, the backing substrate 421, if present, may comprise a compressive stress region. In some embodiments, the second substrate, if present, may comprise a compressive stress region.

In some embodiments, the compressive stress region may be created by chemically strengthening. Chemically strengthening may comprise an ion exchange process, where ions in a surface layer are replaced by—or exchanged with—larger ions having the same valence or oxidation state. Methods of chemically strengthening will be discussed later. Without wishing to be bound by theory, chemically strengthening the first portion 221, the second portion 231, the first substrate 203, the backing substrate 421, and/or the second substrate 703 can enable good impact resistance and/or good puncture resistance (e.g., resists failure for a pen drop height of 10 centimeters (cm) or more, 15 cm or more, 20 cm or more, or even 50 cm). Without wishing to be bound by theory, chemically strengthening the first portion 221, the second portion 231, the first substrate 203, the backing substrate 421, and/or the second substrate 703 can enable small (e.g., smaller than about 10 mm or less) bend radii because the compressive stress from the chemical strengthening can counteract the bend-induced tensile stress on the outermost surface of the substrate. A compressive stress region may extend into a portion of the first portion and/or second portion for a depth called the depth of compression. As used herein, depth of compression means the depth at which the stress in the chemically strengthened substrates and/or portions described herein changes from compressive stress to tensile stress. Depth of compression may be measured by a surface stress meter or a scattered light polariscope (SCALP, wherein values reported herein were made using SCALP-5 made by Glasstress Co., Estonia) depending on the ion exchange treatment and the thickness of the article being measured. Where the stress in the substrate and/or portion is generated by exchanging potassium ions into the substrate, a surface stress meter, for example, the FSM-6000 (Orihara Industrial Co., Ltd. (Japan)), is used to measure depth of compression. Unless specified otherwise, compressive stress (including surface CS) is measured by surface stress meter (FSM) using commercially available instruments, for example the FSM-6000, manufactured by Orihara. Surface stress measurements rely upon the accurate measurement of the stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Where the stress is generated by exchanging sodium ions into the substrate, and the article being measured is thicker than about 400 µm, SCALP is used to measure the depth of compression and central tension (CT). Where the stress in the substrate and/or portion is generated by exchanging both potassium and sodium ions into the substrate and/or portion, and the article being measured is thicker than about 400 µm, the depth of compression and CT are measured by SCALP. Without wishing to be bound by theory, the exchange depth of sodium may indicate the depth of compression while the exchange depth of potassium ions may indicate a change in the magnitude of the compressive stress (but not the change in stress from compressive to tensile). The refracted near-field (RNF; the RNF method is described in U.S. Pat. No. 8,854,623, entitled "Systems and methods for measuring a profile characteristic of a glass sample", which is incorporated herein by reference in its entirety) method also may be used to derive a graphical representation of the stress profile. When the RNF method is utilized to derive a graphical representation of the stress profile, the maximum central tension value provided by SCALP is utilized in the RNF method. The graphical representation of the stress profile derived by RNF is force balanced and calibrated to the maximum central tension value provided by a SCALP measurement. As used herein, "depth of layer" means the depth that the ions have exchanged into the substrate and/or portion (e.g., sodium, potassium). Through the disclosure, when the maximum central tension cannot be measured directly by SCALP (as when the article being measured is thinner than about 400 µm) the maximum central tension can be approximated by a product of a maximum compressive stress and a depth of compression divided by the difference between the thickness of the substrate and twice the depth of compression, wherein the compressive stress and depth of compression are measured by FSM.

In some embodiments, the first portion 221 comprising the first glass-based portion and/or ceramic-based portion may comprise a first compressive stress region at the first surface area 223 that can extend to a first depth of compression from the first surface area 223. In further embodiments, the first compressive stress region can comprise the first edge surface 229 and extend from the first edge surface 229 to the first depth of compression. In some embodiments, the first portion 221 comprising a first glass-based and/or ceramic-based portion may comprise a second compressive stress region at the second surface area 225 that can extend to a second depth of the compression from the second surface area 225. In further embodiments, the second compressive stress region can comprise the first edge surface 229 and extend from the first edge surface 229 to the second depth of compression. In some embodiments, the first depth of compression and/or the second depth of compression as a percentage of the first thickness 227 can be about 1% or more, about 5% or more, about 10% or more, about 30% or less, about 25% or less, or about 20% or less. In some embodiments, the first depth of compression and/or the second depth of compression as a percentage of the first thickness 227 can be in a range from about 1% to about 30%, from about 1% to about 25%, from about 5% to about 25%, from about 5% to about 20%, from about 10% to about 20%, or any range or subrange therebetween. In further embodiments, the first depth of compression can be substantially equal to the second depth of compression. In some embodiments, the first depth of compression and/or the second depth of compression can be about 1 µm or more, about 10 µm or more, about 50 µm or more, about 200 µm or less, about 150 µm or less, or about 100 µm or less. In some embodiments, the first depth of compression and/or the second depth of compression can be in a range from about 1 µm to about 200 µm, from about 1 µm to about 150 µm, from about 10 µm to about 150 µm, from about 10 µm to about 100 µm, from about 50 µm to about 100 µm, or any range or subrange therebetween. By providing a first portion comprising a first glass-based and/or ceramic-based portion comprising a first depth of compression and/or a second depth of compression in a range from about 1% to about 30% of the first thickness, good impact resistance, good puncture resistance, and/or good folding performance can be enabled.

In some embodiments, the first compressive stress region can comprise a first maximum compressive stress. In some embodiments, the second compressive stress region can comprise a second maximum compressive stress. In further embodiments, the first maximum compressive stress and/or the second maximum compressive stress can be about 100 MegaPascals (MPa) or more, about 200 MPa or more, about 300 MPa or more, about 400 MPa or more, about 500 MPa or more, about 600 MPa or more, about 700 MPa or more, about 1,500 MPa or less, about 1,200 MPa or less, about 1,000 MPa or less, about 600 MPa or less, or about 400 MPa or less. In further embodiments, the first maximum compressive stress and/or the second maximum compressive stress can be in a range from about 100 MPa to about 1,500 MPa, from about 100 MPa to about 1,200 MPa, from about 100 MPa to about 1,100 MPa, from about 100 MPa to about 1,000 MPa, from about 100 MPa to about 900 MPa, from about 100 MPa to about 800 MPa, from about 100 MPa to about 700 MPa, from about 100 MPa to about 600 MPa, from about 100 MPa to about 500 MPa, from about 100 MPa to about 400 MPa, from about 100 MPa to about 300 MPa, from about 100 MPa to about 200 MPa. In some embodiments, the first maximum compressive stress and/or the second maximum compressive stress can be in a range from about 100 MPa to about 1,500 MPa, from about 200 MPa to about 1,500 MPa, from about 200 MPa to about 1,200 MPa, from about 300 MPa to about 1,200 MPa, from about 300 MPa to about 1,000 MPa, from about 700 MPa to about 1,000 MPa, from about 700 MPa to about 900 MPa, or any range or subrange therebetween. By providing a first maximum compressive stress and/or a second maximum compressive stress in a range from about 100 MPa to about 1,500 MPa, good impact resistance, good puncture resistance, and/or good folding performance can be enabled.

In some embodiments, the second portion 231 comprising a second glass-based and/or ceramic-based portion may comprise a third compressive stress region at the third surface area 233 that can extend to a third depth of compression from the third surface area 233. In further embodiments, the third compressive stress region can comprise the second edge surface 239 and extend from the second edge surface 239 to the third depth of compression. In some embodiments, the second portion 231 comprising a second glass-based and/or ceramic-based portion may comprise a fourth compressive stress region at the fourth surface area 235 that can extend to a fourth depth of the compression from the fourth surface area 235. In further embodiments, the fourth compressive stress region can comprise the second edge surface 239 and extend from the second edge surface 239 to the fourth depth of compression. In some embodiments, the third depth of compression and/or the fourth depth of compression as a percentage of the second thickness 237 can be about 1% or more, about 5% or more, about 10% or more, about 30% or less, about 25% or less, or about 20% or less. In some embodiments, the third depth of compression and/or the fourth depth of compression as a percentage of the second thickness 237 can be in a range from about 1% to about 30%, from about 1% to about 25%, from about 5% to about 25%, from about 5% to about 20%, from about 10% to about 20%, or any range or subrange therebetween. In further embodiments, the third depth of compression can be substantially equal to the fourth depth of compression. In some embodiments, the third depth of compression and/or the fourth depth of compression can be about 1 µm or more, about 10 µm or more, about 50 µm or more, about 200 µm or less, about 150 µm or less, or about 100 µm or less. In some embodiments, the first depth of compression and/or the second depth of compression can be in a range from about 1 µm to about 200 µm, from about 1 µm to about 150 µm, from about 10 µm to about 150 µm, from about 10 µm to about 100 µm, from about 50 µm to about 100 µm, or any range or subrange therebetween. By providing a second portion comprising a glass-based and/or ceramic-based portion comprising a third depth of compression and/or a fourth depth of compression in a range from about 1% to about 30% of the first thickness, good impact resistance, good puncture resistance, and/or good folding performance can be enabled.

In some embodiments, the third compressive stress region can comprise a third maximum compressive stress. In some embodiments, the fourth compressive stress region can comprise a fourth maximum compressive stress. In further embodiments, the third maximum compressive stress and/or the fourth maximum compressive stress can be about 100 MegaPascals (MPa) or more, about 200 MPa or more, about 300 MPa or more, about 400 MPa or more, about 500 MPa or more, about 600 MPa or more, about 700 MPa or more, about 1,500 MPa or less, about 1,200 MPa or less, about 1,000 MPa or less, about 600 MPa or less, or about 400 MPa or less. In further embodiments, the third maximum compressive stress and/or the fourth maximum compressive stress can be in a range from about 100 MPa to about 1,500 MPa, from about 100 MPa to about 1,200 MPa, from about 100 MPa to about 1,100 MPa, from about 100 MPa to about 1,000 MPa, from about 100 MPa to about 900 MPa, from about 100 MPa to about 800 MPa, from about 100 MPa to about 700 MPa, from about 100 MPa to about 600 MPa, from about 100 MPa to about 500 MPa, from about 100 MPa to about 400 MPa, from about 100 MPa to about 300 MPa, from about 100 MPa to about 200 MPa. In some embodiments, the third maximum compressive stress and/or the fourth maximum compressive stress can be in a range from about 100 MPa to about 1,500 MPa, from about 200 MPa to about 1,500 MPa, from about 200 MPa to about 1,200 MPa, from about 300 MPa to about 1,200 MPa, from about 300 MPa to about 1,000 MPa, from about 700 MPa to about 1,000 MPa, from about 700 MPa to about 900 MPa, or any range or subrange therebetween. By providing a third maximum compressive stress and/or a fourth maximum compressive stress in a range from about 100 MPa to about 1,500 MPa, good impact resistance, puncture resistance, and/or good folding performance can be enabled.

In some embodiments, the first depth of compression can be substantially equal to the third depth of compression. In some embodiments, the second depth of compression can be substantially equal to the fourth depth of compression. In some embodiments, the first maximum compressive stress can be substantially equal to the third maximum compressive stress. In some embodiments, the second maximum compressive stress can be substantially equal to the fourth maximum compressive stress.

In some embodiments, the first substrate 203 or the backing substrate 421 can comprise a glass-based and/or ceramic-based substrate, as discussed above. In further embodiments, the first substrate 203 or backing substrate 421 may comprise a fifth compressive stress region at the first major surface 205 or 425 that can extend to a fifth depth of compression from the first major surface 205 or 425. In further embodiments, the first substrate 203 or the backing substrate 421 may comprise a sixth compressive stress region at the second major surface 207 or 427 that can extend to a sixth depth of the compression from the second major surface 207 or 427. In further embodiments, the fifth depth of compression and/or the sixth depth of compression as a percentage of the first substrate thickness 209 or backing thickness 423, respectively, can be about 10% or more, about 15% or more, about 20% or more, about 30% or less, about 25% or less, or about 20% or less. In further embodiments, the fifth depth of compression and/or sixth depth of compression as a percentage of the first substrate thickness 209 or backing thickness 423, respectively, can be in a range from about 10% to about 30%, from about 10% to about 25%, from about 10% to about 20%, from about 15% to about 30%, from about 15% to about 25%, from about 15% to about 20%, from about 20% to about 30%, from about 20% to about 25%, or any range or subrange therebetween. In further embodiments, the fifth depth of compression can be substantially equal to the sixth depth of compression. In further embodiments, the fifth depth of compression and/or the sixth depth of compression can be about 1 µm or more, about 10 µm or more, about 50 µm or more, about 200 µm or less, about 150 µm or less, or about 100 µm or less. In further embodiments, the fifth depth of compression and/or the sixth depth of compression can be in a range from about 1 µm to about 200 µm, from about 1 µm to about 150 µm, from about 10 µm to about 150 µm, from about 10 µm to about 100 µm, from about 50 µm to about 100 µm, or any range or subrange therebetween. By providing a substrate comprising a glass-based and/or ceramic-based substrate comprising a fifth depth of compression and/or a sixth depth of compression in a range from about 1% to about 30% of the first thickness, good impact resistance, good puncture resistance, and/or good folding performance can be enabled. In further embodiments, the fifth compressive stress region can comprise a fifth maximum compressive stress. In some embodiments, the sixth compressive stress region can comprise a sixth maximum compressive stress. In further embodiments, the fifth maximum compressive stress and/or the sixth maximum compressive stress can be about 500 MegaPascals (MPa) or more, about 700 MPa or more, about 1,000 MPa or more about 1,500 MPa or less, about 1,200 MPa or less, about 1,000 MPa or less, about 700 MPa or less. In further embodiments, the fifth maximum compressive stress and/or the sixth maximum compressive stress can be in a range from about 500 MPa to about 1,500 MPa, from about 500 MPa to about 1,200 MPa, from about 500 MPa to about 1,000 MPa, from about 500 MPa to about 900 MPa, from about 500 MPa to about 800 MPa, from about 500 MPa to about 700 MPa, from about 700 MPa to about 1,500 MPa, from about 700 MPa to about 1,200 MPa, from about 700 MPa to about 1,000 MPa, from about 1,000 MPa to about 1,500 MPa, from about 1,000 MPa to about 1,200 MPa, or any range or subrange therebetween. By providing a fifth maximum compressive stress and/or a sixth maximum compressive stress in a range from about 500 MPa to about 1,500 MPa, good impact resistance, good puncture resistance, and/or good folding performance can be enabled.

In some embodiments, the second substrate 703 can comprise a glass-based and/or ceramic-based substrate, as discussed above. In further embodiments, the second substrate 703 may comprise a seventh compressive stress region at the fifth major surface 705 that can extend to a seventh depth of compression from the fifth major surface 705. In further embodiments, the second substrate 703 may comprise an eighth compressive stress region at the sixth major surface 715 that can extend to an eighth depth of the compression from the sixth major surface 715. In further embodiments, the seventh depth of compression and/or the eighth depth of compression as a percentage of the second substrate thickness 707 can be about 10% or more, about 15% or more, about 20% or more, about 30% or less, about 25% or less, or about 20% or less. In further embodiments, the seventh depth of compression and/or eighth depth of compression as a percentage of the second substrate thickness 707 can be in a range from about 1% to about 30%, from about 1% to about 25%, from about 5% to about 25%, from about 5% to about 20%, from about 10% to about 20%, or any range or subrange therebetween. In further embodiments, the seventh depth of compression can be substantially equal to the eighth depth of compression. In further embodiments, the seventh depth of compression and/or the eighth depth of compression can be about 1 μm or more, about 10 μm or more, about 50 μm or more, about 200 μm or less, about 150 μm or less, or about 100 μm or less. In further embodiments, the seventh depth of compression and/or the eighth depth of compression can be in a range from about 1 μm to about 200 μm, from about 1 μm to about 150 μm, from about 10 μm to about 150 μm, from about 10 μm to about 100 μm, from about 50 μm to about 100 μm, or any range or subrange therebetween. By providing a second substrate comprising a glass-based and/or ceramic-based substrate comprising a seventh depth of compression and/or an eighth depth of compression in a range from about 1% to about 30% of the first thickness, good impact resistance and/or good folding performance can be enabled. In further embodiments, the seventh compressive stress region can comprise a seventh maximum compressive stress. In some embodiments, the eighth compressive stress region can comprise an eighth maximum compressive stress. In further embodiments, the seventh maximum compressive stress and/or the eighth maximum compressive stress can be about 500 MegaPascals (MPa) or more, about 700 MPa or more, about 1,000 MPa or more about 1,500 MPa or less, about 1,200 MPa or less, about 1,000 MPa or less, about 700 MPa or less. In further embodiments, the seventh maximum compressive stress and/or the eighth maximum compressive stress can be in a range from about 500 MPa to about 1,500 MPa, from about 500 MPa to about 1,200 MPa, from about 500 MPa to about 1,000 MPa, from about 500 MPa to about 900 MPa, from about 500 MPa to about 800 MPa, from about 500 MPa to about 700 MPa, from about 700 MPa to about 1,500 MPa, from about 700 MPa to about 1,200 MPa, from about 700 MPa to about 1,000 MPa, from about 1,000 MPa to about 1,500 MPa, from about 1,000 MPa to about 1,200 MPa, or any range or subrange therebetween. By providing a seventh maximum compressive stress and/or an eighth maximum compressive stress in a range from about 500 MPa to about 1,500 MPa, good impact resistance and/or good folding performance can be enabled.

In some embodiments, the polymer-based portion 241 can be optically clear. The polymer-based portion 241 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a normal of a surface of the optically clear adhesive. As used herein, the refractive index is measured in accordance with ASTM E1967-19, where the first wavelength comprises 589 nm. In some embodiments, the first refractive index of the polymer-based portion 241 may be about 1 or more, about 1.3 or more, about 1.4 or more, about 1.45 or more, about 1.49 or more, about 3 or less, about 2 or less, about 1.7 or less, about 1.6 or less, or about 1.55 or less. In some embodiments, the first refractive index of the polymer-based portion 241 can be in a range from about 1 to about 3, from about 1 to about 2 from about 1 to about 1.7, from about 1.3 to about 3, from about 1.3 to about 2, from about 1.3 to about 1.7, from about 1.4 to about 2, from about 1.4 to about 1.7, from about 1.45 to about 1.7, from about 1.45 to about 1.6, from about 1.49 to about 1.55, or any range or subrange therebetween.

In some embodiments, the first portion 221 can comprise a second index of refraction. A differential equal to the absolute value of the difference between the second index of refraction of the first portion 221 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the second index of refraction of the first portion 221 may be greater than the first index of refraction of the polymer-based portion 241. In some embodiments, the second index of refraction of the first portion 221 may be less than the first index of refraction of the polymer-based portion 241.

In some embodiments, the second portion 231 can comprise a third index of refraction. In some embodiments, the third refractive index of the second portion 231 can be substantially equal to the second refractive index of the first portion 221, for example, if the first portion 221 and the second portion 231 comprise the same composition. A differential equal to the absolute value of the difference between the third index of refraction of the second portion 231 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the third index of refraction of the second portion 231 may be greater than the first index of refraction of the polymer-based portion 241. In some embodiments, the third index of refraction of the second portion 231 may be less than the first index of refraction of the polymer-based portion 241.

In some embodiments, the first substrate 203 or the backing substrate 421 can comprise a fourth index of refraction. In some embodiments, the fourth refractive index of the first substrate 203 or the backing substrate 421 can be substantially equal to the second refractive index of the first portion 221 and/or the third refractive index of the second portion 231. A differential equal to the absolute value of the difference between the fourth index of refraction of the first substrate 203 or the backing substrate 421 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the fourth index of refraction of the first substrate 203 or the backing substrate 421 may be greater than the first index of refraction of the polymer-based portion 241. In some embodiments, the fourth index of refraction of the first substrate 203 or the backing substrate 421 may be less than the first index of refraction of the polymer-based portion 241.

In some embodiments, the first adhesive layer 211 can comprise a fifth index of refraction in the range specified above for the polymer-based portion 241. A differential equal to the absolute value of the difference between the fifth index of refraction of the first adhesive layer 211 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the fifth index of refraction of the first adhesive layer 211 may be greater than the first index of refraction of the polymer-based portion 241. In some embodiments, the fifth index of refraction of the first adhesive layer 211 may be less than the first index of refraction of the polymer-based portion 241.

A differential equal to the absolute value of the difference between the fifth index of refraction of the first adhesive layer 211 and the second index of refraction of the first portion 221 or the third index of refraction of the second portion 231 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the fifth index of refraction of the first adhesive layer 211 may be greater than the second index of refraction of the first portion 221 and/or the third index of refraction of the second portion 231. In some embodiments, the fifth index of refraction of the first adhesive layer 211 may be less than the second index of refraction of the first portion 221 and/or the third index of refraction of the second portion 231.

A differential equal to the absolute value of the difference between the fifth index of refraction of the first adhesive layer 211 and the fourth index of refraction of the first substrate 203 or the backing substrate 421 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the fifth index of refraction of the first adhesive layer 211 may be greater than the fourth index of refraction of the first substrate 203 or the backing substrate 421. In some embodiments, the fifth index of refraction of the first adhesive layer 211 may be less than the fourth index of refraction of the first substrate 203 or the backing substrate 421.

In some embodiments, the second adhesive layer 507 can comprise a sixth index of refraction in the range specified above for the polymer-based portion 241. A differential equal to the absolute value of the difference between the sixth index of refraction of the second adhesive layer 507 and the second index of refraction of the first portion 221 or the third index of refraction of the second portion 231 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the sixth index of refraction of the second adhesive layer 507 may be greater than the second index of refraction of the first portion 221 and/or the third index of refraction of the second portion 231. In some embodiments, the sixth index of refraction of the second adhesive layer 507 may be less than the second index of refraction of the first portion 221 and/or the third index of refraction of the second portion 231.

A differential equal to the absolute value of the difference between the sixth index of refraction of the second adhesive layer 507 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the sixth index of refraction of the second adhesive layer 507 may be greater than the first index of refraction of the polymer-based portion 241. In some embodiments, the sixth index of refraction of the second adhesive layer 507 may be less than the first index of refraction of the polymer-based portion 241.

A differential equal to the absolute value of the difference between the sixth index of refraction of the second adhesive layer 507 and the fourth index of refraction of the first substrate 203 or the backing substrate 421 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the sixth index of refraction of the second adhesive layer 507 may be greater than the fourth index of refraction of the first substrate 203 or the backing substrate 421. In some embodiments, the sixth index of refraction of the second adhesive layer 507 may be less than the fourth index of refraction of the first substrate 203 or the backing substrate 421.

A differential equal to the absolute value of the difference between the sixth index of refraction of the second adhesive layer 507 and the fifth index of refraction of the first adhesive layer 211 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the sixth index of refraction of the second adhesive layer 507 may be greater than the fifth index of refraction of the first adhesive layer 211. In some embodiments, the sixth index of refraction of the second adhesive layer 507 may be less than the fifth index of refraction of the first adhesive layer 211.

In some embodiments, the second substrate 703 can comprise a seventh index of refraction. In some embodiments, the seventh refractive index of the second substrate 703 can be substantially equal to the second refractive index of the first portion 221 and/or the third refractive index of the second portion 231. In some embodiments, the seventh refractive index of the second substrate 703 can be substantially equal to the fourth refractive index of the first substrate 203 or the backing substrate 421. A differential equal to the absolute value of the difference between the seventh index of refraction of the second substrate 703 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the seventh index of refraction of the second substrate 703 may be greater than the first index of refraction of the polymer-based portion 241. In some embodiments, the seventh index of refraction of the second substrate 703 may be less than the first index of refraction of the polymer-based portion 241.

A differential equal to the absolute value of the difference between the seventh index of refraction of the second substrate 703 and the fifth index of refraction of the first adhesive layer 211 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the seventh index of refraction of the second substrate 703 may be greater than the fifth index of refraction of the first adhesive layer 211. In some embodiments, the seventh index of refraction of the second substrate 703 may be less than the fifth index of refraction of the first adhesive layer 211.

A differential equal to the absolute value of the difference between the seventh index of refraction of the second substrate 703 and the sixth index of refraction of the second adhesive layer 507 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the seventh index of refraction of the second substrate 703 may be greater than the sixth index of refraction of the second adhesive layer 507. In some embodiments, the seventh index of refraction of the second substrate 703 may be less than the sixth index of refraction of the second adhesive layer 507.

In some embodiments, the third adhesive layer 717 can comprise an eighth index of refraction. In some embodiments, the eighth refractive index of the third adhesive layer 717 can be substantially equal to the fifth refractive index of the first adhesive layer 211, the sixth refractive index of the second adhesive layer 507, and/or the first index of refraction of the polymer-based portion 241. A differential equal to the absolute value of the difference between the eighth index of refraction of the third adhesive layer 717 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the eighth index of refraction of the third adhesive layer 717 may be greater than the first index of refraction of the polymer-based portion 241. In some embodiments, the eighth index of refraction of the third adhesive layer 717 may be less than the first index of refraction of the polymer-based portion 241.

A differential equal to the absolute value of the difference between the eighth index of refraction of the third adhesive layer 717 and the second refractive index of the first portion 221, the third refractive index of the second portion 231, the fourth refractive index of the first substrate 203 or the backing substrate 421, and/or the seventh index of refraction of the second substrate 703 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the eighth index of refraction of the third adhesive layer 717 may be greater than the second refractive index of the first portion 221, the third refractive index of the second portion 231, the fourth refractive index of the first substrate 203 or the backing substrate 421, and/or the seventh index of refraction of the second substrate 703. In some embodiments, the eighth index of refraction of the third adhesive layer 717 may be less than the second refractive index of the first portion 221, the third refractive index of the second portion 231, the fourth refractive index of the first substrate 203 or the backing substrate 421, and/or the seventh index of refraction of the second substrate 703.

In some embodiments, the coating 411 can comprise a ninth index of refraction. A differential equal to the absolute value of the difference between the ninth index of refraction of the coating 411 and the first index of refraction of the polymer-based portion 241 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the ninth index of refraction of the coating 411 may be greater than or about equal to the first index of refraction of the polymer-based portion 241. In some embodiments, the ninth index of refraction of the coating 411 may be less than the first index of refraction of the polymer-based portion 241.

A differential equal to the absolute value of the difference between the ninth index of refraction of the coating 411 and the second refractive index of the first portion 221, the third refractive index of the second portion 231, the fourth refractive index of the first substrate 203 or the backing substrate 421, and/or the seventh index of refraction of the second substrate 703 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the ninth index of refraction of the coating 411 may be greater than the second refractive index of the first portion 221, the third refractive index of the second portion 231, the fourth refractive index of the first substrate 203 or the backing substrate 421, and/or the seventh index of refraction of the second substrate 703. In some embodiments, the ninth index of refraction of the coating 411 may be less than the second refractive index of the first portion 221, the third refractive index of the second portion 231, the fourth refractive index of the first substrate 203 or the backing substrate 421, and/or the seventh index of refraction of the second substrate 703.

A differential equal to the absolute value of the difference between the ninth index of refraction of the coating 411 and the fifth refractive index of the first adhesive layer 211, the sixth refractive index of the second adhesive layer 507, and/or the eight refractive index of the third adhesive layer 717 can be about 0.1 or less, about 0.07 or less, about 0.05 or less, about 0.001 or more, about 0.01 or more, or about 0.02 or more. In some embodiments, the differential is in a range from about 0.001 to about 0.1, from about 0.001 to about 0.07, from about 0.001 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween. In some embodiments, the ninth index of refraction of the coating 411 may be greater than or about equal to the fifth refractive index of the first adhesive layer 211, the sixth refractive index of the second adhesive layer 507, and/or the eight refractive index of the third adhesive layer 717. In some embodiments, the ninth index of refraction of the coating 411 may be less than the fifth refractive index of the first adhesive layer 211, the sixth refractive index of the second adhesive layer 507, and/or the eight refractive index of the third adhesive layer 717.

FIGS. 9-10 schematically illustrate some embodiments of a foldable test apparatus 901 in accordance with embodiments of the disclosure in a folded configuration. As shown, the foldable test apparatus 901 is folded such that the first major surface 205 of the first substrate 203 is on the inside of the folded foldable test apparatus 901. In both FIGS. 9-10, a user would view the display device 603 through the first substrate 203 and, thus, would be positioned on the side of the first major surface 205. In some embodiments, although not shown in a folded configuration, a foldable apparatus similar to FIG. 5 can comprise a coating 411 disposed over the polymer-based portion 241, the polymer-based portion disposed over a second substrate (similar to the first substrate 203 in place of release liner 503), and the second substrate disposed over a display device 603 such that a user would view the display device 603 through the third major surface 419 of the coating 411.

As used herein, "foldable" includes complete folding, partial folding, bending, flexing, or multiple capabilities. As used herein, the terms "fail," "failure" and the like refer to breakage, destruction, delamination, or crack propagation. A foldable apparatus achieves an effective bend radius of "X," or has an effective bend radius of "X," or comprises an effective bend radius of "X" if it resists failure when the foldable apparatus is held at "X" radius for 24 hours at about 85° C. and about 85% relative humidity. Likewise, a foldable apparatus achieves a parallel plate distance of "X," or has a parallel plate distance of "X," or comprises a parallel plate distance of "X" if it resists failure when the foldable apparatus is held at a parallel plate distance of "X" for 24 hours at about 85° C. and about 85% relative humidity.

As used herein, the "effective minimum bend radius" and "parallel plate distance" of a foldable apparatus is measured with the following test configuration and process using a parallel plate apparatus 1001 (see FIG. 10) that comprises a pair of parallel rigid stainless-steel plates 1003, 1005 comprising a first rigid stainless-steel plate 1003 and a second rigid stainless-steel plate 1005. When measuring the "effective minimum bend radius" or the "parallel plate distance", a test adhesive layer 1009 comprises a thickness of 50 μm between a fifth contact surface 1019 of the test adhesive layer 1009 and a sixth contact surface 1021 of the test adhesive layer 1009. The test adhesive layer comprises an optically clear adhesive comprising an elastic modulus of 0.1 MPa. When measuring the "effective minimum bend radius" or the "parallel plate distance", the test is conducted with a 100 μm thick sheet 1007 of polyethylene terephthalate (PET) rather than the release liner 503 of FIG. 5 or the display device 603 shown in FIGS. 6-8. Thus, during the test to determine the "effective minimum bend radius" or the "parallel plate distance" of a configuration of a foldable apparatus, the foldable test apparatus 901 is produced by using the 100 μm thick sheet 1007 of polyethylene terephthalate (PET) rather than the release liner 503 of FIG. 5 or the display device 603 shown in FIGS. 6-8. When preparing a foldable test apparatus for foldable apparatus 101, 301, or 401 shown in FIGS. 2-4, the sixth contact surface 1021 of the test adhesive layer 1009 is disposed over the second surface area 225 of the first portion 221, the fourth contact surface 257 of the polymer-based portion 241, and the fourth surface area 235 of the second portion, and then the PET sheet 1007 is disposed over the fifth contact surface 1019 of the test adhesive layer 1009. When preparing a foldable test apparatus for the foldable apparatus 501, 601, or 801 shown in FIGS. 5-6 and 8, the second adhesive layer 507 and any release liner 503 or display device 603 disposed thereon is removed and replaced with the test adhesive layer 1009 and the PET sheet 1007, as described above. When preparing a foldable test apparatus for the foldable apparatus 701 shown in FIG. 7, the third adhesive layer 717 and any release liner 503 or display device 603 disposed thereon is removed and replaced with the test adhesive layer 1009 and the PET sheet 1007. The foldable test apparatus of foldable apparatus 701 would still comprise the second adhesive layer 507 and second substrate 703, but the sixth contact surface 1021 of the test adhesive layer 1009 is disposed over the sixth major surface 715 of the second substrate 703. Generally, when preparing the foldable test apparatus 901, the 100 µm thick sheet 1007 of polyethylene terephthalate (PET) is attached to the fifth contact surface 1019 of the test adhesive layer 1009 in an identical manner that the release liner 503 is attached to the sixth contact surface 511 of the second adhesive layer 507 in FIG. 5, the display device 603 is attached to the sixth contact surface 511 of the second adhesive layer 507 in FIGS. 6 and 8, or the display device 603 is attached to the seventh contact surface 721 of the third adhesive layer 717 in FIG. 7. The foldable test apparatus 901 is placed between the pair of parallel rigid stainless-steel plates 1003, 1005 such that the first substrate 203 will be on the inside of the bend, similar to the configuration shown in FIGS. 9-10. For determining a "parallel plate distance", the distance between the parallel plates is reduced at a rate of 50 µm/second until the parallel plate distance 1011 is equal to the "parallel plate distance" to be tested. Then, the parallel plates are held at the "parallel plate distance" to be tested for 24 hours at about 85° C. and about 85% relative humidity. As used herein, the "minimum parallel plate distance" is the smallest parallel plate distance that the foldable apparatus can withstand without failure under the conditions and configuration described above. For determining the "effective minimum bend radius", the distance between the parallel plates is reduced at a rate of 50 µm/second until the parallel plate distance 1011 is equal to twice the "effective minimum bend radius" to be tested. Then, the parallel plates are held at twice the effective minimum bend radius to be tested for 24 hours at about 85° C. and about 85% relative humidity. As used herein, the "effective minimum bend radius" is the smallest effective bend radius that the foldable apparatus can withstand without failure under the conditions and configuration described above.

In some embodiments, the foldable apparatus 101, 301, 401, 501, 601, 701, and/or 801 and/or foldable test apparatus 901 can achieve a parallel plate distance of 100 mm or less, 50 mm or less, 20 mm or less, 10 mm or less, 5 mm or less, or 3 mm or less. In further embodiments, the foldable apparatus 101, 301, 401, 501, 601, 701, and/or 801 and/or foldable test apparatus 901 can achieve a parallel plate distance of 50 millimeters (mm), or 20 mm, or 10 mm, or 5 mm, or 3 mm, or 2 mm, or 1 mm. In some embodiments, the foldable apparatus 101, 301, 401, 501, 601, 701, and/or 801 and/or foldable test apparatus 901 can comprise a minimum parallel plate distance of about 40 mm or less, about 20 mm or less, about 10 mm or less, about 5 mm or less, about 3 mm or less, about 1 mm or more, about 2 mm or more, about 3 mm or more, about 5 mm or more, or about 10 mm or more. In some embodiments, the foldable apparatus 101, 301, 401, 501, 601, 701, and/or 801 and/or foldable test apparatus 901 can comprise an effective minimum bend radius in a range from about 1 mm to about 40 mm, from about 1 mm to about 20 mm, from about 1 mm to about 10 mm, from about 1 mm to about 5 mm, from about 1 mm to about 3 mm, from about 3 mm to about 40 mm, from about 3 mm to about 40 mm, from about 3 mm to about 20 mm, from about 3 mm to about 10 mm, from about 3 mm to about 5 mm, from about 5 mm to about 10 mm, or any range or subrange therebetween.

As shown in FIG. 2, a minimum distance 243 between the first portion 221 and the second portion 231 can be defined between the first edge surface 229 and the second edge surface 239. In further embodiments, the minimum distance 243 between the first portion 221 and the second portion 231 is equal to the minimum distance between the outer peripheral portion 245 of the first edge surface 229 and the outer peripheral portion 247 of the second edge surface 239 when the foldable apparatus is in the configuration shown in FIG. 1. In some embodiments, the first portion 221 can be a physical distinct structure from the second portion 231 separated from the first portion 221 by the minimum distance 243. In some embodiments, the minimum distance 243 between the first portion 221 and the second portion 231 can be about 1 times or more, about 1.4 times or more, about 1.5 times or more, about 2 times or more, about 3 times or less, about 2.5 times or less, or about 2 times or less the minimum parallel plate distance of the foldable apparatus. In some embodiments, the minimum distance 243 as a multiple of the minimum parallel plate distance can be in a range from about 1.4 times to about 3 times, from about 1.4 times to about 2.5 times, from about 1.4 times to about 2 times, from about 1.5 times to about 3 times, from about 1.5 times to about 2.5 times, from about 1.5 times to about 2 times, from about 2 times to about 3 times, from about 2 times to about 2.55 times, or any range or subrange therebetween. Without wishing to be bound by theory, the length of a bent portion in a circular configuration between parallel plates can be about 0.8 times the parallel plate distance 1011. In some embodiments, the minimum distance 243 can be about 1 mm or more, about 2 mm or more, about 4 mm or more, about 5 mm or more, about 10 mm or more, about 20 mm or more, about 40 mm or more, about 200 mm or less, about 100 mm or less, or about 60 mm or less. In some embodiments, the minimum distance 243 can be in a range from about 1 mm to about 200 mm, from about 5 mm to about 200 mm, from about 10 mm to about 175 mm, from about 20 mm to about 150 mm, from about 30 mm to about 125 mm, from about 40 mm to about 100 mm, from about 50 mm to about 90 mm, from about 60 mm to about 80 mm, from about 5 mm to about 60 mm, from about 10 mm to about 60 mm, from about 20 mm to about 60 mm, from about 40 mm to about 60 mm, or any range or subrange therebetween. In some embodiments, the minimum distance 243 can be in a range from about 1 mm to about 100 mm, from about 1 mm to about 60 mm, from about 1 mm to about 40 mm, from about 1 mm to about 30 mm, from about 2 mm to about 30 mm, from about 2 mm to about 20 mm, from about 5 mm to about 20 mm, from about 10 mm to about 20 mm, or any range or subrange therebetween. In some embodiments, the minimum distance 243 can be in a range from about 1 mm to about 20 mm, from about 1 mm to about 10 mm, from about 2 mm to about 10 mm, from about 2 mm to about 5 mm, or any range or subrange therebetween. In some embodiments, the minimum distance 243 can be in a range from about the minimum parallel plate distance to about 200 mm, from about the minimum parallel plate distance to about 100 mm, from about minimum parallel plate distance to about 60 mm, from about the minimum parallel plate distance to about 40 mm, from about the minimum parallel plate distance to about 30 mm, from about minimum parallel plate distance to about 20 mm, a range from about 1.5 times the minimum parallel plate distance to about 200 mm, from about 1.5 times the minimum parallel plate distance to about 100 mm, from about 1.5 times the minimum parallel plate distance to about 60 mm, from about 1.5 times the minimum parallel plate distance to about 40 mm, from about 1.5 times the minimum parallel plate distance to about 30 mm, from about 1.5 times the minimum parallel plate distance to about 30 mm, or any range or subrange therebetween. By providing a minimum distance between the first portion and the second portion, folding of the foldable apparatus without failure can be facilitated.

The foldable apparatus may have a failure mode that can be described as a low energy failure or a high energy failure. The failure mode of the foldable apparatus can be measured using the parallel plate apparatus 1001 in FIG. 10. As described above for the effective minimum bend radius, the parallel rigid stainless-steel plates 1003, 1005 are moved together at a rate of 50 μm/second until the target parallel plate distance 1011 is achieved. The target parallel plate distance 1011 is the larger of 4 mm or twice the effective minimum bend radius of the foldable apparatus. Then, a tungsten carbide sharp contact probe impinges on the first substrate 203 at an impact location 1015 that is a distance 1013 of 30 mm from the outermost periphery of the foldable test apparatus 901. As used herein, a fracture is high energy if particles are ejected from the foldable test apparatus 901 during fracture at 1 meter per second (m/s) or more and the fracture results in more than 2 crack branches. As used herein, a fracture is low energy if the fracture results in 2 or fewer crack branches or does not result in ejection of particles from the foldable test apparatus 901 during fracture at 1 m/s or more. The average velocity of ejected particles may be measured by capturing high-speed video of the foldable apparatus from when the sharp contact probe contacts the impact location to 5,000 microseconds afterward.

The foldable apparatus may have an impact resistance defined by the capability of a region of the foldable apparatus (e.g., a region comprising the first portion 221, a region comprising the second portion 231, a region comprising the polymer-based portion 241) to avoid failure at a pen drop height (e.g., 5 centimeters (cm) or more, 10 centimeters or more, 20 cm or more), when measured according to the "Pen Drop Test." As used herein, the "Pen Drop Test" is conducted such that samples of foldable apparatus are tested with the load (i.e., from a pen dropped from a certain height) imparted to an outer surface (e.g., the first major surface 205, third major surface 419, or seventh major surface 733) of the foldable apparatus configured as in the parallel plate test with 100 μm thick sheet 1007 of PET attached to the fifth contact surface 1019 of the test adhesive layer 1009 (e.g., instead of the display device 603 shown in FIG. 6). As such, the PET layer in the Pen Drop Test is meant to simulate a flexible electronic display device (e.g., an OLED device). During testing, the foldable apparatus bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

Figure 39:
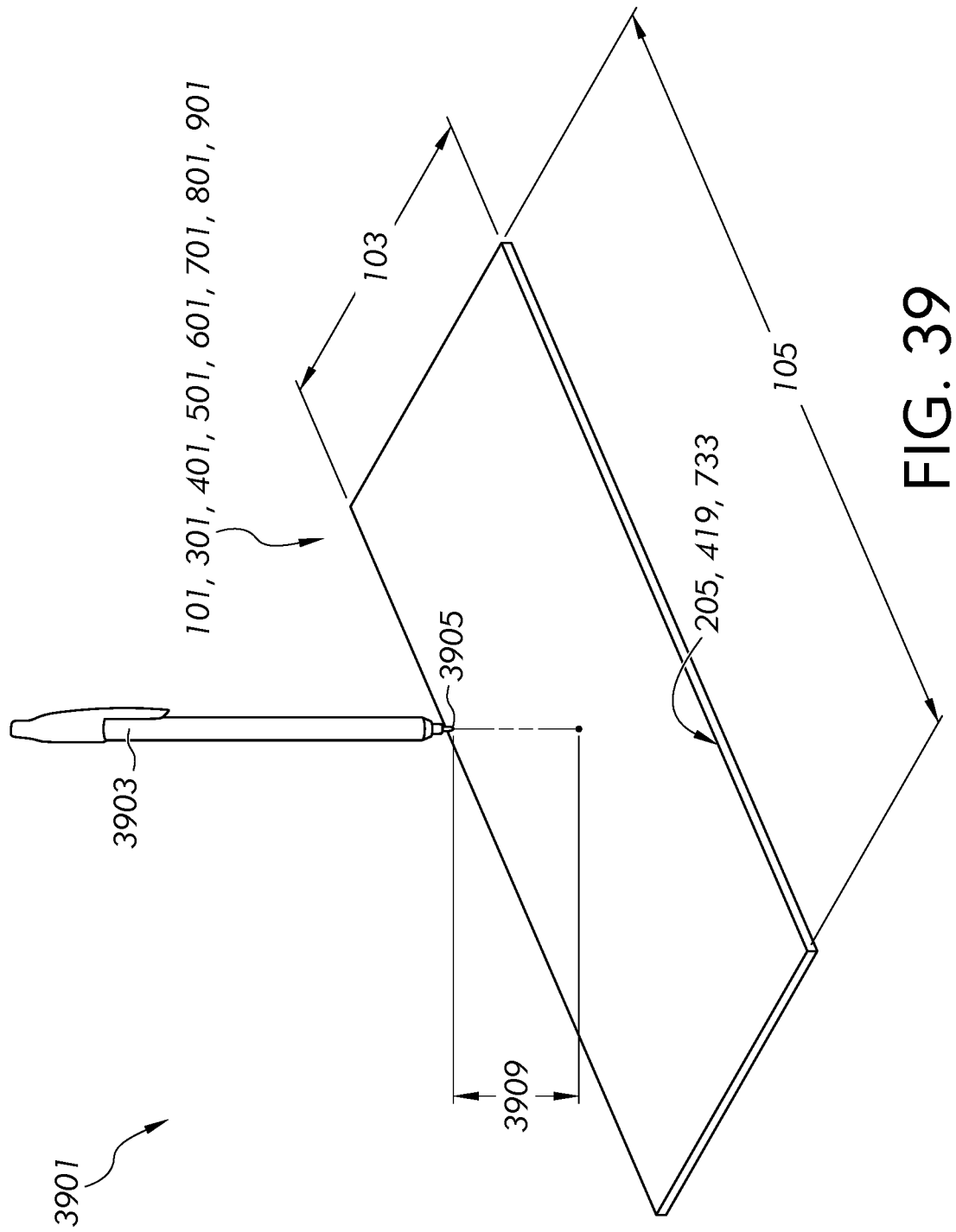
FIG. 39 is a schematic perspective view of a pen drop apparatus.

As shown in FIG. 39, the pen drop apparatus 3901 comprises the ballpoint pen 3903. The pen employed in Pen Drop Test is a BIC Easy Glide Pen, Fine comprising a tungsten carbide ballpoint tip 3905 of 0.7 mm (0.68 mm) diameter, and a weight of 5.73 grams (g) including the cap (4.68 g without the cap). The ballpoint pen 3903 is held a predetermined height 3909 from an outer surface (e.g., the first major surface 205, third major surface 419, or seventh major surface 733) of the foldable apparatus 101, 301, 401, 501, 601, 701, or 801 or the foldable test apparatus 901. A tube (not shown for clarity) is used for the Pen Drop Test to guide the ballpoint pen 3903 to the outer surface of the foldable apparatus 101, 301, 401, 501, 601, 701, or 801 or the foldable test apparatus 901, and the tube is placed in contact with the outer surface of the foldable apparatus 101, 301, 401, 501, 601, 701, or 801 or the foldable test apparatus 901 so that the longitudinal axis of the tube is substantially perpendicular to the outer surface of the foldable apparatus 101, 301, 401, 501, 601, 701, or 801 or the foldable test apparatus 901. The tube has an outside diameter of 1 inch (2.54 cm), an inside diameter of nine-sixteenths of an inch (1.4 cm) and a length of 90 cm. An acrylonitrile butadiene ("ABS") shim is employed to hold the ballpoint pen 3903 at a predetermined height 3909 for each test. After each drop, the tube is relocated relative to the foldable apparatus 101, 301, 401, 501, 601, 701, or 801 or the foldable test apparatus 901 to guide the ballpoint pen 3903 to a different impact location on the foldable apparatus 101, 301, 401, 501, 601, 701, or 801 or the foldable test apparatus 901. It is to be understood that the Pen Drop Test can be used for any of the foldable apparatus of embodiments of the disclosure.

A tube is used for the Pen Drop Test to guide a pen to an outer surface of the foldable apparatus. For the foldable apparatus 101 or 301 shown in FIGS. 2-3, the pen is guided to the first major surface 205 of the first substrate 203, and the tube is placed in contact with the first major surface 205 of the first substrate 203 so that the longitudinal axis of the tube is substantially perpendicular to the first major surface 205 with the longitudinal axis of the tube extending in the direction of gravity. For the foldable apparatus 401, 501, or 601 shown in FIGS. 4-6, the pen is guided to the third major surface 419 of the coating 411, and the tube is placed in contact with the third major surface 419 of the coating 411 so that the longitudinal axis of the tube is substantially perpendicular to the third major surface 419 with the longitudinal axis of the tube extending in the direction of gravity. For the foldable apparatus 401, 501, 601 shown in FIGS. 4-6, the pen is guided to the third major surface 419 of the coating 411, and the tube is placed in contact with the third major surface 419 of the coating 411 so that the longitudinal axis of the tube is substantially perpendicular to the third major surface 419 with the longitudinal axis of the tube extending in the direction of gravity. For testing a region comprising the polymer-based portion 241 of the foldable apparatus 701 or 801 shown in FIGS. 7-8, the pen is guided to the seventh major surface 733 of the inorganic layer 737 so that the longitudinal axis of the tube is substantially perpendicular to the seventh major surface 733 with the longitudinal axis of the tube extending in the direction of gravity. For testing a region not comprising the polymer-based portion 241 of the foldable apparatus 701 or 801 shown in FIGS. 7-8, the pen is guided to the first outer surface 751 and/or the second outer surface 753 so that the longitudinal axis of the tube is substantially perpendicular to first outer surface 751 and/or the second outer surface 753 with the longitudinal axis of the tube extending in the direction of gravity.

For the Pen Drop Test, the ballpoint pen 3903 is dropped with the cap attached to the top end (i.e., the end opposite the tip) so that the ballpoint tip 3905 can interact with the outer surface (e.g., the first major surface 205, third major surface 419, or seventh major surface 733) of the foldable apparatus 101, 301, 401, 501, 601, 701, or 801 or the foldable test apparatus 901. In a drop sequence according to the Pen Drop Test, one pen drop is conducted at an initial height of 1 cm, followed by successive drops in 0.5 cm increments up to 20 cm, and then after 20 cm, 2 cm increments until failure of the foldable apparatus 101, 301, 401, 501, 601, 701, or 801 or the foldable test apparatus 901. After each drop is conducted, the presence of any observable fracture, failure, or other evidence of damage to the foldable apparatus 101, 301, 401, 501, 601, 701, or 801 or the foldable test apparatus 901 is recorded along with the particular predetermined height 3909 for the pen drop. Using the Pen Drop Test, multiple foldable apparatus (e.g., samples) can be tested according to the same drop sequence to generate a population with improved statistical accuracy. For the Pen Drop Test, the ballpoint pen 3903 is to be changed to a new pen after every 5 drops, and for each new foldable apparatus (e.g., foldable apparatus 101, 301, 401, 501, 601, 701, or 801 or foldable test apparatus 901) tested. In addition, all pen drops are conducted at random locations on the foldable apparatus 101, 301, 401, 501, 601, 701, or 801 or the foldable test apparatus 901 at or near the center of the foldable apparatus 101, 301, 401, 501, 601, 701, or 801 or the foldable test apparatus 901 unless indicated otherwise, with no pen drops near or on the edge of the foldable apparatus 101, 301, 401, 501, 601, 701, or 801 or the foldable test apparatus 901.

For purposes of the Pen Drop Test, "failure" means the formation of a visible mechanical defect in a laminate. The mechanical defect may be a crack or plastic deformation (e.g., surface indentation). The crack may be a surface crack or a through crack. The crack may be formed on an interior or exterior surface of a laminate. The crack may extend through all or a portion of the first substrate 203, the coating 411, the inorganic layer 737, the first portion 221, and/or a second portion 231. A visible mechanical defect has a minimum dimension of 0.2 mm or more.

In some embodiments, the foldable apparatus can resist failure for a pen drop in a region comprising the first portion 221 or the second portion 231 at a pen drop height of 10 centimeters (cm), 12 cm, 14 cm, 15 cm, 16 cm, or 20 cm. In some embodiments, a maximum pen drop height that the foldable apparatus can withstand without failure over a region comprising the first portion 221 or the second portion 231 may be about 10 cm or more, about 12 cm or more, about 14 cm or more, about 16 cm or more, about 40 cm or less, or about 30 cm or less, about 20 cm or less, about 18 cm or less. In some embodiments, a maximum pen drop height that the foldable apparatus can withstand without failure over a region comprising the first portion 221 or the second portion 231 can be in a range from about 10 cm to about 40 cm, from about 12 cm to about 40 cm, from about 12 cm to about 30 cm, from about 14 cm to about 30 cm, from about 14 cm to about 20 cm, from about 16 cm to about 20 cm, from about 18 cm to about 20 cm, or any range or subrange therebetween.

In some embodiments, the foldable apparatus can resist failure for a pen drop in a region comprising the polymer-based portion 241 between the first portion 221 and the second portion 231 at a pen drop height of 1 cm, 2 cm, 3 cm, 4 cm, or 5 cm. In some embodiments, a maximum pen drop height that the foldable apparatus can withstand without failure over a region comprising the polymer-based portion 241 between the first portion 221 and the second portion 231 may be about 1 cm or more, about 2 cm or more, about 3 cm or more, about 4 cm or more, about 20 cm or less, about 10 cm or less, about 8 cm or less, or about 6 cm or less. In some embodiments, a maximum pen drop height that the foldable apparatus can withstand without failure over a region comprising the polymer-based portion 241 between the first portion 221 and the second portion 231 can be in a range from about 1 cm to about 20 cm, from about 2 cm to about 20 cm, from about 2 cm to about 10 cm, from about 3 cm to about 10 cm, from about 3 cm to about 8 cm, from about 4 cm to about 8 cm, from about 4 cm to about 6 cm, or any range or subrange therebetween.

A minimum force may be used to achieve a predetermined parallel plate distance with the foldable apparatus. The parallel plate apparatus of FIG. 10, described above, is used to measure the "closing force" of a foldable apparatus of the embodiments of the disclosure. The force to go from a flat configuration (e.g., see FIG. 1) to a bent (e.g., folded) configuration (e.g., see FIG. 10) comprising the predetermined parallel plate distance is measured. In some embodiments, the force to bend the foldable apparatus from a flat configuration to a parallel plate distance of 10 mm can be about 20 Newtons (N) or less, 15 N or less, about 12 N or less, about 10 N or less, about 0.1 N or more, about 0.5 N or more, about 1 N or more, about 2 N or more, about 5 N or more. In some embodiments, the force to bend the foldable apparatus from a flat configuration to a parallel plate distance of 10 mm can be in a range from about 0.1 N to about 20 N, from about 0.5 N to about 20 N, from about 0.5 N to about 15 N, from about 1 N to about 15 N, from about 1 N to about 12 N, from about 2 N to about 12 N, from about 2 N to about 10 N, from about 5 N to about 10 N, or any range or subrange therebetween. In some embodiments, the force to bend the foldable apparatus from a flat configuration to a parallel plate distance of 3 mm can be about 10 N or less, about 8 N or less, about 6 N or less, about 4 N or less, about 3 N or less, about 0.05 N or more about 0.1 N or more, about 0.5 N or more, about 1 N or more, about 2 N or more, about 3 N or more. In some embodiments, the force to bend the foldable apparatus from a flat configuration to a parallel plate distance of 3 mm can be in a range from about 0.05 N to about 10 N, from about 0.1 N to about 10 N, from about 0.1 N to about 8 N, from about 0.5 N to about 8 N, from about 0.5 N to about 6 N, from about 1 N to about 6 N, from about 1 N to about 4 N, from about 2 N to about 4 N, from about 2 N to about 3 N, or any range or subrange therebetween.

In some embodiments, the force per width 103 of the foldable apparatus to bend the foldable apparatus from a flat configuration to a parallel plate distance of 10 mm can be about 20 Newtons per millimeter (N/mm) or less, 0.15 N/mm or less, about 0.12 N/mm or less, about 0.10 N/mm or less, about 0.001 N/mm or more, about 0.005 N/mm or more, about 0.01 N/mm or more, about 0.02 N/mm or more, about 0.05 N/mm or more. In some embodiments, the force per width 103 of the foldable apparatus to bend the foldable apparatus from a flat configuration to a parallel plate distance of 10 mm can be in a range from about 0.001 N/mm to about 0.20 N/mm, from about 0.005 N/mm to about 0.20 N/mm, from about 0.005 N/mm to about 0.15 N/mm, from about 0.01 N/mm to about 0.15 N/mm, from about 0.01 N/mm to about 0.12 N/mm, from about 0.02 N/mm to about 0.12 N/mm, from about 0.02 N/mm to about 0.10 N/mm, from about 0.05 N/mm to about 0.10 N/mm, or any range or subrange therebetween. In some embodiments, the force per width 103 of the foldable apparatus to bend the foldable apparatus from a flat configuration to a parallel plate distance of 3 mm can be about 0.10 N/mm or less, about 0.08 N/mm or less, about 0.06 N/mm or less, about 0.04 N/mm or less, about 0.03 N/mm or less, about 0.0005 N/mm or more about 0.001 N/mm or more, about 0.005 N/mm or more, about 0.01 N/mm or more, about 0.02 N/mm or more, about 0.03 N/mm or more. In some embodiments, the force per width 103 of the foldable apparatus to bend the foldable apparatus from a flat configuration to a parallel plate distance of 3 mm can be in a range from about 0.0005 N/mm to about 0.10 N/mm, from about 0.001 N/mm to about 0.10

N/mm, from about 0.001 N/mm to about 0.08 N/mm, from about 0.005 N/mm to about 0.08 N/mm, from about 0.005 N/mm to about 0.06 N/mm, from about 0.01 N/mm to about 0.06 N/mm, from about 0.01 N/mm to about 0.04 N/mm, from about 0.02 N/mm to about 0.04 N/mm, from about 0.02 N/mm to about 0.03 N/mm, or any range or subrange therebetween.

Figure 13:
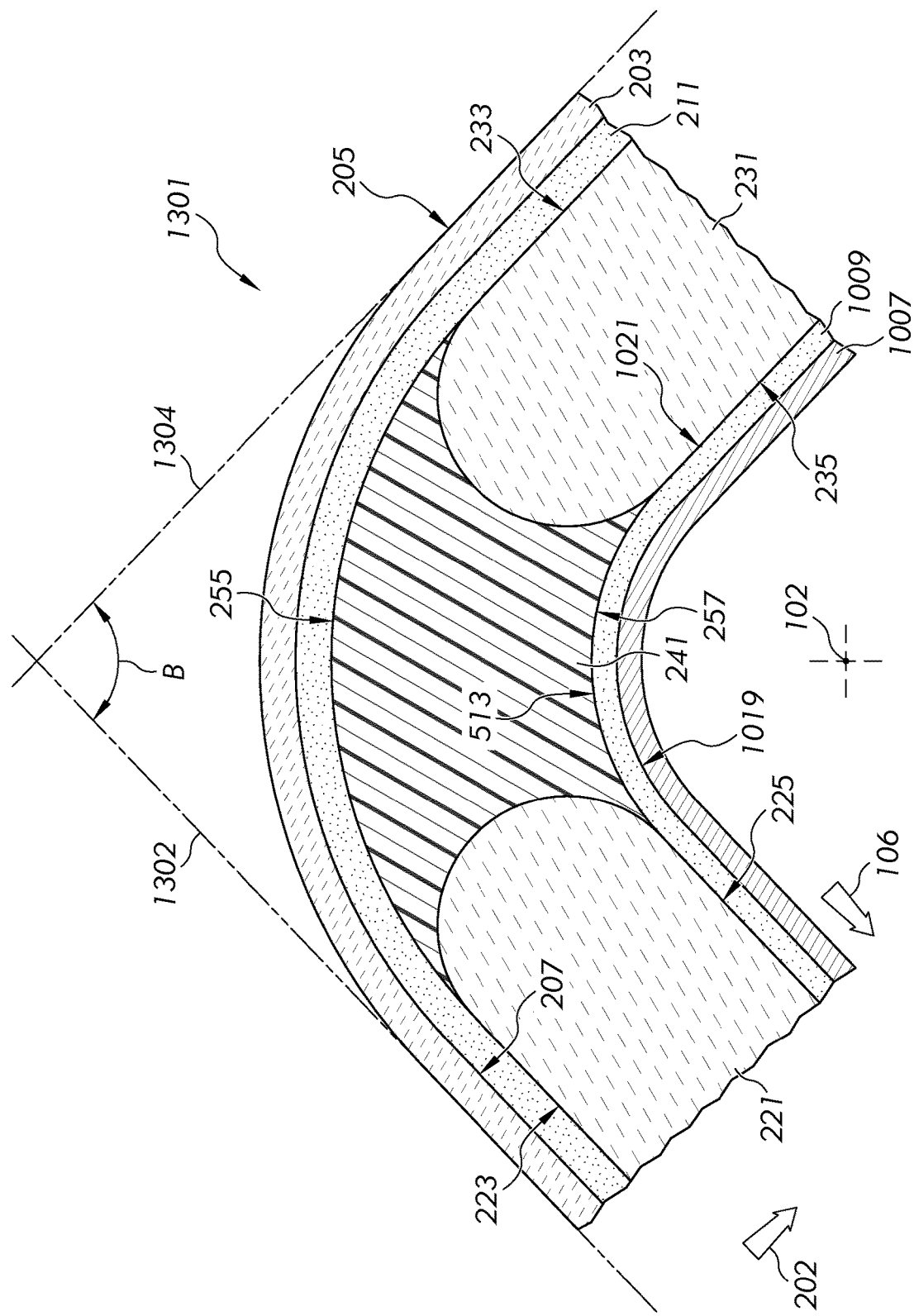
FIG. 13 schematically illustrates a foldable apparatus, resembling the test foldable apparatus of FIG. 10, in a neutral stress configuration.

The foldable apparatus 101, 301, 401, 501, 601, 701, and/or 801 and/or foldable test apparatus 901 can comprise a neutral stress configuration. Throughout the disclosure, the "neutral stress configuration" is measured with the following test configuration and process. When measuring the "neutral stress configuration", the foldable test apparatus 1301 as shown in FIG. 13 comprises the test adhesive layer 1009 comprising an optically clear adhesive with an elastic modulus of 0.1 IVIPa and a thickness of 50 µm between the sixth contact surface 1021 of the test adhesive layer 1009 and the fifth contact surface 1019 of the test adhesive layer 1009 as well as a 100 µm thick sheet 1007 of polyethylene terephthalate (PET) rather than the release liner 503 of FIG. 5 or the display device 603 shown in FIGS. 6-8, similar to the foldable test apparatus 901 discussed above. For example, the foldable apparatus 101, 301, 401, 501, 601, 701, and/or 801 shown in FIGS. 2-8 comprising the first substrate 203 and/or coating 411, the foldable test apparatus 1301, as shown in FIG. 13, for measuring the "neutral stress configuration" can resemble the foldable test apparatus 901 for measuring the "effective bend radius" shown in FIG. 10. To test the foldable test apparatus 1301, the foldable test apparatus 1301 is placed on its side such that a cross-section taking perpendicular to the direction of gravity resembles FIG. 13. The foldable test apparatus 1301 rests on a surface comprising SAE grade 304 (e.g., ISO A2) stainless steel with an arithmetic mean deviation of the surface (surface roughness (Ra)) of 3 µm or less (e.g., 2.40 µm, mill finish number 3). As shown, a plane substantially comprising the direction 202 of the first thickness 227 and the direction 106 of the length 105 of the foldable apparatus is substantially perpendicular to the direction of gravity and the direction 104 (see FIG. 1) of the fold axis 102 is also the direction of gravity. Then, the test foldable apparatus is allowed to relax 1 hour to achieve an equilibrium configuration, as shown in FIG. 13.

Figure 14:
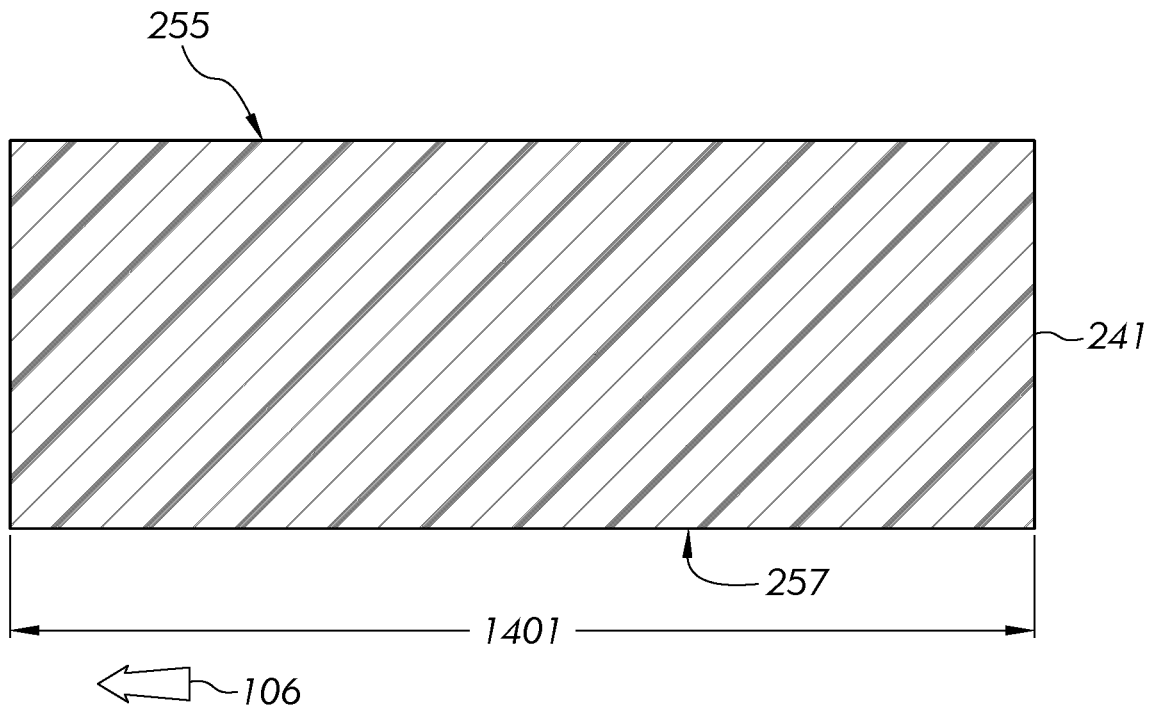
FIG. 14 schematically illustrates the polymer-based portion when the foldable apparatus is in a flat configuration.
Figure 15:
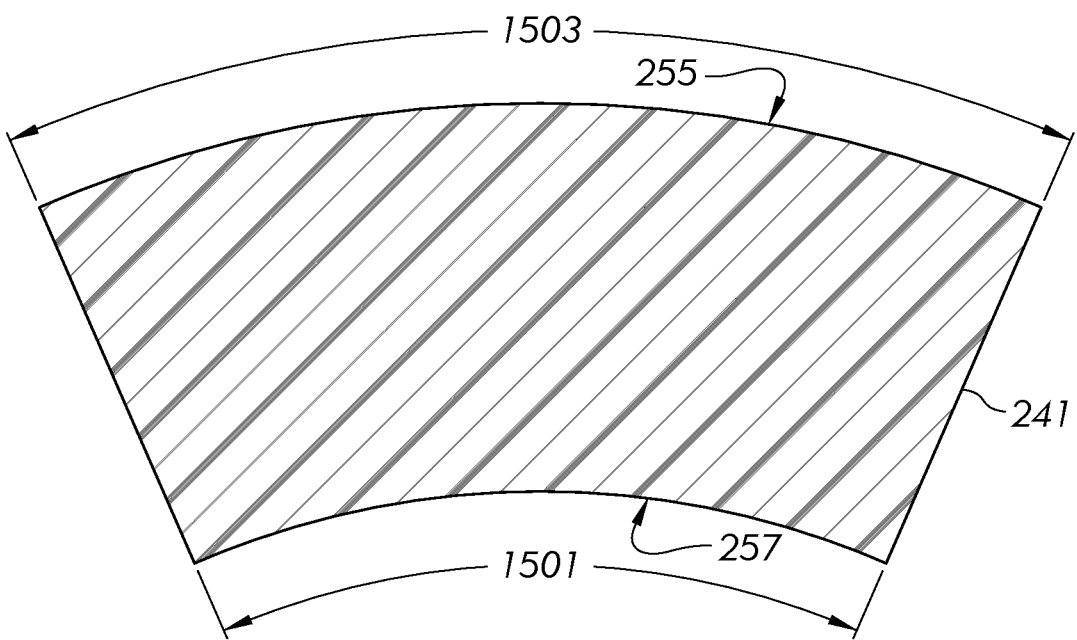
FIG. 15 schematically illustrates the polymer-based portion when the foldable apparatus is in the neutral stress configuration.

In some embodiments, as shown in FIG. 13, the neutral stress configuration can comprise a bent configuration. As used herein a bent configuration is a non-flat configuration (in contrast to the flat configuration shown in FIGS. 1-8). In further embodiments, as shown in FIG. 13, the first major surface 205 and/or the second major surface 207 of the first substrate 203 may substantially deviate from a shape of a plane. In some embodiments, the deviation of the neutral stress configuration from the flat configuration can be quantified using a maximum magnitude of a deviatoric strain. As used herein, "deviatoric strain" means the shape-changing component of the strain tensor (e.g., the strain tensor minus the as the hydrostatic strain—average of the on-diagonal components of the strain tensor). The strain tensor can be measured using digital image recognition and/or topography of a portion (e.g., polymer-based portion) of the folded apparatus to compare the shape and dimensions between the flat configuration and the neutral stress configuration. For example, as shown in FIG. 14, an example polymer-based portion 241 is shown in a flat configuration. In this flat configuration, the length 1401 of the polymer-based portion (e.g., measured in the direction 106 of the length of the foldable apparatus) is substantially equal when measured at the third contact surface 255 and the fourth contact surface 257. For example, as shown in FIG. 15, an example polymer-based portion 241 is shown in the neutral stress configuration. For ease of comprehension, the volume of the polymer-based portion 241 in FIGS. 14-15 is the same, which would be the case after removing the hydrostatic strain from the digitally captured shape and dimensions of the neutral stress configuration. As shown in FIG. 15, a first length 1503 measured along the third contact surface 255 is different (e.g., greater than) a second length 1501 measured along the fourth contact surface 257. As used herein, strain means the difference in length of a portion between a flat configuration and a neutral stress configuration divided by a reference length from the flat configuration. For example, a strain (e.g., deviatoric strain when the hydrostatic strain is removed as discussed above) between FIGS. 14-15 measured at the third contact surface 255 would be equal to the difference of the first length 1503 in the neutral stress configuration and the length 1401 in the flat configuration divided by the length 1401 in the flat configuration. For example, a strain (e.g., deviatoric strain when the hydrostatic strain is removed as discussed above) between FIGS. 14-15 measured at the fourth contact surface 257 would be equal to the difference of the second length 1501 in the neutral stress configuration and the length 1401 in the flat configuration divided by the length 1401 in the flat configuration. As used herein, the magnitude of a value (e.g., scalar value) is the absolute value of the value. As used herein, the maximum magnitude of a tensor (e.g., strain tensor, deviatoric strain tensor) means the component of the tensor (e.g., deviatoric strain tensor) with the largest (e.g., maximum) value. As used herein, the maximum magnitude of the deviatoric strain of the polymer-based portion 241, means the largest value of the maximum magnitude of the deviatoric strain calculated at the third contact surface 255 and the fourth contact surface 257 of the polymer-based portion. In some embodiments, the maximum magnitude of the deviatoric strain of the polymer-based portion 241 can be about 1% or more, about 2% or more, about 3% or more, about 4% or more, about 10% or less, about 8% or less, about 7% or less, about 6% or less, or about 5% or less. In some embodiments, the maximum magnitude of the deviatoric strain of the polymer-based portion 241 can be in a range from about 1% to about 10%, from about 1% to about 8%, from about 1% to about 7%, from about 2% to about 7%, from about 2% to about 6%, from about 2% to about 5%, from about 3% to about 5%, from about 3% to about 4%, from about 2% to about 10%, from about 2% to about 8%, from about 3% to about 8%, from about 4% to about 8%, from about 4% to about 7%, from about 4% to about 6%, or any range or subrange therebetween.

In some embodiments, the deviation of the neutral stress configuration from the flat configuration can be quantified using an angle "B" measured between a first line extending in the direction of the length from the first portion and a second line extending in the direction of the length from the second portion. For example, with reference to FIG. 13, the angle "B" is measured between a first line 1302 and a second line 1304. The first line 1302 extends in the direction 106 of the length of the foldable test apparatus 1301 at and from a portion of the first major surface 205 of the first substrate 203 disposed over the first portion 221 (e.g., disposed over the first surface area 223). In some embodiments, as shown in FIG. 13, the first line 1302 can be parallel to a plane that the first surface area 223 extends along. The second line 1304 extends in the direction 106 of the length of the foldable test apparatus 1301 at and from a portion of the first major surface 205 of the first substrate 203 disposed over the second portion 231 (e.g., disposed over the third surface area 233). In some embodiments, as shown in FIG. 13, the second line 1304 can be parallel to a plane that the third surface area 233 extends along. In some embodiments, the magnitude of the difference between the angle "B" in the neutral stress configuration and the flat configuration (e.g., 180°) can be about 1° or more, about 2° or more, about 5° or more, about 10° or more, about 40° or less, about 20° or less, about 15° or less, or about 8° or less. In some embodiments, the magnitude of the difference between the angle "B" in the neutral stress configuration and the flat configuration (e.g., 180°) can be in a range from about 1° to about 40°, from about 1° to about 20°, from about 2° to about 20°, from about 5° to about 20°, from about 5° to about 15°, from about 10° to about 15°, from about 2° to about 15°, from about 5° to about 15°, from about 5° to about 8°, from about 1° to about 8°, from about 2° to about 8°, or any range or subrange therebetween.

By providing a neutral stress configuration when the foldable apparatus is in a bent configuration, the force to bend the foldable apparatus to a predetermined parallel plate distance can be reduced. Further, providing a neutral stress configuration when the foldable apparatus is in a bent state can reduce the maximum stress and/or strain experienced by the polymer-based portion during normal use conditions, which can, for example, enable increased durability and/or reduced fatigue of the foldable apparatus. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by bending a ribbon at an elevated temperature (e.g., when the ribbon comprises a viscosity in a range from about $10^4$ Pascal-seconds and about $10^7$ Pascal-seconds).

Embodiments of the disclosure can comprise a consumer electronic product. The consumer electronic product can comprise a front surface, a back surface, and side surfaces. The consumer electronic product can further comprise electrical components at least partially within the housing. The electrical components can comprise a controller, a memory, and a display. The display can be at or adjacent to the front surface of the housing. The consumer electronic product can comprise a cover substrate disposed over the display. In some embodiments, at least one of a portion of the housing or the cover substrate comprises the foldable apparatus discussed throughout the disclosure.

Figure 11:
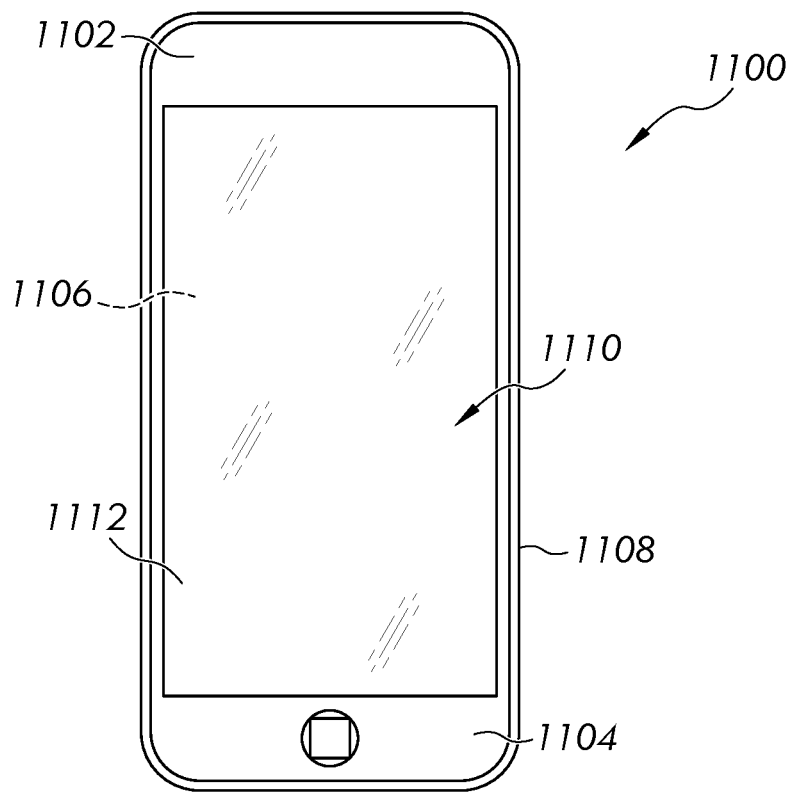
FIG. 11 is a schematic plan view of an example consumer electronic device according to some embodiments.
Figure 12:
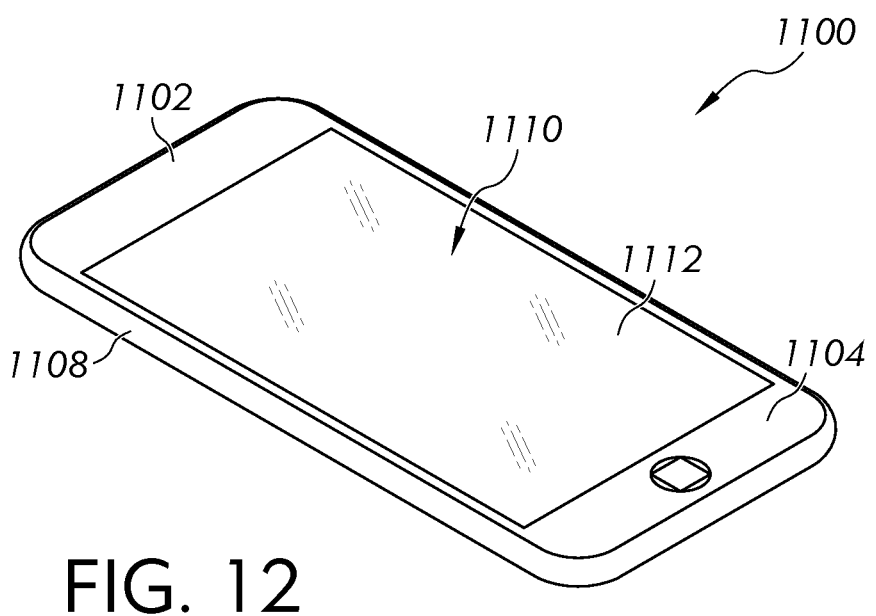
FIG. 12 is a schematic perspective view of the example consumer electronic device of FIG. 11.

The foldable apparatus disclosed herein may be incorporated into another article, for example, an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance or a combination thereof. An exemplary article incorporating any of the foldable apparatus disclosed herein is shown in FIGS. 11 and 12. Specifically, FIGS. 11 and 12 show a consumer electronic device 1100 including a housing 1102 having front 1104, back 1106, and side surfaces 1108. The consumer electronic device 1100 can include electrical components (not shown) that are at least partially inside or entirely within the housing. The consumer electronic device 1100 can include at least a controller, a memory, and a display 1110 that is at or adjacent to the front surface of the housing. The consumer electronic device 1100 can comprise a cover substrate 1112 at or over the front surface of the housing such that it is over the display. In some embodiments, at least one of the cover substrate 1112 or a portion of housing 1102 may include any of the foldable apparatus disclosed herein.

Figure 17:
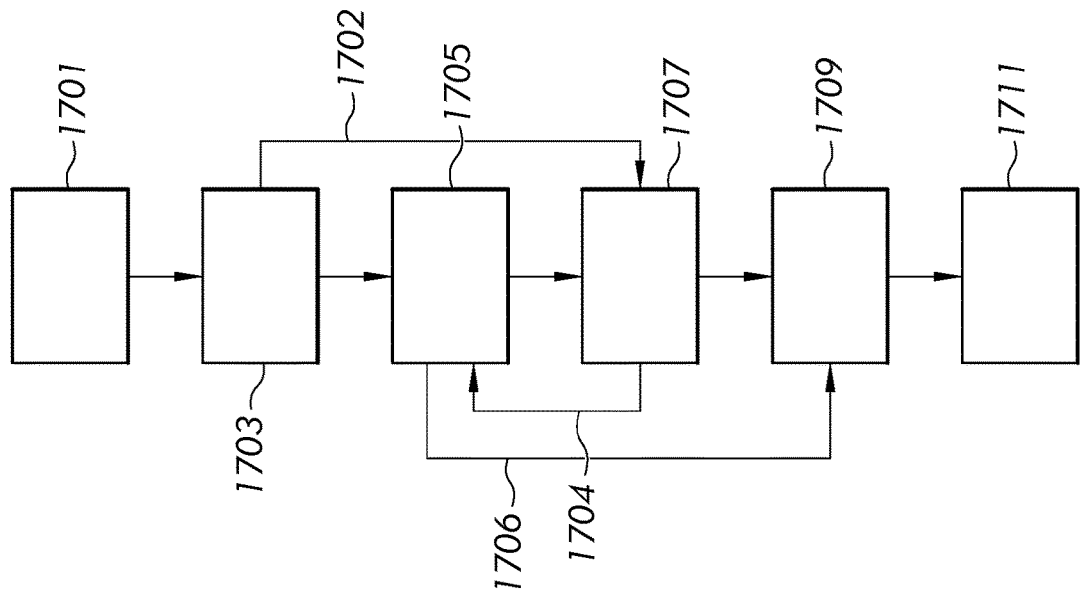
FIGS. 16-18 are flow charts illustrating example methods making a foldable apparatus in accordance with embodiments of the disclosure.
Figure 16:
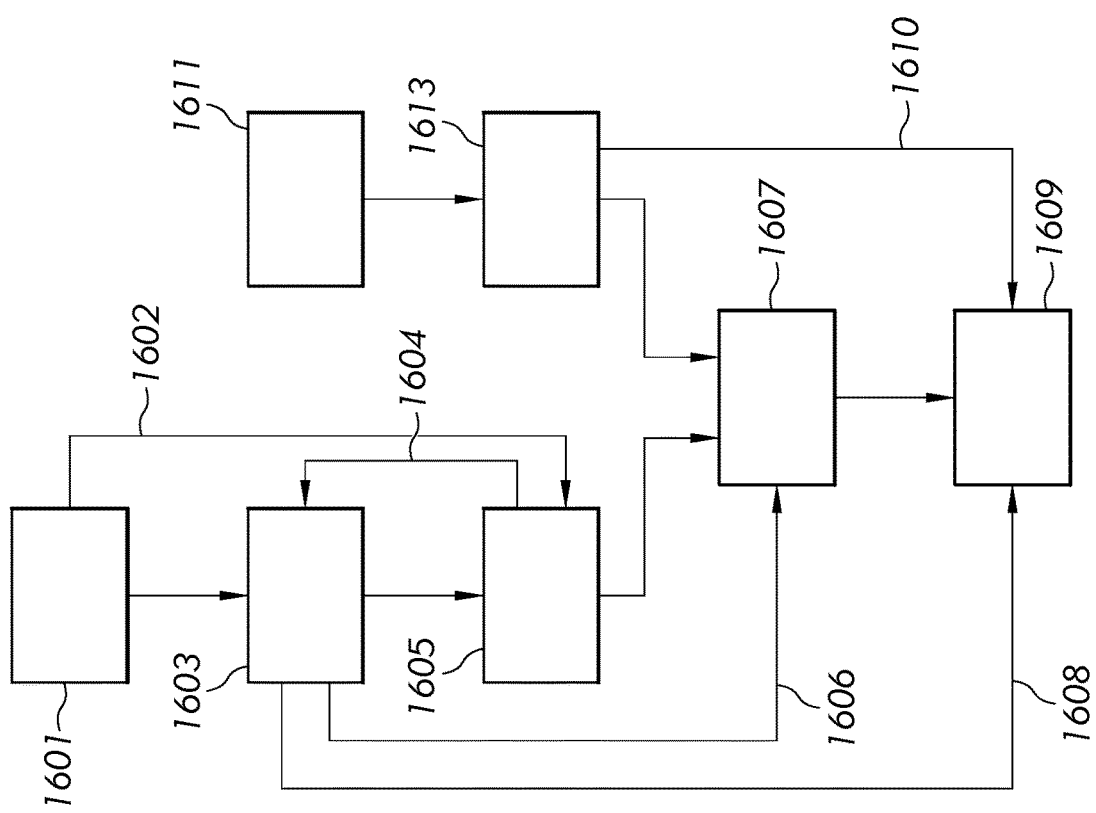

Embodiments of methods of making the foldable apparatus in accordance with embodiments of the disclosure will be discussed with reference to the flow charts in FIGS. 16-18 and example method steps illustrated in FIGS. 19-30.

Example embodiments of making the foldable apparatus 101, 301, 401, 501, 601, 701, and/or 801 illustrated in FIGS. 1-8 will now be discussed with reference to FIGS. 19-22 and the flow chart in FIG. 17. The flow chart in FIG. 17 will be discussed with reference to a first substrate 203. Although not shown, it is to be understood that in some embodiments the first substrate 203 may comprise the backing substrate 421 and/or may have a coating 411 disposed over its first major surface. Although not shown, it is to be understood that in some embodiments the first substrate 203 can be replaced with a coating 411. Although not shown, it is to be understood that the flow chart in FIG. 17 and associated methods are applicable to a first portion 221 comprising the first outer surface 751 that stands proud from the first surface area 223 by the recess depth 749 and/or the second portion 231 comprising the second outer surface 753 that stands proud from the third surface area 233 by the recess depth 749, for example, further comprising the steps discussed with reference to FIGS. 29-30 below. Although not shown, it is to be understood that the method can produce foldable apparatus comprising a second substrate and/or a third adhesive layer, for example, as shown in FIG. 7.

In a first step 1701 of methods of the disclosure, methods can start with providing a first substrate 203. In some embodiments, the first substrate 203 may be provided by purchase or otherwise obtaining a substrate or by forming the substrate. In some embodiments, the first substrate 203 can comprise a glass-based substrate. In further embodiments, glass-based substrates can be provided by forming them with a variety of ribbon forming processes, for example, slot draw, down-draw, fusion down-draw, up-draw, press roll, redraw, or float. The first substrate 203 may comprise a second major surface 207 that can extend along a first plane. The second major surface 207 can be opposite a first major surface 205. It is to be understood that the first substrate 203 could be replaced with the backing substrate 421 without or without a coating 411 and/or the first substrate 203 could be replaced with the inorganic layer 737.

Figure 19:
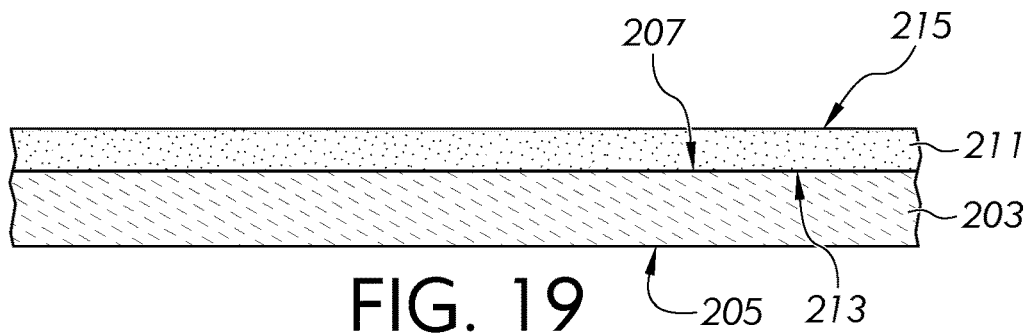
FIGS. 19-30 schematically illustrate steps in methods of making a foldable apparatus.

After step 1701, as illustrated in FIG. 19, the method can proceed to step 1703 comprising disposing the first adhesive layer 211 over the first substrate 203. The first adhesive layer 211 can comprise a first contact surface 213 and a second contact surface 215 opposite the first contact surface 213. In some embodiments, as shown, the first contact surface 213 of the first adhesive layer 211 can face the second major surface 207 of the first substrate 203. In further embodiments, the first contact surface 213 of the first adhesive layer 211 can contact the second major surface 207 of the first substrate 203.

Figure 20:
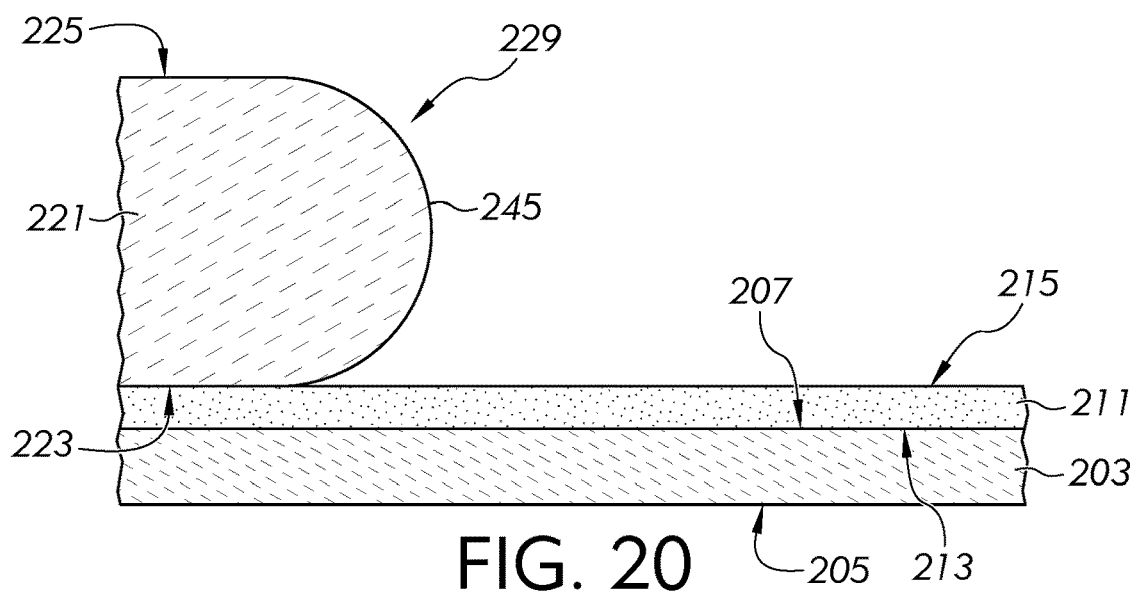

After step 1703, as shown in FIG. 20, the method can proceed to step 1705 comprising disposing the first portion 221 over the second contact surface 215 of the first adhesive layer 211. In some embodiments, the first portion 221 can comprise a first surface area 223 facing the second contact surface 215 of the first adhesive layer 211. In further embodiments, the first surface area 223 of the first portion 221 can contact the second contact surface 215 of the first adhesive layer 211.

Figure 21:
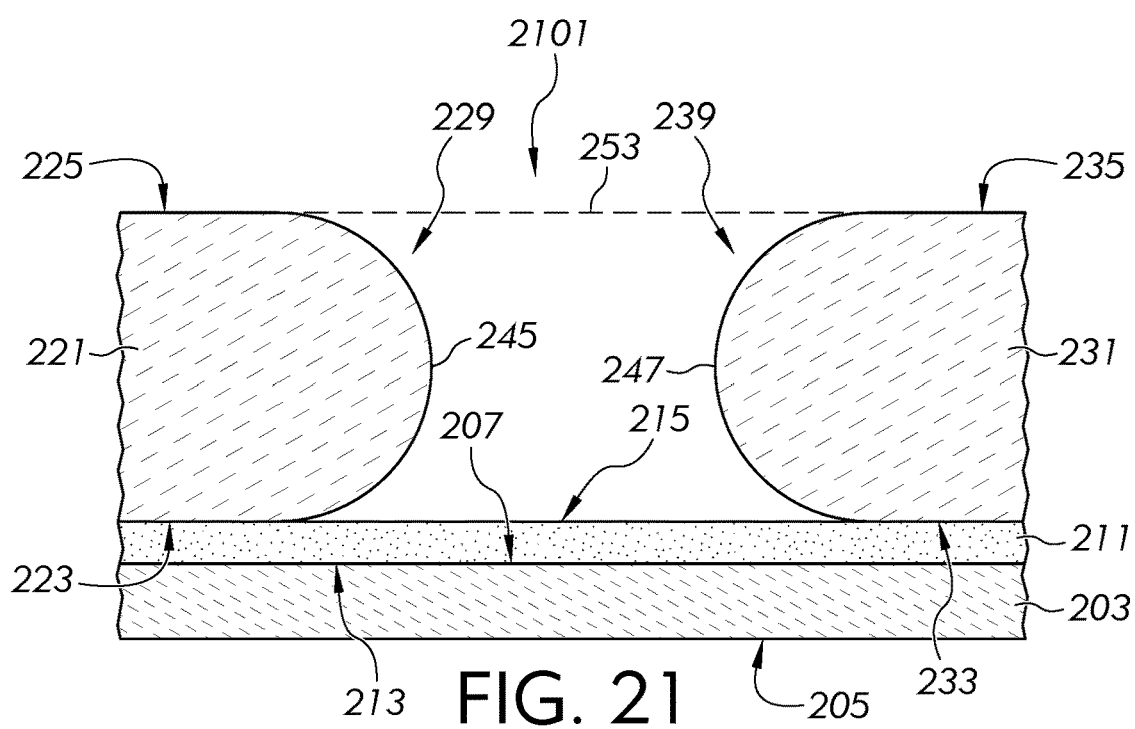

After step 1705, as shown in FIG. 21, the method can proceed to step 1707 comprising disposing the second portion 231 over the second contact surface 215 of the first adhesive layer 211. In some embodiments, the second portion 231 can comprise a third surface area 233 facing the second contact surface 215 of the first adhesive layer 211. In further embodiments, the third surface area 233 of the second portion 231 can contact the second contact surface 215 of the first adhesive layer 211. In some embodiments, the first edge surface 229 of the first portion 221 can face the second edge surface 239 of the second portion 231. In further embodiments, as shown, a recess 2101 can be defined between the first edge surface 229 of the first portion 221 and the second edge surface 239 of the second portion 231. In even further embodiments, as shown, the recess 2101 can be further defined by the second contact surface 215 of the first adhesive layer 211. In even further embodiments, as shown, the second surface area 225 of the first portion 221 and the fourth surface area 235 of the second portion 231 can comprise a common plane 253, and the recess 2101 can be further defined by the common plane 253.

Figure 22:
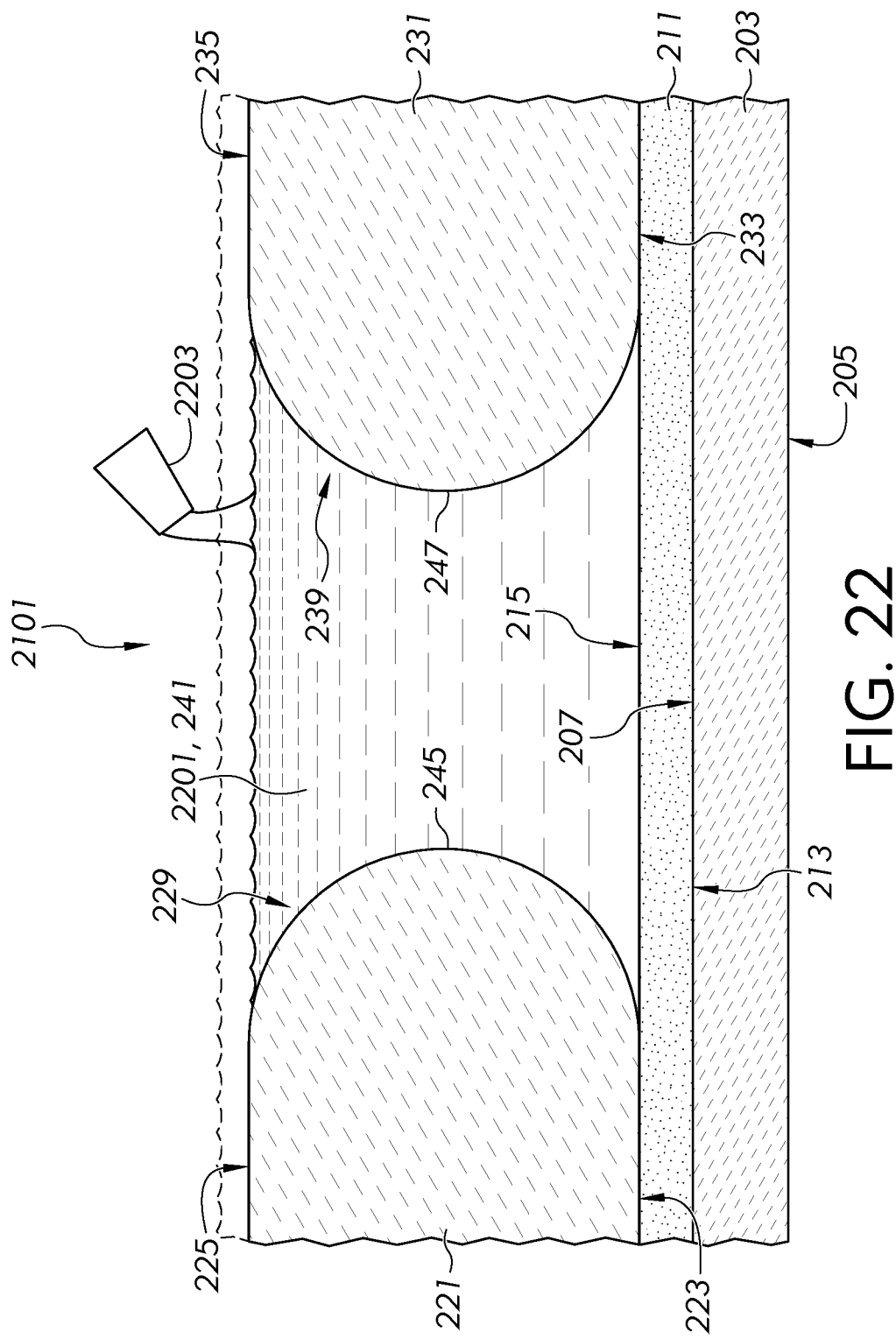

After step 1707, as shown in FIG. 22, the method can proceed to step 1709 comprising disposing the polymer-based portion 241 over the first adhesive layer 211 between the first portion 221 and the second portion 231. In some embodiments, as shown, disposing the polymer-based portion 241 can comprise dispensing a liquid 2201 from a container 2203 into the recess 2101. In some embodiments, as disclosed by the solid liquid level line, the liquid 2201 may be disposed such that a free surface of the liquid 2201 extends along the common plane 253 with the second surface area 225 of the first portion 221 and the fourth surface area 235 of the second portion 231. In further embodiments, as shown in dashed liquid level lines, the liquid 2201 may be dispensed so that the liquid level is disposed over the second surface area 225 and/or the fourth surface area 235. In even further embodiments, the liquid level may be a distance above the second surface area 225 and/or the fourth surface area 235 that can be within one or more of the ranges discussed above for the polymer thickness 415. In further embodiments, the liquid 2201 can comprise any of the materials or precursors of the materials comprising the polymer-based portion 241 and can optionally comprise a solvent. Precursors can comprise, without limitation, one or more of a monomer, an accelerator, a curing agent, an epoxy, and/or inorganic particles. Example embodiments of solvents include polar solvents (e.g., water, an alcohol, an acetate, acetone, formic acid, dimethylformamide, acetonitrile, dimethyl sulfoxone, nitromethane, propylene carbonate, polyether ether ketone) and non-polar solvents (e.g., pentane, 1,4-dioxane, chloroform, dichloromethane, diethyl ether, hexane, heptane, benzene, toluene, xylene). The step 1709 of disposing the polymer-based portion 241 can further include the step of curing the liquid 2201 to connect the pair of portions 221 and 231 together. In some embodiments, curing the liquid 2201 can comprise heating, ultraviolet (UV) irradiation, and/or waiting for a predetermined period of time. In some embodiments, the polymer-based portion 241 can comprise a negative coefficient of thermal expansion, as discussed above. In some embodiments, the precursor(s) can comprise a cyclic monomer (e.g., norbornene, cyclopentene), where curing the precursor(s) comprises ring-opening metathesis polymerization that can result in an increase in volume from the liquid 2201 to the polymer-based portion 241.

In some embodiments, the method may proceed to step 1711. In further embodiments, the foldable apparatus may be complete after step 1709 and may resemble one of FIGS. 1-3. In further embodiments, step 1711 may comprise disposing a coating (e.g., coating 411, polymeric coating) on the second major surface 207 of the first substrate 203, which may produce a foldable apparatus resembling FIG. 4. In further embodiments, step 1711 may comprise disposing a second adhesive layer 507 and optionally a release liner 503 or other substrates (e.g., a substrate similar or identical to the first substrate 203 discussed throughout the application) or display device 603 to form a foldable apparatus (e.g., resembling one of FIGS. 5-6). In even further embodiments, the foldable apparatus shown in FIG. 6 can be produced when the first substrate 203 is replaced with the coating 411 in the first step 1701. In further embodiments, step 1711 can comprise disposing the second substrate 703 over the second adhesive layer 507 or the fourth contact surface 257 of the polymer-based portion 241. In even further embodiments, a third adhesive layer 717 can be disposed over the second substrate 703, which can then optionally have a release liner 503 and/or display device disposed thereon. In further embodiments, the first substrate 203 may be replaced with a second substrate, and the liquid can extend to the dashed lines in FIG. 22 to produce a foldable apparatus resembling FIG. 5.

In some embodiments, methods of making a foldable apparatus in accordance with embodiments of the disclosure can proceed along steps 1701, 1703, 1705, 1707, 1709, and 1711 sequentially, as discussed above. In some embodiments, methods can interchange steps 1705 and 1707 by disposing the second portion 231 before disposing the first portion 221, following arrow 1702, arrow 1704, and arrow 1706 sequentially as indicated in the flow chart in FIG. 16. In some embodiments, the method may start at step 1705 or 1707 when a first adhesive layer 211 disposed over a first substrate 203, a coating 411, or an inorganic layer 737 is obtained by purchasing or otherwise. Any of the above options may be combined to make a foldable apparatus in accordance with embodiments of the disclosure.

Example embodiments of making the foldable apparatus 101, 301, 401, 501, 601, 701, and/or 801 illustrated in FIGS. 1-8 will now be discussed with reference to FIGS. 25-28 and the flow chart in FIG. 16. In some embodiments, a first step 1601 of methods of the disclosure can comprise providing a polymer-based portion 241. In some embodiments, the polymer-based portion 241 may be provided by purchase or otherwise obtaining a polymer-based portion 241 or by forming the polymer-based portion 241. In further embodiments, the polymer-based portion 241 may comprise a cured polymer-based article, which may be obtained by purchasing or otherwise procuring it or forming and curing precursor material to form the polymer-based portion 241. In further embodiments, the polymer-based portion 241 may resemble the polymer-based portion 241 shown in FIG. 25, although it can resemble the polymer-based portion 241 shown in FIG. 26 or other shapes in other embodiments. Although not shown, it is to be understood that the flow chart in FIG. 16 and associated methods are applicable to a first portion 221 comprising the first outer surface 751 that stands proud from the first surface area 223 by the recess depth 749 and/or the second portion 231 comprising the second outer surface 753 that stands proud from the third surface area 233 by the recess depth 749, for example, the inorganic layer 737 and a first adhesive layer 211 can be disposed on a layer 2301 before disposing the polymer-based portion 241, although the adhesive layer may be omitted in some embodiments. Although not shown, it is to be understood that the method can produce foldable apparatus comprising a second substrate and/or a third adhesive layer, for example, as shown in FIG. 7.

Figure 25:
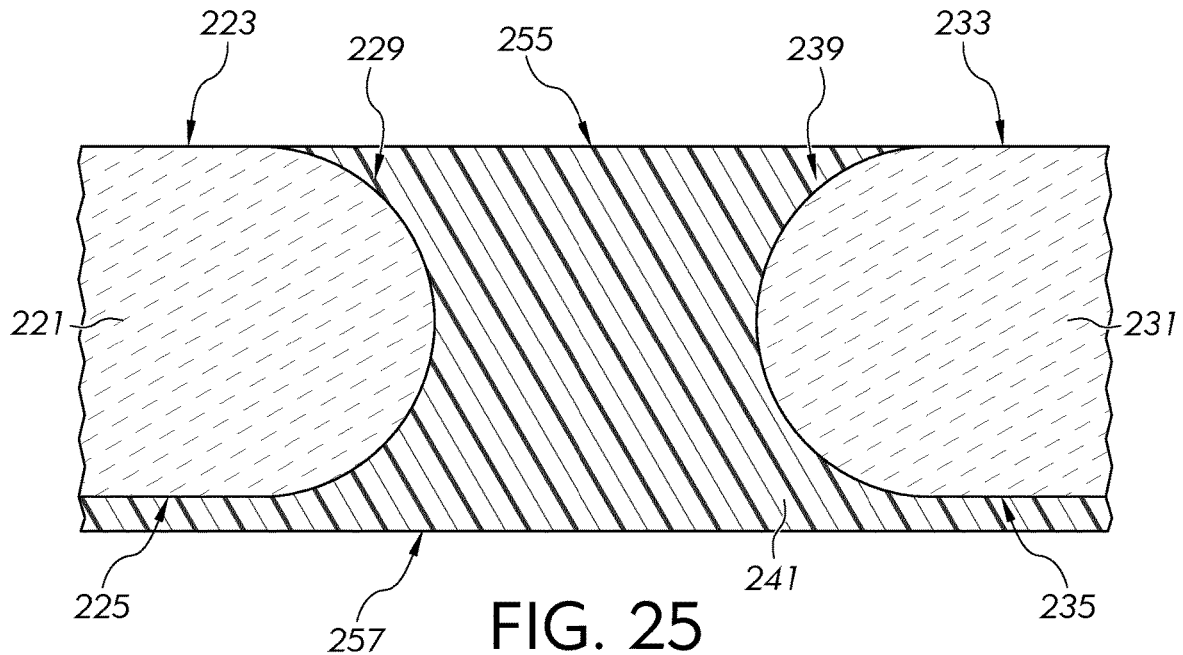

After step 1601, as illustrated in FIG. 25, the method can proceed to step 1603 comprising attaching the first portion 221 to the polymer-based portion 241. After step 1603, as further illustrated in FIG. 25, the method can proceed to step 1605 comprising attaching the second portion 231 to the polymer-based portion 241. In further embodiments, the polymer-based portion 241 can be positioned between the first portion 221 and the second portion 231. In further embodiments, as shown, the polymer-based portion 241 may contact the first edge surface 229 of the first portion 221. In even further embodiments, as shown, the polymer-based portion 241 can cover (e.g., be disposed over) at least a portion of the second surface area 225 of the first portion 221. In still further embodiments, a thickness of the polymer-based portion measured from the second surface area 225 can be within one or more of the ranges discussed above for the polymer thickness 415. In even further embodiments, as shown, the polymer-based portion 241 can cover (e.g., be disposed over) at least a portion of the fourth surface area 235 of the second portion 231. In some embodiments, although not shown, the first portion and the second portion can be rotated 180 degrees such that the polymer-based portion covers at least a portion of the first surface area of the first portion and/or at least a portion of the third surface area of the second portion. In further embodiments, a thickness of the polymer-based portion measured from the first surface area can be within one or more of the ranges discussed above for the polymer thickness 525.

Figure 26:
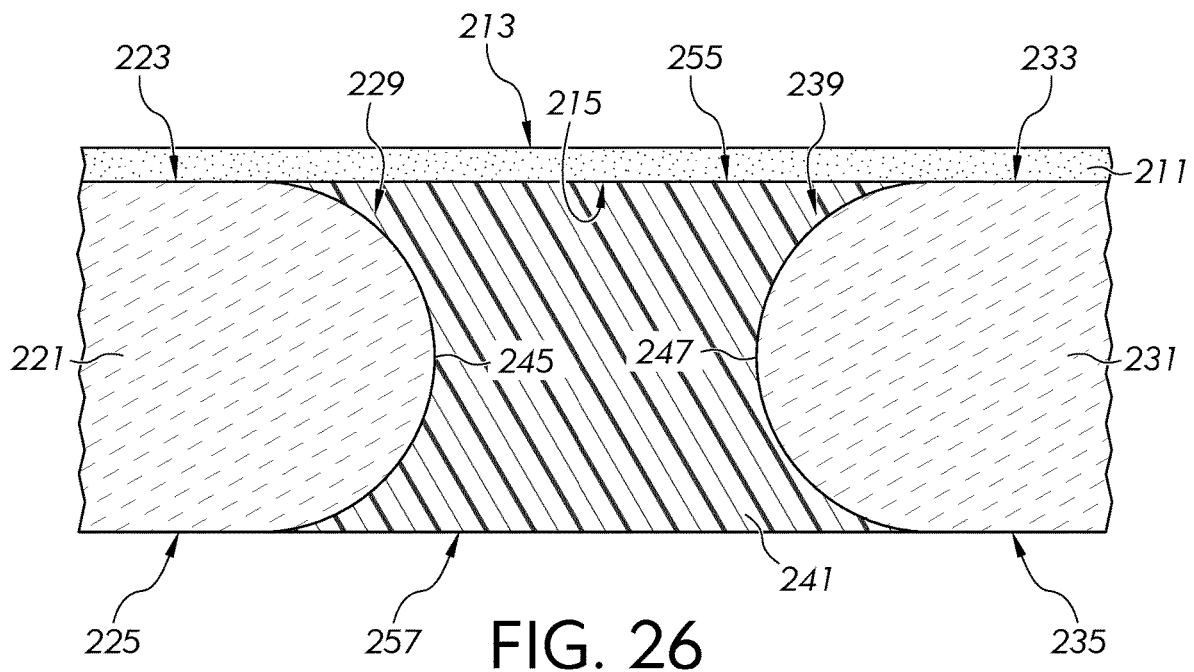

After step 1605, as illustrated in FIG. 26, the method can proceed to step 1607. Step 1607 can comprise disposing the first adhesive layer 211 over the first portion 221, the second portion 231, and the polymer-based portion 241. The second contact surface 215 of the first adhesive layer 211 can face the first surface area 223 of the first portion 221 and the third surface area 233 of the second portion 231. In some embodiments, although not shown, the first adhesive layer 211 can be disposed over the fourth contact surface 257 of the polymer-based portion 241 instead of the third contact surface 255.

Figure 28:
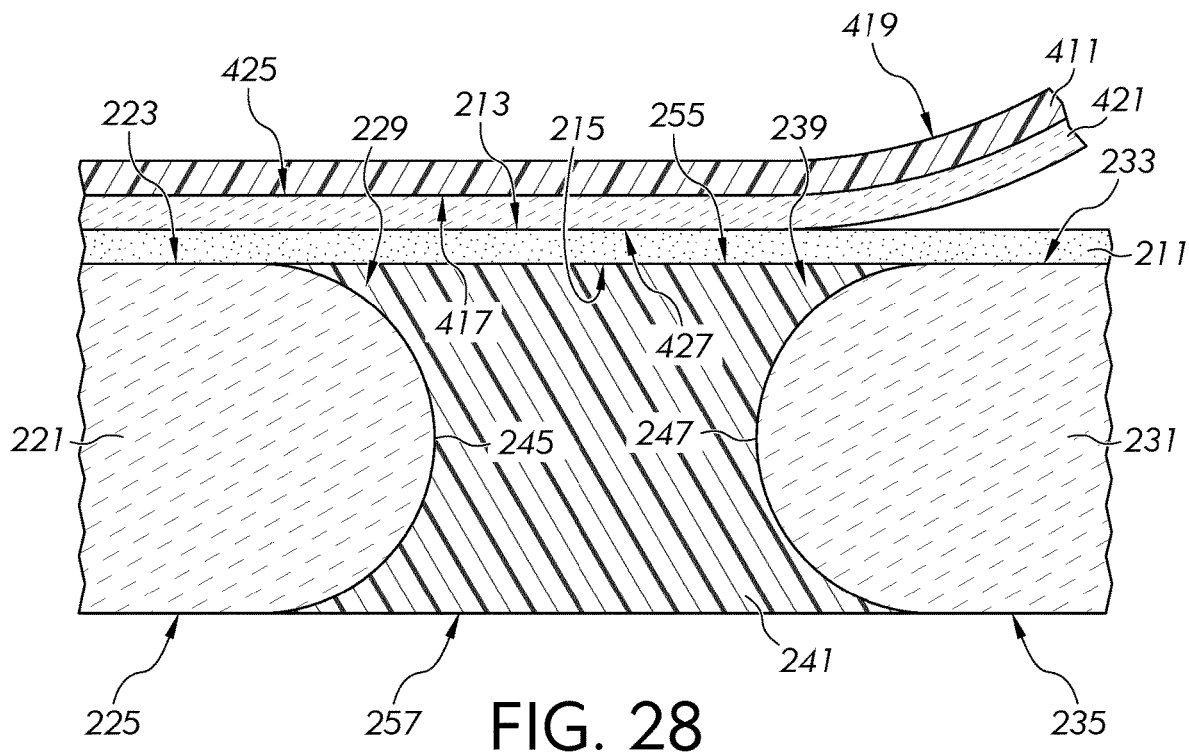

After step 1607, the method can proceed to step 1609. Step 1609 can comprise disposing the first substrate 203 over the first adhesive layer 211. In some embodiments, the second major surface 207 of the first substrate 203 may face the first contact surface 213 of the first adhesive layer 211. In some embodiments, as shown in FIG. 28, a backing substrate 421 can be disposed over the first adhesive layer 211 instead of the first substrate 203, for example, with the second major surface 427 of the backing substrate 421 facing the first contact surface 213 of the first adhesive layer 211. In further embodiments, as shown in FIG. 28, a coating 411 (e.g., a polymeric coating) may be disposed over the first major surface 425 of the backing substrate 421 before disposing the backing substrate 421 over the first adhesive layer 211, which may produce a foldable apparatus resembling FIG. 4. In further embodiments, a coating 411 (e.g., polymeric coating) may be disposed over the first major surface 425 of the backing substrate 421 after disposing the backing substrate 421 over the first adhesive layer 211, which may produce a foldable apparatus resembling FIG. 4. In some embodiments, a coating 411 can be disposed over the first adhesive layer 211.

In further embodiments, step 1609 may further comprise disposing a second adhesive layer 507 and optionally a release liner 503 or other substrates (e.g., a substrate similar or identical to the first substrate 203 discussed throughout the application) or display device 603 to form a foldable apparatus (e.g., resembling one of FIGS. 5-6). In even further embodiments, step 1609 can comprise disposing the second substrate 703 over the second adhesive layer 507 or the fourth contact surface 257 of the polymer-based portion 241. In still further embodiments, a third adhesive layer 717 can be disposed over the second substrate 703, which can then optionally have a release liner 503 and/or display device disposed thereon.

In some embodiments, step 1609 can comprise disposing the inorganic layer 737 over the third contact surface 255 of the polymer-based portion. For example, as discussed below with reference to FIGS. 29-30, the first adhesive layer 211 can be disposed over the polymer-based portion 241 by curing an adhesive liquid 3003 positioned between the first outer edge surface 741 and the second outer edge surface 743 before attaching the inorganic layer 737 to the first adhesive layer 211. In even further embodiments, the inorganic layer 737 can be attached to the polymer-based portion 241 by the first adhesive layer 211, although the inorganic layer 737 may contact the polymer-based portion 241 in other embodiments. In some embodiments, the method may be complete after step 1609.

Figure 27:
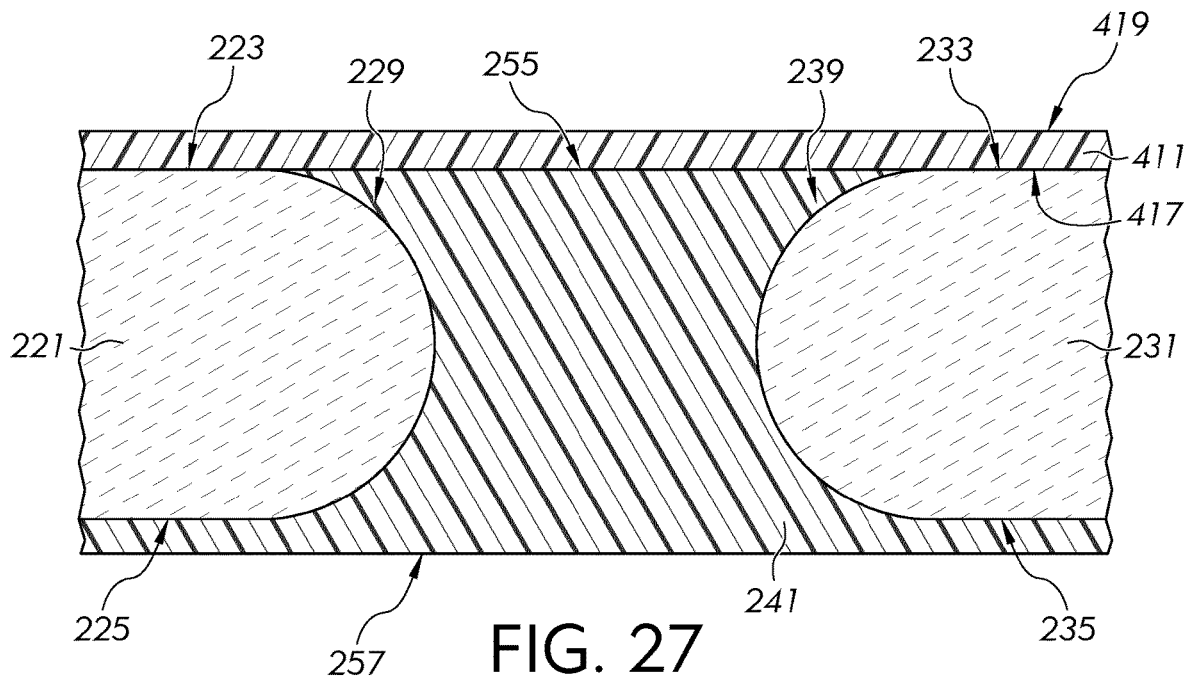

In some embodiments, methods of making a foldable apparatus in accordance with embodiments of the disclosure can proceed along steps 1601, 1603, 1605, 1607, and 1609 sequentially, as discussed above. In some embodiments, methods can interchange steps 1603 and 1605 by attaching the second portion 231 to the polymer-based portion 241 before attaching the first portion 221, following arrow 1602, arrow 1604, and arrow 1606 sequentially as indicated in the flow chart in FIG. 16. In some embodiments, methods can omit step 1607 and interchange steps 1603 and 1605 by disposing a coating 411 over at least the polymer-based portion, as shown in FIG. 27, following arrow 1602, arrow 1604, and arrow 1608 sequentially as indicated in the flow chart in FIG. 16. In further embodiments, the coating 411 can be disposed over the first portion 221, the second portion 231, and the polymer-based portion 241. In further embodiments, the coating 411 can be disposed over the first portion 221, the second portion 231, and the polymer-based portion 241 by disposing a second liquid that is cured to form the coating 411. In some embodiments, the method may start at step 1603, 1605, or 1607 when a polymer-based portion 241 attached to the first portion 221 and/or second portion 231 is obtained by purchasing or otherwise. In some embodiments, the first substrate and/or the coating can be replaced by the inorganic layer, for example, when the first portion 221 comprises the first outer surface 751 that stands proud from the first surface area 223 by the recess depth 749 and/or the second portion 231 comprises the second outer surface 753 that stands proud from the third surface area 233 by the recess depth 749. Any of the above options may be combined to make a foldable apparatus in accordance with embodiments of the disclosure.

Figure 29:
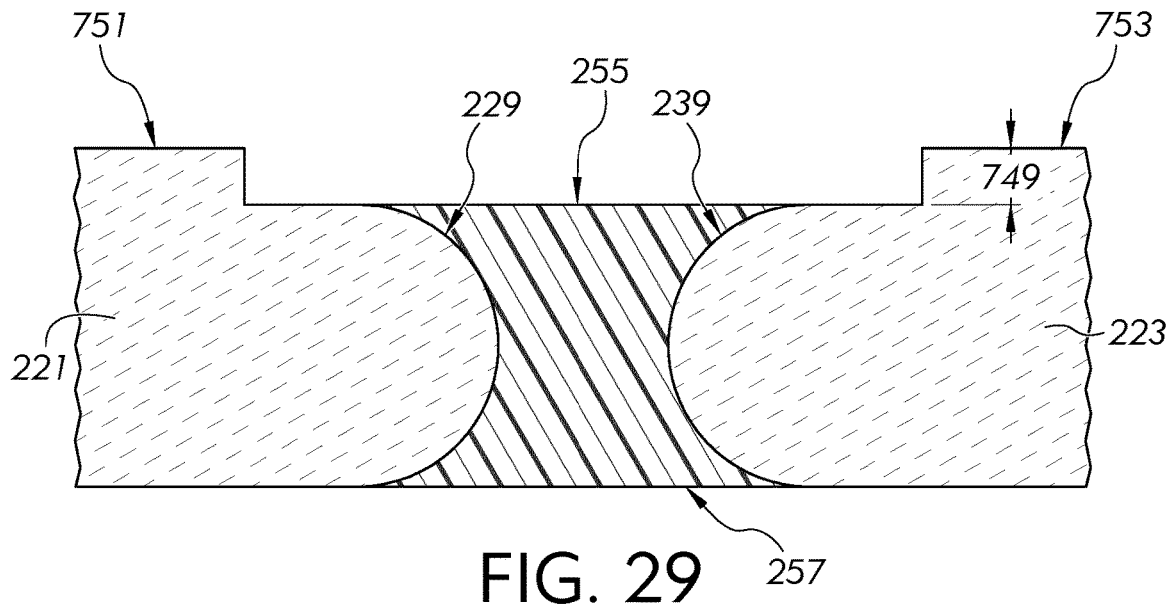
Figure 30:
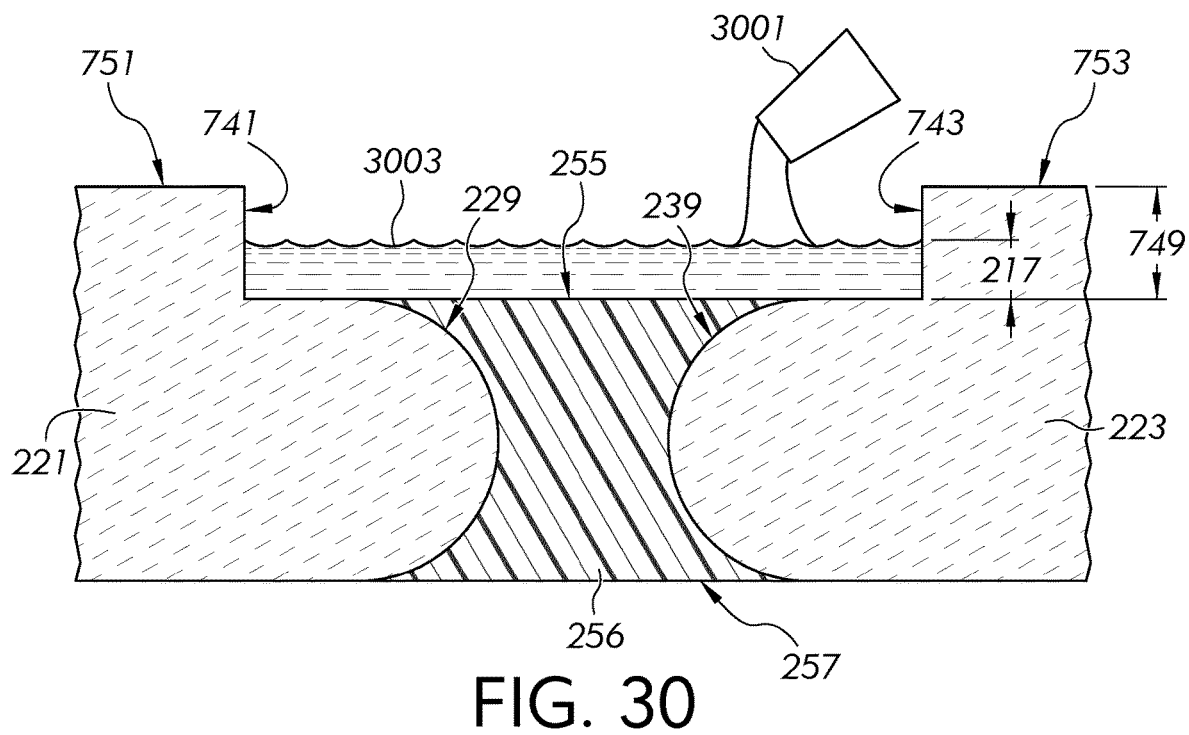

Example embodiments of making the foldable apparatus 101, 301, 401, 501, 601, 701, and 801 illustrated in FIGS. 1-8 will now be discussed with reference to FIGS. 23-30 and the flow chart in FIG. 16. The flow chart in FIG. 16 will be discussed with reference to a first substrate 203. Although not shown, it is to be understood that in some embodiments the first substrate 203 may comprise the backing substrate 421 and/or may have a coating 411 disposed over its first major surface. Although not shown, it is to be understood that in some embodiments the first substrate 203 can be replaced with a coating 411. Although not shown, it is to be understood that in some embodiments the first substrate 203 can be replaced with an inorganic layer 735. Although not shown in FIGS. 23-28, it is to be understood that the flow chart in FIG. 16 and associated methods are applicable to a first portion 221 comprising the first outer surface 751 that stands proud from the first surface area 223 by the recess depth 749 and/or the second portion 231 comprising the second outer surface 753 that stands proud from the third surface area 233 by the recess depth 749, for example, as shown in FIGS. 29-30. Although not shown, it is to be understood that the method can produce foldable apparatus comprising a second substrate and/or a third adhesive layer, for example, as shown in FIG. 7.

Figure 23:
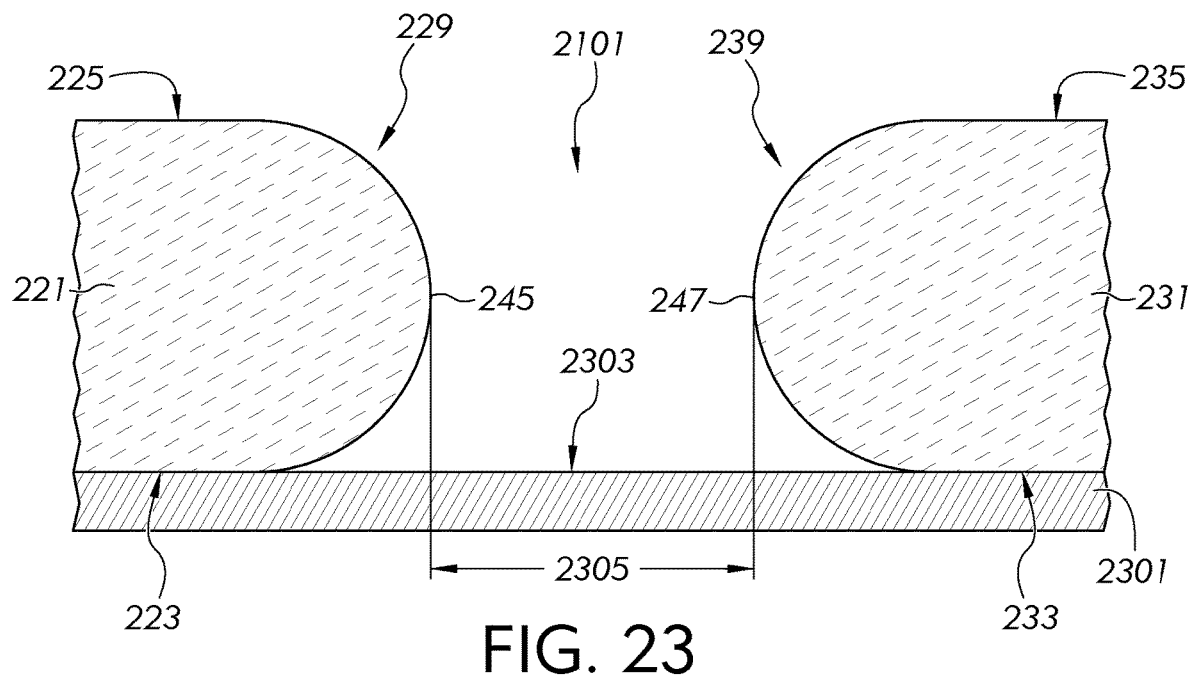
Figure 24:
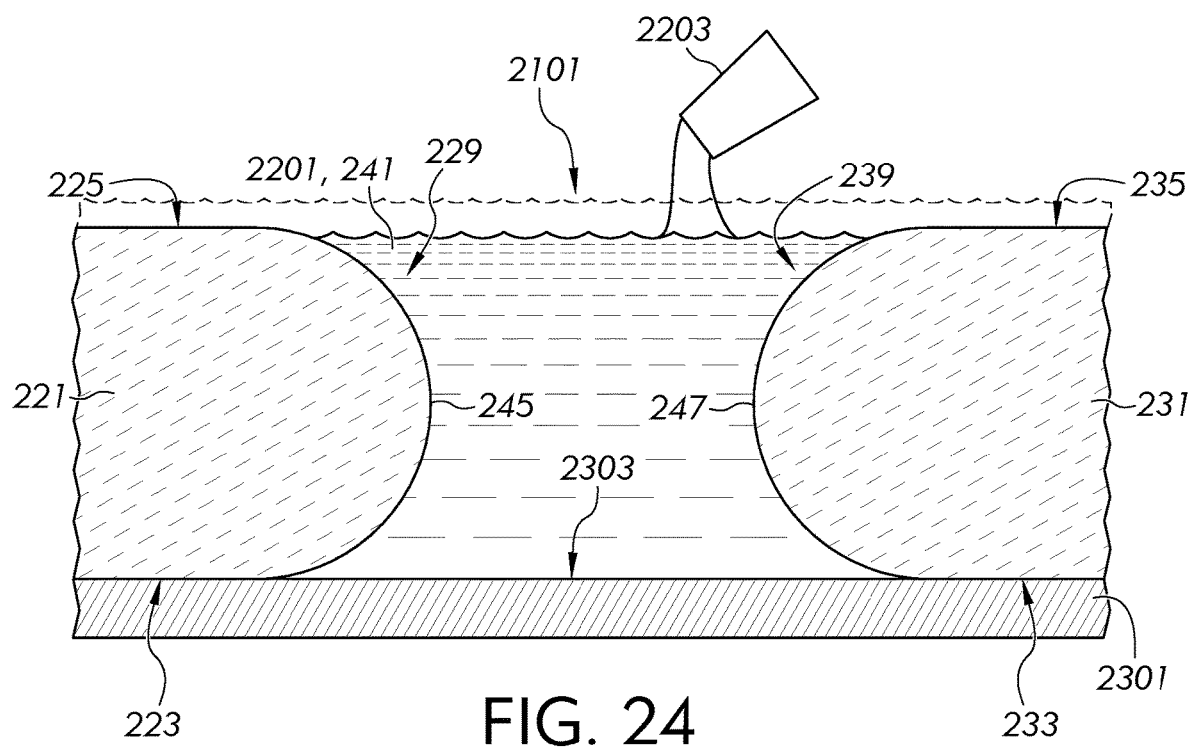

In some embodiments, a first step 1611 of methods of the disclosure can comprise spacing the first portion 221 apart from the second portion 231, as shown in FIG. 23. In further embodiments, a minimum distance 2305 between the first portion 221 and the second portion 231 can be within the ranges discussed above with regards to minimum distance 243. In further embodiments, as shown, a layer 2301 can be attached to the first portion 221 and the second portion 231. In even further embodiments, although not shown, the layer 2301 can comprise a contact surface 2303 that can face the second surface area 225 of the first portion 221 and/or the fourth surface area 235 of the second portion 231. In even further embodiments, as shown in FIGS. 23-24, the layer 2301 can comprise a contact surface 2303 that can face the first surface area 223 of the first portion 221 and/or the third surface area 233 of the second portion 231. In even further embodiments, the layer 2301 can comprise a flexible layer (e.g., a flexible film). In even further embodiments, the layer 2301 can comprise a removable layer that may be removed by a wide range of techniques, for example, peeling off the layer, heating the layer, exposing the layer to light or other techniques. In still further embodiments, the layer 2301 can comprise a polymer although the layer 2301 may be formed from other materials in further embodiments. In still further embodiments, the layer 2301 may comprise applying a previously formed layer that can, for example, comprise a tape. In still further embodiments, the layer 2301 can comprise a polymeric pressure-sensitive adhesive, for example, a block copolymer (e.g., a styrene-rubber block copolymer). In yet further embodiments, the pressure-sensitive adhesive can comprise a high-temperature release film, meaning that the adhesion of the polymeric adhesive decreases above a predetermined temperature (e.g., 100° C., 150° C., 200° C., 300° C., 400° C.), which can comprise, for example, polypropylene, PVF, ETFE, FEP, polyimide, and/or polymethylpentene. In yet further embodiments, the pressure-sensitive adhesive can comprise a low-temperature release film, meaning that the adhesion of the polymeric adhesive decreases below a predetermined temperature (e.g., 100° C., 50° C., 30° C.). By providing a pressure-sensitive adhesive that comprises a temperature-sensitive release film (e.g., high-temperature release film, low-temperature release film), processing costs can be reduced and potential damage to the foldable apparatus associated with removing the layer 2301. In some embodiments, although not shown, step 1611 can further comprise disposing an inorganic layer 737 and/or a first adhesive layer 211 over the layer 2301, for example, before attaching the first portion 221 and the second portion 231 to the layer 2301 such that the inorganic layer 737 and/or first adhesive layer 211 are positioned between the first portion 221 and the second portion 231.

After step 1611, as shown in FIG. 24, the method can proceed to step 1613 comprising filling a recess 2101 between the first portion 221 and the second portion 231 with a liquid 2201 to form the polymer-based portion 241. In some embodiments, as shown, forming the polymer-based portion 241 can comprise dispensing a liquid 2201 from a container 2203 into the recess 2101. As shown by the solid liquid lines, in some embodiments, the liquid 2201 may fill the recess 2101 until the liquid level is coplanar with the second surface area 225 of the first portion 221 and the fourth surface area 235 of the second portion 231. In further embodiments, as shown in dashed liquid level lines, the liquid 2201 may be poured so that the liquid level is disposed over the second surface area 225 and the fourth surface area 235. In even further embodiments, the liquid level may be a distance above the second surface area 225 and/or a distance above the fourth surface area 235 that can be within one or more of the ranges discussed above for the polymer thickness 415. In further embodiments, the liquid 2201 can comprise any of the materials discussed above with respect to FIG. 22 including precursors of the materials and/or solvents. In some embodiments, the method can further include the step of curing the liquid 2201 to connect the pair of portions 221 and 231 together. In some embodiments, curing the liquid 2201 can comprise heating, ultraviolet (UV) irradiation, and/or waiting for a predetermined period of time. In some embodiments, the layer 2301 can be removed after forming the polymer-based portion 241, as shown in FIG. 25. In even further embodiments, as shown, the polymer-based portion 241 can cover (e.g., be disposed over) at least a portion of the second surface area 225 of the first portion 221. In still further embodiments, a thickness of the polymer-based portion measured from the second surface area 225 can be within one or more of the ranges discussed above for the polymer thickness 415. In even further embodiments, as shown, the polymer-based portion 241 can cover (e.g., be disposed over) at least a portion of the fourth surface area 235 of the first portion 221. In some embodiments, although not shown, the first portion and the second portion can be rotated 180 degrees such that the polymer-based portion covers at least a portion of the first surface area of the first portion and/or at least a portion of the third surface area of the second portion. In further embodiments, a thickness of the polymer-based portion measured from the first surface area can be within one or more of the ranges discussed above for the polymer thickness 525.

After step 1613, as shown in FIG. 26, the method can proceed to step 1607. Step 1607 can comprise disposing the first adhesive layer 211 over the first portion 221, the second portion 231, and the polymer-based portion 241. The second contact surface 215 of the first adhesive layer 211 can face the first surface area 223 of the first portion 221 and the third surface area 233 of the second portion 231.

After step 1607, the method can proceed to step 1609. In some embodiments, step 1609 can comprise disposing the first substrate 203 over the first adhesive layer 211. In further embodiments, the second major surface 207 of the first substrate 203 may face and/or contact the first contact surface 213 of the first adhesive layer 211. In some embodiments, step 1609 can comprise disposing the backing substrate 421 over the first adhesive layer 211. In further embodiments, the second major surface 427 of the backing substrate 421 can face and/or contact the first contact surface 213 of the first adhesive layer 211. In further embodiments, a coating 411 (e.g., polymeric coating) may be disposed over the first major surface 425 of the backing substrate 421 before disposing the backing substrate 421 over the first adhesive layer 211, which may produce a foldable apparatus resembling FIG. 4. In further embodiments, a coating 411 (e.g., polymeric coating) may be disposed over the first major surface 425 of the backing substrate 421 after disposing the backing substrate 421 over the first adhesive layer 211, which may produce a foldable apparatus resembling FIG. 4. In further embodiments, step 1609 may further comprise disposing a second adhesive layer 507 and optionally a release liner 503 or other substrates (e.g., a substrate similar or identical to the first substrate 203 discussed throughout the application) or display device 603 to form a foldable apparatus (e.g., resembling one of FIGS. 5-6). In even further embodiments, the foldable apparatus shown in FIG. 6 can be produced when the first substrate 203 is replaced with the coating 411 in the first step 1601. In further embodiments, the first substrate 203 may be replaced with a second substrate, and the liquid can extend to the dashed lines in FIG. 22 to produce a foldable apparatus resembling FIG. 5. In some embodiments, the method may be complete after step 1609.

In some embodiments, methods of making a foldable apparatus in accordance with embodiments of the disclosure can proceed along steps 1611, 1613, 1607, and 1609 sequentially, as discussed above. In some embodiments, the layer 2301 if present can be removed in any of steps 1613, 1607, or 1609. In some embodiments, methods can omit step 1607 by disposing a coating 411 over at least the polymer-based portion, as shown in FIG. 27, following arrow 1610 as indicated in the flow chart in FIG. 16. In further embodiments, the coating 411 can be disposed over the first portion 221, the second portion 231, and the polymer-based portion 241. In further embodiments, the coating 411 can be disposed over the first portion 221, the second portion 231, and the polymer-based portion 241 by disposing a second liquid that is cured to form the coating 411. In some embodiments, the method may start at step 1613 or 1607 when a polymer-based portion 241 attached to the first portion 221 and/or second portion 231 is obtained by purchasing or otherwise. In some embodiments, the foldable apparatus may be rotated 180 degrees relative to the configuration shown in FIG. 25 after removing the layer 2301, to produce a polymer-based portion 241 resembling FIG. 5 instead of FIG. 4. Any of the above options may be combined to make a foldable apparatus in accordance with embodiments of the disclosure.

Example embodiments of making the foldable apparatus 101, 301, 401, 501, 601, 701, and/or 801 illustrated in FIGS. 1-8 will now be discussed with reference to FIGS. 24-30 and the flow chart in FIG. 18. In a first step 1801 of methods of the disclosure, methods can start with spacing a first portion 221 apart from a second portion 231. In further embodiments, as shown in FIG. 23, a minimum distance 2305 between the first portion 221 and the second portion 231 can be within the ranges discussed above with regards to minimum distance 243. In further embodiments, as shown, a layer 2301 can be attached to the first portion 221 and the second portion 231. In even further embodiments, as shown, the layer 2301 can comprise a contact surface 2303 that can face the second surface area 225 of the first portion 221 and/or the fourth surface area 235 of the second portion 231. In even further embodiments, although not shown, the layer 2301 can comprise a contact surface 2303 that can face the first surface area 223 of the first portion 221 and/or the third surface area 233 of the second portion 231. In even further embodiments, the layer 2301 can comprise a flexible layer (e.g., a flexible film). In even further embodiments, the layer 2301 can comprise a removable layer that may be removed by a wide range of techniques and/or can comprise any of the materials discussed above with reference to the layer 2301.

After step 1801, methods of the disclosure can proceed to step 1803 or 1805, which comprise filling a recess 2101 between the first portion 221 and the second portion 231 with a liquid 2201 and curing the liquid to form the polymer-based portion 241. Step 1803, as shown in FIG. 24, comprises curing the liquid to form a polymer-based portion while the first substrate is in a flat configuration while step 1805, although not shown, comprises curing the liquid to form a polymer-based portion while the first substrate is in a bent configuration. Step 1805 may be similar to the bent configurations shown in FIG. 13. In some embodiments, the layer 2301 can be in a bent configuration such that the contact surface 2303 is on the outside of the bend. In some embodiments, the first substrate 203 can be in a bent configuration such that the contact surface 2303 is on the inside of the bend.

Filling the recess and curing the liquid to form the polymer-based portion, which are common to both steps 1803 and 1805, will now be discussed with regards to step 1803 with the understanding that such description of step 1803, unless otherwise stated, can also apply to step 1805. The filling the recess and curing the liquid to form the polymer-based portion can be similar to or identical with the materials and/or methods discussed above with reference to step 1609 and FIG. 22. In some embodiments, as shown, forming the polymer-based portion 241 can comprise pouring a liquid 2201 from a container 2203 into the recess 2101. In some embodiments, the method can further include the step of curing the liquid 2201 into the polymer-based portion 241 to connect the pair of portions 221 and 231 together. In some embodiments, curing the liquid 2201 can comprise heating, ultraviolet (UV) irradiation, and/or waiting for a predetermined period of time. In some embodiments, the layer 2301 can be removed after forming the polymer-based portion 241, as shown in FIG. 25. Step 1803 can comprise depositing a liquid 2201 into the recess 2101. The liquid 2201 can be cured to form the polymer-based portion 241. As discussed above, the polymer-based portion 241 can comprise a negative coefficient of thermal expansion. As discussed above, curing the liquid 2201 to form the polymer-based portion 241 can result in an increase in volume.

After step 1803 or 1805, as shown in FIG. 26, the method can proceed to step 1807. Step 1807 can comprise disposing the first adhesive layer 211 over the first portion 221, the second portion 231, and the polymer-based portion 241. The second contact surface 215 of the first adhesive layer 211 can face the first surface area 223 of the first portion 221 and the third surface area 233 of the second portion 231.

After step 1807, the method can proceed to step 1809 or 1811, which comprise disposing the first substrate 203 over the first adhesive layer 211. Step 1811 comprises disposing a flat (e.g., unbent) first substrate 203 over the first adhesive layer 211 while step 1809 comprises disposing a bent first substrate 203 over the first adhesive layer 211. Step 1809 can comprise disposing a bent first substrate 203 over the first contact surface 213 of the first adhesive layer 211. In some embodiments, the bent first substrate 203 can be obtained by bending the first substrate 203 into a bent configuration while the first substrate 203 comprises a viscosity in a range from about $10^4$ Pascal-seconds and about $10^7$ Pascal-seconds (e.g., in a working range of the first substrate 203, between a softening point of the first substrate 203 and a working point of the first substrate 203). In some embodiments, the first substrate 203 can be replaced with the inorganic layer 737, for example, when the first portion 221 comprises the first outer surface 751 that stands proud from the first surface area 223 by the recess depth 749 and/or the second portion 231 comprises the second outer surface 753 that stands proud from the third surface area 233 by the recess depth 749.

Disposing the first substrate 203 and/or the inorganic layer 737 over the first adhesive layer 211, which is common to both steps 1809 and 1811, will now be discussed with regards to step 1811 with the understanding that such description of step 1811, unless otherwise stated, can also apply to step 1809. In some embodiments, as shown in FIGS. 2-3, the second major surface 207 of the first substrate 203 may face the first contact surface 213 of the first adhesive layer 211. In some embodiments, as shown in FIGS. 4 and 28, the second major surface 427 of the backing substrate 421 may face the first contact surface 213 of the first adhesive layer 211. In further embodiments, a coating (e.g., coating 411, polymeric coating) may be disposed over the first major surface 425 of the backing substrate 421 before disposing the backing substrate 421 over the first adhesive layer 211, which may produce a foldable apparatus resembling FIG. 4. In further embodiments, as shown, a coating 411 (e.g., polymeric coating) may be disposed over the first major surface 425 of the backing substrate 421 after disposing the backing substrate 421 over the first adhesive layer 211, which may produce a foldable apparatus resembling FIG. 4. In further embodiments, step 1809 may further comprise disposing the second adhesive layer 507 over the polymer-based portion 241. In even further embodiments, step 1809 may further comprise disposing a second substrate 703 and/or an optional third adhesive layer 717 over the polymer-based portion 241 and/or the second adhesive layer 507. In further embodiments, step 1809 can further comprise disposing the release liner 503 or other substrates (e.g., a substrate similar or identical to the first substrate 203 discussed throughout the application) or display device 603 to form a foldable apparatus (e.g., resembling one of FIGS. 5-8).

In some embodiments, as shown in FIGS. 29-30, the first portion 221 can comprise the first outer surface 751 that stands proud from the first surface area 223 by the recess depth 749 and/or the second portion 231 can comprise the second outer surface 753 that stands proud from the third surface area 233 by the recess depth 749. In further embodiments, as shown in FIGS. 29-30, the first outer surface 751 and/or the second outer surface 753 can stand proud from the third contact surface 255 of the polymer-based portion 241. In further embodiments, as shown in FIG. 30, methods can comprise disposing the first adhesive layer over the third contact surface 255 of the polymer-based portion 241, for example, by dispensing an adhesive liquid 3003 from container 3001 into a region between the first outer edge surface 741 and the second outer edge surface 743 that can subsequently be cured to produce the first adhesive layer 211. The adhesive liquid can comprise precursor(s) of the first adhesive layer and/or solvents, as discussed above with reference to the liquid 2201. In even further embodiments, the inorganic layer 737 can be disposed over the polymer-based portion 241 and/or the first adhesive layer 211 to form a foldable apparatus (e.g., resembling one of FIGS. 7-8). At the end of the flow chart in FIG. 18 (e.g., step 1813) the foldable apparatus is complete.

In some embodiments, the foldable apparatus after step 1813 can comprise a neutral stress configuration when the foldable apparatus is in a bent configuration. In further embodiments, the foldable apparatus can comprise a maximum magnitude of the deviatoric strain of the polymer-based portion in one or more of the ranges discussed above (e.g., in a range from about 1% to about 8%, from about 2% to about 6%) in the neutral stress configuration. In further embodiments, the foldable apparatus can comprise an angle within one or more of the ranges discussed above in the neutral stress configuration. In some embodiments, the neutral stress configuration can correspond to a bent configuration as a result of bending the first substrate 203. In some embodiments, the neutral stress configuration can correspond to a bent configuration as a result of curing the liquid 2201 to form the polymer-based portion 241 while the layer 2301 was bent. In some embodiments, the neutral stress configuration can correspond to a bent configuration as a result of an increase in volume in curing the liquid 2201 to form the polymer-based portion 241. In some embodiments, the neutral stress configuration can correspond to a bent configuration as a result of the polymer-based portion 241 comprising a negative coefficient of thermal expansion.

Figure 18:
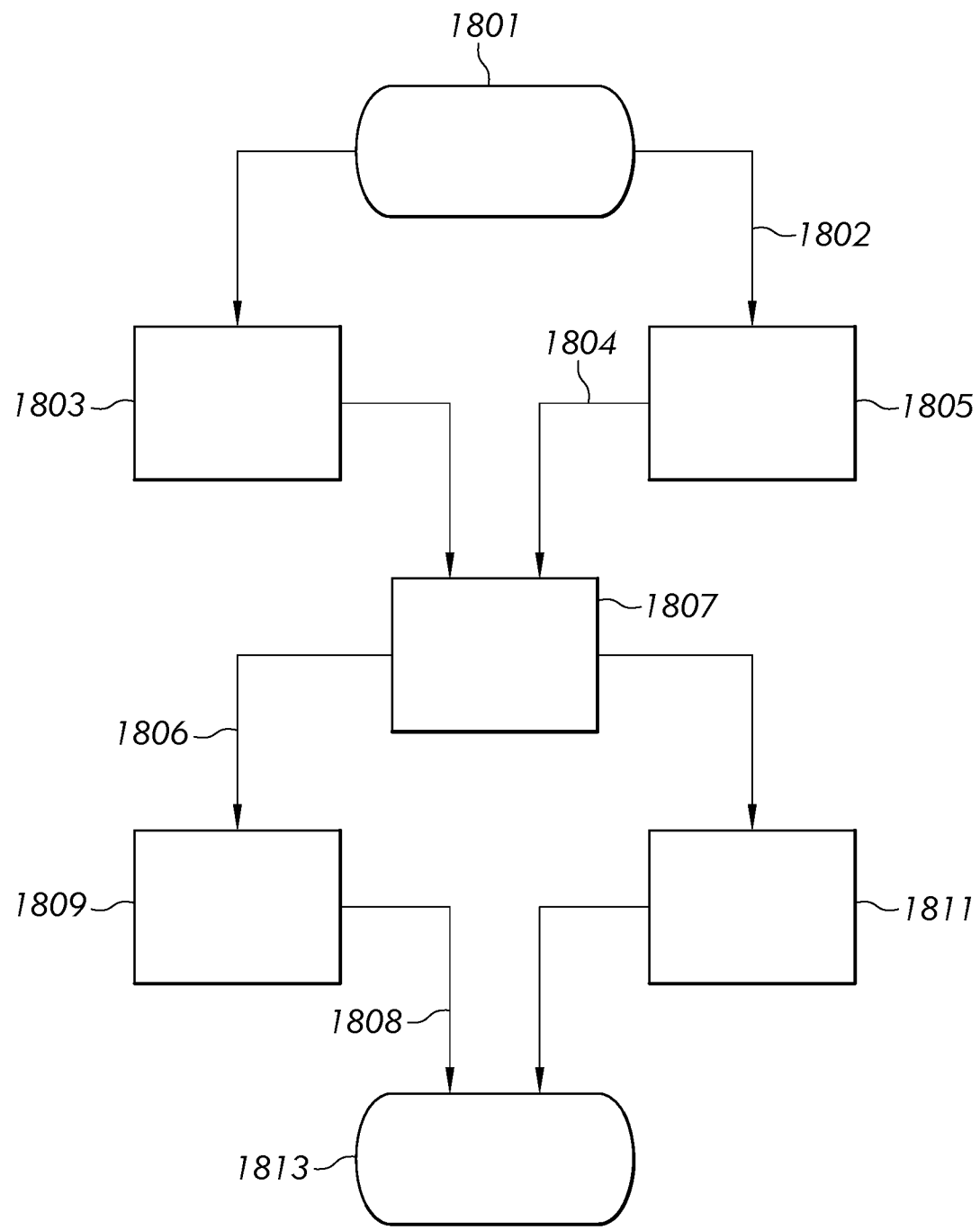

In some embodiments, methods of making a foldable apparatus in accordance with embodiments of the disclosure can proceed along steps 1801, 1803, 1807, 1811, and 1813 of the flow chart in FIG. 18 sequentially, as discussed above. In some embodiments, as shown in FIG. 18, arrow 1802 can be followed from step 1801 to substitute step 1805 comprising curing the liquid 2201 to form the polymer-based portion 241 while the layer 2301 is in a bent configuration in place of step 1803 of the curing the liquid 2201 to form the polymer-based portion 241 while the layer 2301 is in a flat configuration; then, arrow 1804 can be followed to continue to step 1807. In some embodiments, as shown in FIG. 18, arrow 1806 can be followed to substitute step 1809 comprising disposing a bent first substrate 203 over the first adhesive layer 211 in place of step 1811 comprising disposing a flat first substrate 203 over the first adhesive layer 211; then, arrow 1808 can be followed to continue to step 1813. Any of the above options may be combined to make a foldable apparatus in accordance with embodiments of the disclosure.

EXAMPLES

Various embodiments will be further clarified by the following examples. The Examples were modeled using Abaqus software finite element analysis from Dassault Systems Simulia and parameters of interface strength (between the adhesive, the substrate, and the first and second portions), yield strength of the adhesive, shape of the edges of the first and second portions, and Young's modulus of the polymer-based portion. In these examples, the only variable changed was the shape of the edges. Examples A-G comprise different edge surfaces and are discussed with reference to FIGS. 31-34. Examples H-I and Q-R are discussed with reference to FIGS. 35-38 and Tables 1. Examples V-Z are discussed with reference to Table 2. Examples AA-QQ are discussed with reference to Tables 3-5. All Examples comprised the test adhesive layer 1009 and the PET sheet 1007 as in the foldable test apparatus 901 instead of a second adhesive layer 507, a release liner 503, and/or a display device 603, if present. The edge surfaces were generated by mechanical polishing followed by etching in a mineral acid bath to obtain a surface roughness (Ra) of about 50 nanometers (nm) or less.

Figure 31:
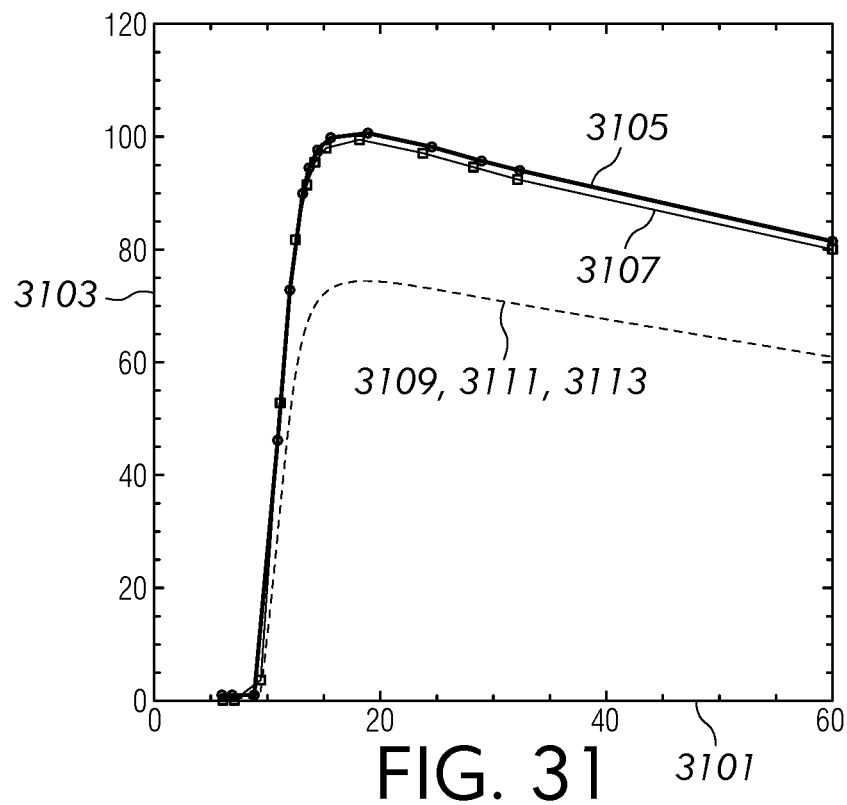
FIGS. 31-38 are plots illustrating experimental results for some embodiments of the disclosure.
Figure 33:
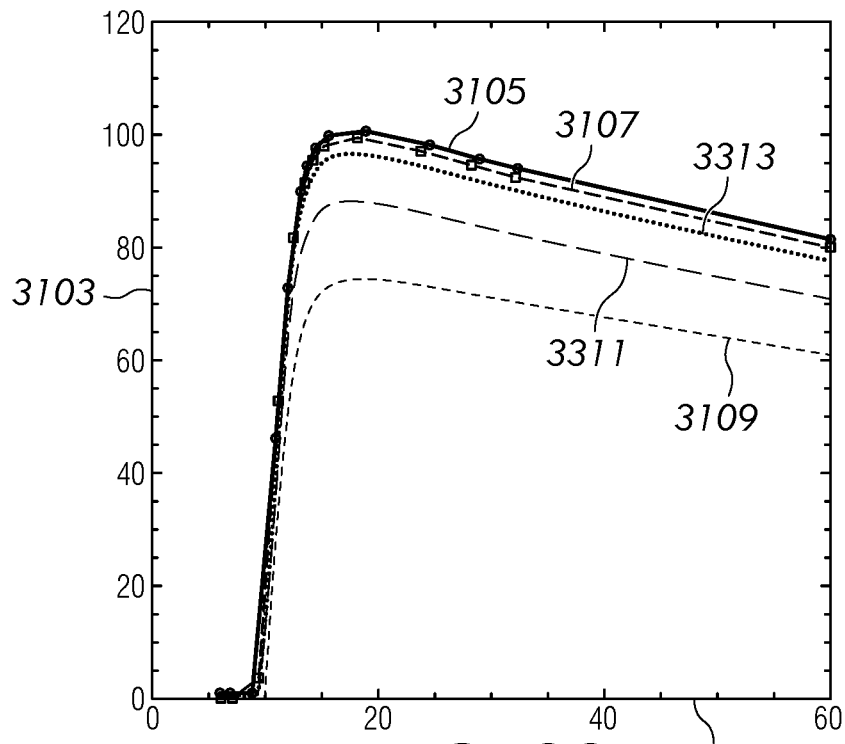

The maximum tensile stress on the substrate of Examples A-E are reported in FIG. 31 while Examples F-G are reported in FIG. 33 when the substrate is on the outside of the bend (e.g., the substrate facing the parallel plates of FIG. 10), opposite the orientation shown in FIG. 10. The maximum strain at the interface between the first portion and the polymer-based portion of Examples A-E are reported in FIG.

Figure 34:
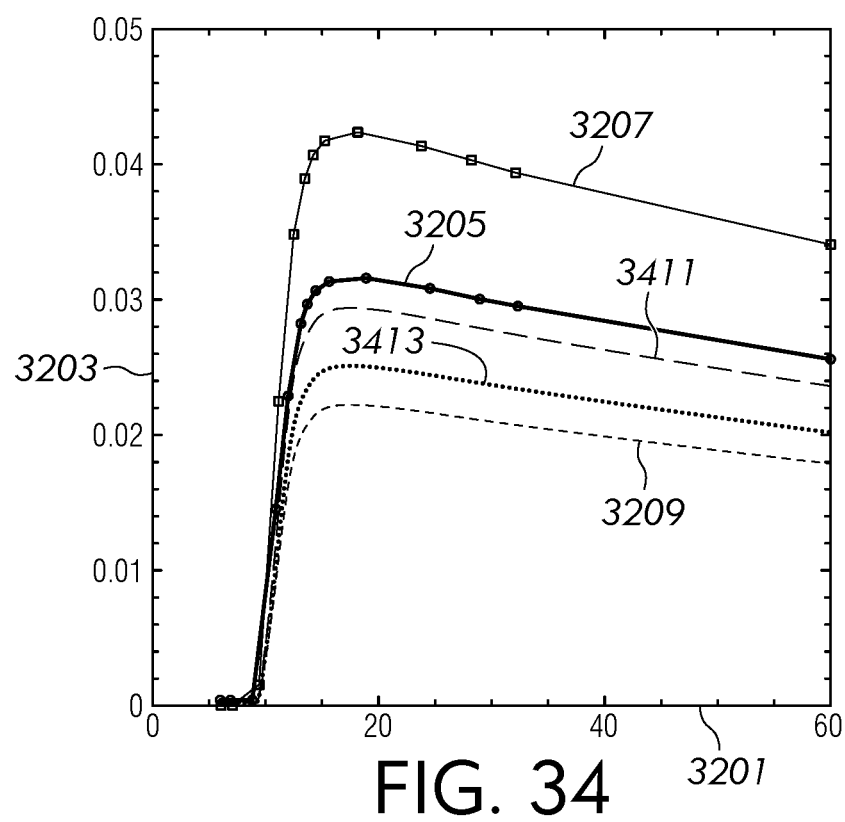

32 while Examples F-G are reported in FIG. 34. All of Examples A-G comprise a first substrate 203 comprising a substrate comprising a glass-based substrate (Composition 1 having a nominal composition in mol % of: 63.6 $SiO_2$; 15.7 $Al_2O_3$; 10.8 $Na_2O$; 6.2 $Li_2O$; 1.16 ZnO; 0.04 $SnO_2$; and 2.5 $P_2O_5$) and a first substrate thickness 209 of 30 μm, the first portion comprising a first glass-based portion 221 (having a Composition 2 of, nominally, in mol % of: 69.1 $SiO_2$; 10.2 $Al_2O_3$; 15.1 $Na_2O$; 0.01 $K_2O$; 5.5 MgO; 0.09 $SnO_2$) and a first thickness 227 of 150 μm, and the second portion comprising a second glass-based portion 231 (Composition 2) and a second thickness 237 of 150 μm, the first adhesive layer 211 comprised the same material as the polymer-based portion 241 with the adhesive layer comprising a first adhesive thickness 217 of 25 μm, and the minimum distance 243 between the first portion 221 and the second portion 231 was 20 mm and filled with the polymer-based portion 241 with an elastic modulus of 500 MegaPascals (MPa).

Example A comprised a first edge and a second comprising a non-blunted edge surface comprising a right angle. Example B comprised a first edge and a second edge comprising a chamfered edge surface, similar to FIG. 2, comprising an internal angle "A" of 150 degrees extending in a direction of the thickness (e.g., first thickness 227, second thickness 237) of the corresponding portion 221, 231 for 30 mm. Example C comprised a first edge and a second edge comprising a rounded edge surface, similar to FIG. 4, comprising a radius of curvature of about 75 μm. Example D comprised a first edge and a second edge comprising an elliptical edge surface, similar to FIG. 5, comprising a major axis equal to the first thickness and a ratio of the major axis to the minor axis of 4. Example E comprised a first edge and a second edge comprising an elliptical edge surface, similar to FIG. 5, comprising a major axis equal to the first thickness and a ratio of the major axis to the minor axis of 2. Example F comprised a first edge and a second edge comprising a compound edge surface, similar to FIG. 6, comprising an upper portion comprising a first radius of curvature of about 75 μm and a lower portion comprising a second radius of curvature of about 25 μm and a flat portion comprising a vertical distance (e.g., second distance 609) of about 50 μm over a horizontal distance of about 150 μm. Example G comprised a first edge and a second edge comprising a compound edge surface, similar to FIG. 6, comprising an upper portion comprising a first radius of curvature of about 75 μm and a lower portion comprising a second radius of curvature of about 25 μm and a flat portion comprising a vertical distance (e.g., second distance 609) of about 50 μm over a horizontal distance of about 250 μm.

In FIG. 31, the horizontal axis 3101 (e.g., x-axis) is the parallel plate distance (in mm), and the vertical axis 3103 (e.g., y-axis) is the maximum tensile stress on the substrate (e.g., first substrate) in MegaPascals (MPa). The results for Example A are shown by curve 3105, the results for Example B are shown by curve 3107, the results for Example C are shown by curve 3109, the results for Example D are shown by curve 3111, and the results for Example E are shown by curve 3113. As shown, Example A comprising the right-angle edge surface has the greatest maximum tensile stress for all parallel plate distances. Example B comprising the chamfered edge surface has slightly lower maximum tensile stresses than Example A. Examples C-E are superimposed on each other. Examples C-E comprising the rounded edge surface or elliptical edge surface comprise lower maximum tensile stresses than Examples A-B. For example, at a parallel plate distance of about 20 mm, the maximum tensile stress for each of Examples C-E is about 30% less than the maximum tensile stress for Examples A-B. Also, each of Examples C-E provides a stress reduction of at least 20 MPa for parallel plate distances of about 15 mm or more. As such, providing a first portion and/or second portion comprising a rounded edge surface or an elliptical edge surface can provide reduced maximum tensile stress on the substrate during folding, which can facilitate lower effective bend radii and/or reduced (e.g., decreased) incidence of breakage and/or fatigue of the substrate. Additionally, it is expected that curved edge profiles (e.g., see FIG. 3) would provide a reduction in maximum tensile stress similar to Examples C-E.

Figure 32:
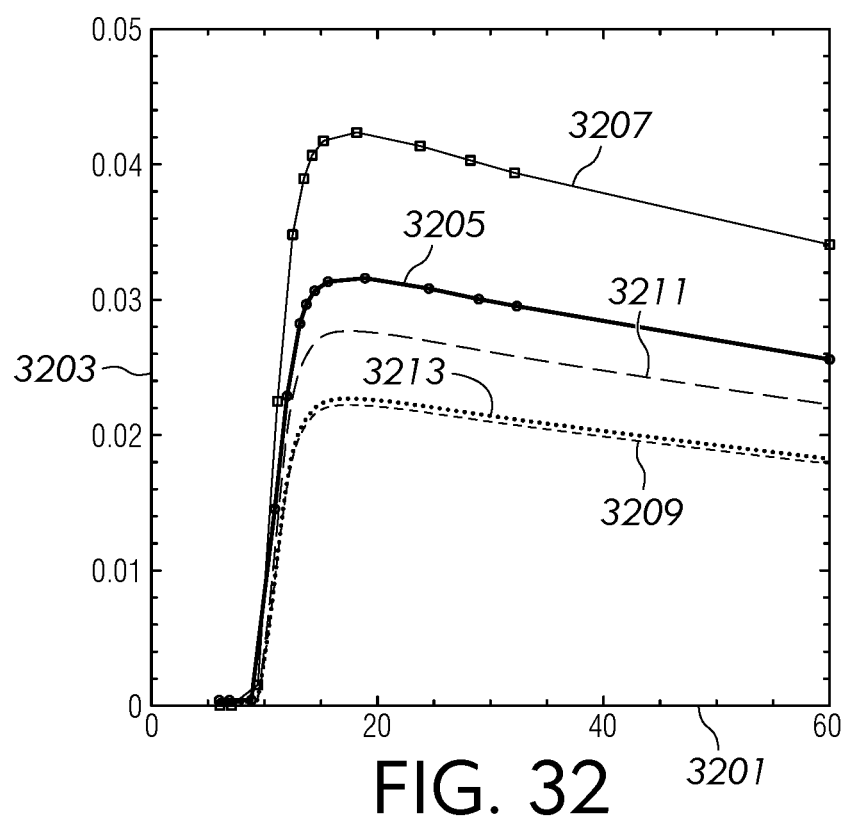

In FIG. 32, the horizontal axis 3201 (e.g., x-axis) is the parallel plate distance (in mm), and the vertical axis 3203 (e.g., y-axis) is the maximum strain at the interface between the first portion and the polymer-based portion. The results for Example A are shown by curve 3207, the results for Example B are shown by curve 3205, the results for Example C are shown by curve 3209, the results for Example D are shown by curve 3211, and the results for Example E are shown by curve 3213. Example A comprising the right-angle edge surface has the greatest interfacial strain for all parallel plate distances. Example B comprising the chamfered edge surface has significantly lower maximum strain than Example A. For example, at a parallel plate distance of 20 mm, the interfacial strain for example B is about 25% less than the interfacial strain for Example A. Example C comprising the rounded edge surface comprises a lower interfacial strain than any of the other examples. For example, at a parallel plate distance of about 20 mm, the interfacial strain for Example C is about 50% less than the interfacial strain for Example A and about 30% less than the interfacial strain for Example B. Examples D and E comprising elliptical edge surfaces provide a reduction in the interfacial strain intermediate between Example A and Example C. Example E comprising a ratio of the major axis to the minor axis of 2 comprises a lower interfacial strain than Example D comprising a ratio of the major axis to the minor axis of 4. As such, it is expected edge surfaces comprising more circular edge profiles (e.g., an elliptical design with an ratio of the major axis to the minor axis closer to 1 than another elliptical design) will better reduce interfacial strain than non-elliptical and non-rounded edge surfaces (e.g., Examples A-B). Providing a first portion and/or second portion comprising a curved, elliptical, and/or rounded edge surface can further provide lower interfacial strain, which can reduce (e.g., decrease) failure of the polymer-based portion and/or portions, facilitating lower effective bend radii and/or reduced (e.g., decreased) incidence of breakage and/or fatigue of the substrate.

In FIG. 33, the horizontal axis 3101 (e.g., x-axis) is the parallel plate distance (in mm), and the vertical axis 3103 (e.g., y-axis) is the maximum tensile stress on the substrate in MegaPascals (MPa), which are the same as in FIG. 31. The results for Examples A-C are the same as in FIG. 31. The results for Example F are shown by curve 3311 and the results for Example G are shown are shown by curve 3313. Example G provides a greater stress reduction than Example F, which still provides a stress reduction relative to Examples A and B. Given that the shorter horizontal distance of Example F (150 μm) compared to Example G (250 μm) provides a stress reduction, it is expected that further reducing the horizontal distance would further provide a stress reduction. For example, the horizontal distance could be eliminated to produce an edge surface comprises a first radius of curvature and a second radius of curvature less than the first radius of curvature.

In FIG. 34, the horizontal axis 3201 (e.g., x-axis) is the parallel plate distance (in mm), and the vertical axis 3203 (e.g., y-axis) is the maximum strain at the interface between the first portion and the polymer-based portion, which are the same as in FIG. 32. The results for Examples A-C are the same as in FIG. 32. The results for example F are shown by curve 3411, and the results for Example G are shown by curve 3413. In FIG. 34, Example G provides a greater strain reduction than Example F, which still provides a strain reduction relative to Examples A-B. This trend for Examples F and G in FIG. 34 is opposite the trend shown in FIG. 33. This suggests that the reduced stress in FIG. 33 of Example F relative to Example G at the substrate surface is the result of increased strain between the polymer-based portion and the first portion and/or second portion. On the one hand, these results suggest that the horizontal distance of Example G could further be increased to reduce the interfacial strain. On the other hand, these results indicate that a foldable apparatus can be designed with a stronger polymer-based portion to compensate for issues with a substrate and/or coating by using a design more like Example F than Example G.

Figure 35:
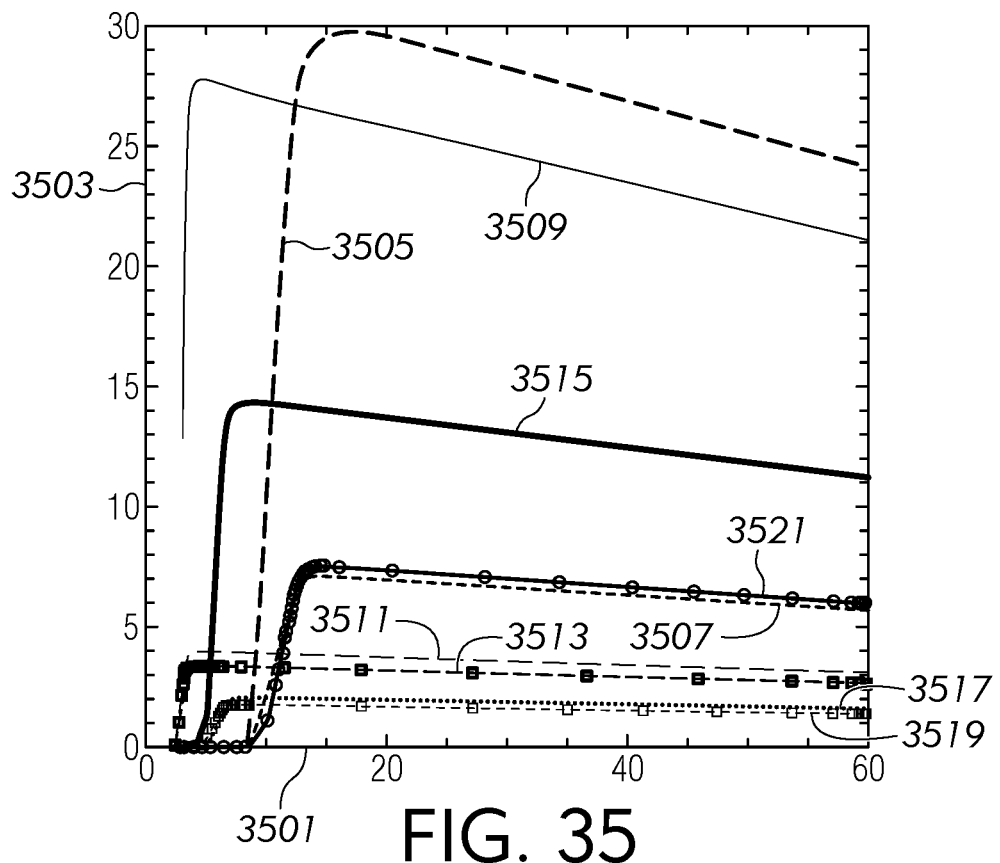
Figure 36:
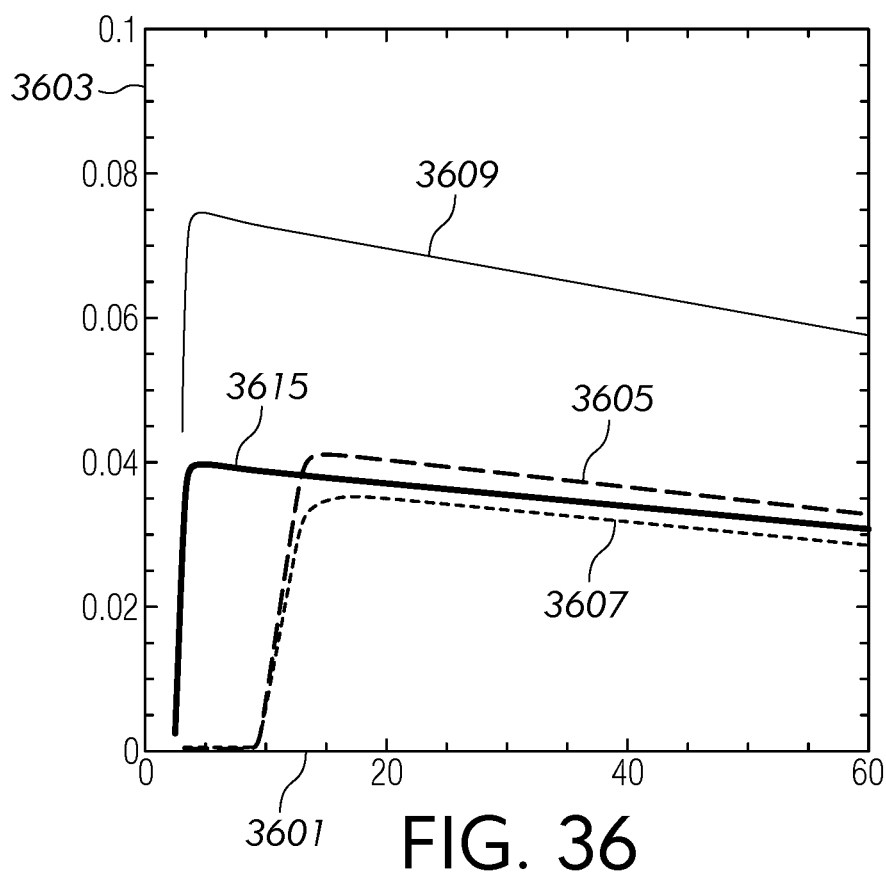

The maximum tensile stress on the substrate of Examples H-P are reported in FIG. 35 while Examples H-I and Examples Q-R are reported in FIG. 36 when the substrate or coating is on the outside of the bend (e.g., the substrate or coating facing the parallel plates of FIG. 10), opposite the orientation shown in FIG. 10. All of Examples H-P comprise the first portion comprising a first glass-based portion 221 (Composition 2), the second portion comprising a second glass-based portion 231 (Composition 2), and the minimum distance 243 between the first portion 221 and the second portion 231 was filled with the polymer-based portion 241 comprising a modulus of 40 MPa. Example R is the same as Example J except that the polymer-based portion 241 comprises an elastic modulus of 100 MPa. Example Q comprises non-blunted edge surfaces, similar to FIG. 8, and the polymer-based portion 241 comprises an elastic modulus of 38 MPa. All of Examples H-P and R comprises a rounded edge surface for the first portion and the second portion, and the radius of curvature was equal to half of the first thickness, similar to FIG. 4. If present, the first substrate comprises a glass-based substrate (Composition 1). The first adhesive layer 211 comprised a 25 μm thick polyurethane-based adhesive (Teroson PU 92 available from Henkel) attaching the first substrate or coating to the first portion, the second portion, and the polymer-based portion. If present, the coating comprised an ethylene acid copolymer. Table 1 summarizes the properties of the Examples H-Q.

TABLE 1

Properties of Examples H-R

| Example | Substrate Thickness (μm) | Coating Thickness (μm) | Minimum Distance (mm) | First Portion Thickness (μm) | Curve (FIGS. 35-36) | Curve (FIGS. 37-38) |
|---|---|---|---|---|---|---|
| H | 30 | 0 | 20 | 50 | 3505, 3605 | 3805 |
| I | 30 | 0 | 20 | 150 | 3507 | 3807 |
| J | 0 | 10 | 5 | 100 | 3509 | 3705 |
| K | 0 | 20 | 5 | 100 | 3511 | 3707 |
| L | 0 | 30 | 5 | 100 | 3513 | 3709 |
| M | 0 | 10 | 10 | 100 | 3515 | 3711 |
| N | 0 | 20 | 10 | 100 | 3517 | 3713 |
| O | 0 | 30 | 10 | 100 | 3519 | 3715 |
| P | 0 | 30 | 20 | 100 | 3521 | 3717 |
| Q | 0 | 30 | 5 | 100 | 3609 | |
| R | 0 | 10 | 5 | 100 | 3615 | |

In FIG. 35, the horizontal axis 3501 (e.g., x-axis) is the parallel plate distance (in mm), and the vertical axis 3503 (e.g., y-axis) is the maximum tensile stress on the first portion 221 in MegaPascals (MPa). The results for Examples H-P are shown with the reference numbers for the curves provided in Table 1. Example H comprising a first thickness of 50 μm experiences additional stress compared to Example I comprising a first thickness of 150 μm. The stress for Example I comprising a 30 μm first substrate is comparable to Example P comprising a 30 μm coating. It is notable that the stress for Examples I and P are as close as they are given that Example I comprises a first thickness of 150 μm while example P comprises a first thickness of 100 μm. As such, providing a coating can provide the unexpected benefit of a reduced stress on the first portion and second portion compared to a glass-based first substrate (because the coating facilitates reduction in the first portion thickness from a 150 μm to 100 μm without increasing the stress on the first portion relative to first substrate in combination with a first portion comprising a thickness of 150 μm).

Decreasing the minimum distance between the first portion and the second portion from 20 mm (Example P) to 10 mm (Example 0) to 5 mm (Example L) while maintaining a coating of 30 μm increases the stress but allows the foldable apparatus to achieve lower parallel plate distances. This trend appears to apply for coatings of 10 μm and 20 μm as well. As such, providing a reduced minimum distance between the first portion and the second portion can provide the technical benefit of facilitating the achievement of smaller parallel plate distances.

Decreasing the coating thickness from 30 μm (Example L) to 20 μm (Example K) reduces the stress by a multiple of 5 or more. The same trend holds for Examples 0 and N, respectively. However, further reducing the coating thickness from 20 μm (Example K) to 10 μm (Example J) reduces the stress by about 20%. Compared to the stress reduction between 30 μm and 20 μm, the stress reduction between 20 μm and 10 μm is minimal. As such, providing a coating of less than 30 μm can minimize the stress encountered by the first portion and the second portion.

In FIG. 36, the horizontal axis 3601 (e.g., x-axis) is the parallel plate distance (in mm), and the vertical axis 3603 (e.g., y-axis) is the maximum strain at the interface between the first portion and the polymer-based portion. The results for Example H are shown by curve 3605, the results for Example I are shown by curve 3607, the results for Example Q are shown by curve 3609, and the results for Example R are shown by curve 3615. Examples Q and R can achieve parallel plate distances less than 5 mm. Example I reduces the strain relative to Example H. Example R comprising a coating of 10 μm and an elastic modulus of the polymer-based portion of 100 MPa reduces the strain relative to Example Q comprising a coating of 30 μm and an elastic modulus of the polymer-based portion of 38 MPa. Providing a coating (ethylene-acid copolymer) of less than 30 μm can reduce interfacial strain. Also, the strain of Example R for parallel plate distances of about 15 mm or more is intermediate to that of Example H and I. Viewing the stress results from FIG. 35 together with the strain results from FIG. 36, providing a coating of less than 30 μm (e.g., in a range from about 10 μm to about 20 μm) can enable folding to small parallel plate distances (e.g., about 5 mm or less), reduced strain on the first portion compared to thicker coatings or a first substrate, and comparable interfacial strain between the polymer-based portion and the first portion.

Figure 37:
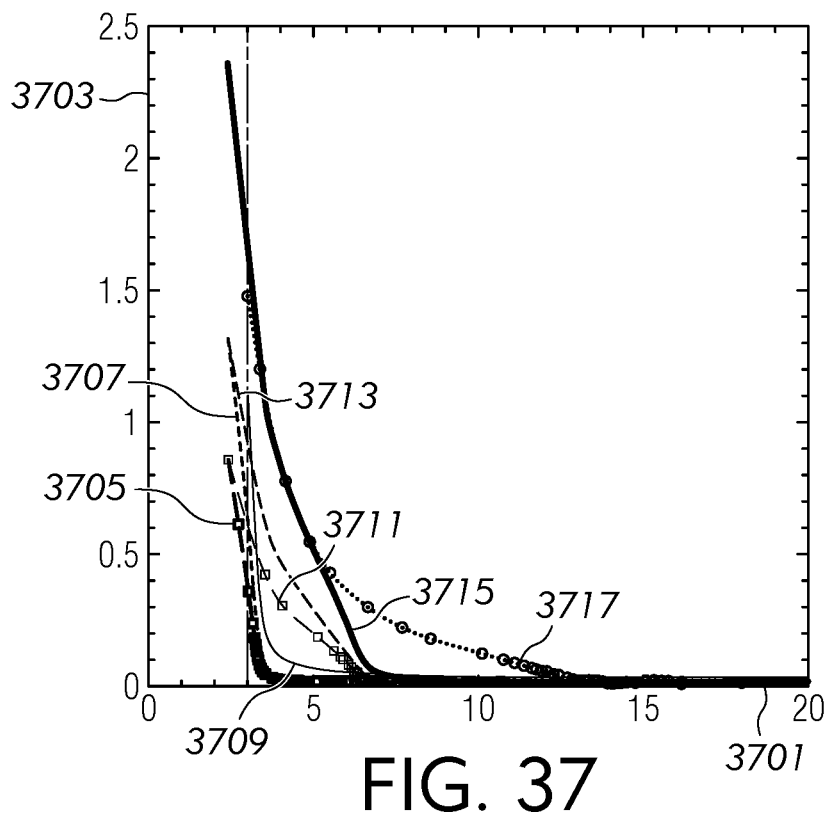
Figure 38:
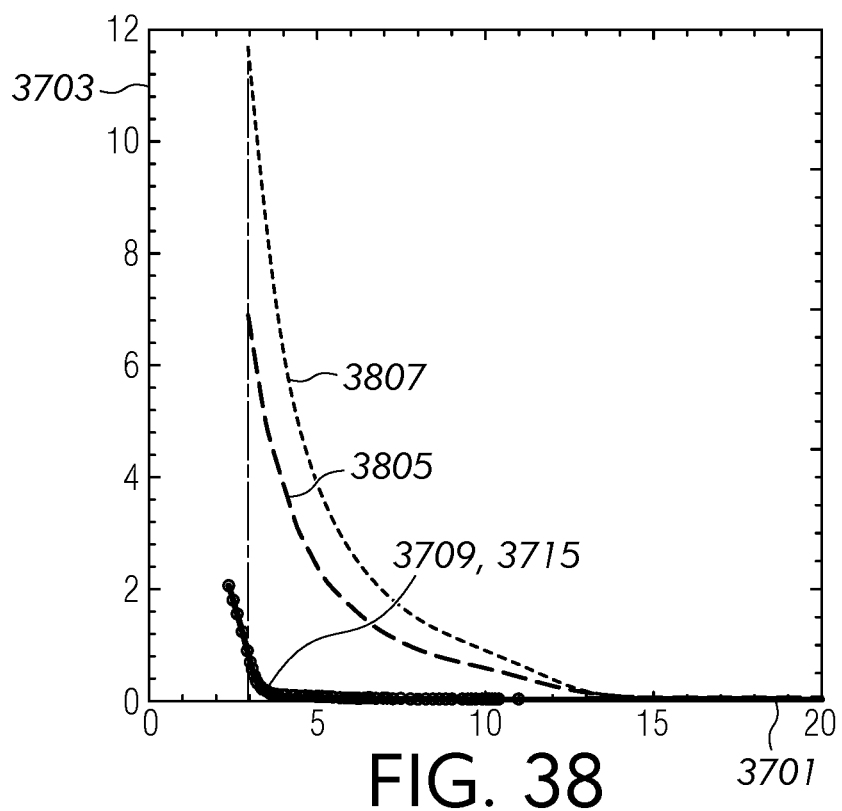

The force to obtain a predetermined parallel plate distance of Examples J-P are reported in FIG. 37 while Examples H-I, L, and O are reported in FIG. 38 when the substrate or coating is on the outside of the bend (e.g., the substrate or coating facing the parallel plates of FIG. 10), opposite the orientation shown in FIG. 10. The details of Examples H-P are provided in Table 1.

In FIG. 37, the horizontal axis 3701 (e.g., x-axis) is the parallel plate distance (in mm), and the vertical axis 3703 (e.g., y-axis) is force in Newtons (N). The results for Examples J-P are shown with the reference numbers for the curves provided in Table 1. All of the curves in FIG. 37 indicate that a force of less than 10 N, in fact less than 1 N, may be used to achieve a parallel plate distance of 5 mm or less. Also, all of the curves in FIG. 37 indicate that a force of less than 2 N may be used to achieve a parallel plate distance of 3 mm or less. Curves 3705, 3707, 3709, 3711, 3713, and 3715 indicate that Examples J-O can achieve a parallel plate distance of 3 mm and a parallel plate distance of 2.4 mm, with forces of less than 2.5N.

Decreasing the minimum distance between the first portion and the second portion from 20 mm (Example P) to 10 mm (Example O) to 5 mm (Example L) while maintaining a coating of 30 μm provides reduced forces to achieve parallel plate distances of 12 mm or less (for 20 mm to 10 mm or 5 mm) or 5 mm or less (for 10 mm to 5 mm). Indeed, the force to achieve a parallel plate distance of 5 mm for examples J-L appears to about 0.1 N or less. Decreasing the coating thickness from 30 μm (Example L) to 20 μm (Example K) to 10 μm (Example J) decreases the force to achieve a parallel plate distance of about 5 mm or less. Decreasing the coating thickness from 30 μm (Example 0) to 20 μm (Example N) to 10 μm (Example M) decreases the force to achieve a parallel plate distance of about 7 mm or less.

In FIG. 38, the horizontal axis 3701 (e.g., x-axis) is the parallel plate distance (in mm), and the vertical axis 3703 (e.g., y-axis) is force in Newtons (N), which is the same as in FIG. 37. All of the curves in FIG. 38 indicate that a force of less than 10 N may be used to achieve a parallel plate distance of 5 mm or less. Also, curves 3709, 3715, and 3805 can achieve a parallel plate distance of 3 mm or less with a force of less than 7 N. The results for Examples H-I, L, and O are shown with the reference numbers for the curves provided in Table 1. On the vertical axis 3703 of FIG. 38, curves 3709 and 3715 corresponding to Examples L and O, respectively, appear to overlap completely (e.g., superimpose). Compared to Example H (curve 3805), the force for Examples L and O is reduced by more than a multiple of 3 for parallel plate distances less than 5 mm. Compared to Example I (curve 3807), the force for Examples L and O is reduced a multiple of about 5 or more for parallel plate distances of 5 mm or less. Providing a coating disposed over the first portion, second portion, and polymer-based portion can reduce the force to achieve a parallel plate distance of about 5 mm or less by a multiple of 3 or more compared to a foldable apparatus comprising a first substrate. Providing a coating can facilitate improved flexible of a foldable apparatus compared to a foldable apparatus comprising a first substrate.

Pen Drop tests were conducted on Examples V-Z. All of Examples V-Z comprise the first portion comprising a first glass-based portion 221 (Composition 2), the second portion comprising a second glass-based portion 231 (Composition 2), and the minimum distance 243 between the first portion 221 and the second portion 231 was 20 mm and filled with the polymer-based portion 241. All of Examples V-Z comprise a rounded edge surface for the first portion and the second portion, and the radius of curvature was equal to half of the first thickness, similar to FIG. 4 without the polymer thickness 415 and without the coating 411. The first substrate comprises a glass-based substrate (Composition 1). The first adhesive layer 211 comprised a 25 μm thick polyurethane-based adhesive (Teroson PU 92 available from Henkel) attaching the first substrate or coating to the first portion, the second portion, and the polymer-based portion. None of Examples V-Z comprised a coating. Table 2 summarizes the properties of the Examples V-Z.

TABLE 2

Properties of Examples V-Z

| Example | Substrate Thickness (μm) | Minimum Distance (mm) | First Portion Thickness (μm) | Polymer-based Portion Elastic Modulus (MPa) | Pen Drop Height over First Portion (cm) |
| --- | --- | --- | --- | --- | --- |
| V | 30 | 20 | 150 | 2.39 | 14.5 |
| W | 30 | 20 | 150 | 705 | 20.5 |
| X | 30 | 20 | 150 | 710 | 21.7 |
| Y | 30 | 20 | 30 | 710 | 18.4 |
| Z | 30 | 20 | 50 | 2.39 | 9.8 |

As reported in Table 2, Example W and Example X can withstand a pen drop of about 20 cm or more (20.5 cm and 21.7 cm, respectively). Example V can withstand a pen drop of about 14.5 cm. Comparing Example V to Examples W-X, increasing the elastic modulus from about 2.39 MPa to more than 700 MPa (705 MPa and 710 MPa, respectively) increased the pen drop height that the foldable apparatus could withstand. A similar trend is seen between Example Z (9.8 cm pen drop for an elastic modulus of 2.39 MPa) and Example Y (18.4 cm pen drop for an elastic modulus of 710 MPa). Comparing Example Y (30 μm first thickness) to Example X (150 μm first thickness), increasing the first thickness increases the pen drop height that the foldable apparatus could withstand. A similar trend is seen between Example Z (50 μm first thickness) and example V (150 μm first thickness), although to a lesser extent given that the difference in first thicknesses is not as great as between Examples Y and X. Examples V-Y can withstand a pen drop of about 10 cm or more without failure. Although not shown in Table 2, the Pen Drop Test was also conducted over a region of the first substrate, coating, and/or backing substrate comprising the polymer-based portion but neither the first portion nor the second portion. Examples V-X were able to withstand a pen drop of about 4 cm or more without failure when the pen was dropped over a portion comprising the polymer-based portion but not the first portion nor the second portion.

Examples AA-QQ were placed in a parallel plate apparatus (e.g. see FIG. 10) and the parallel plate distance was decreased from 60 mm until mechanical instabilities (e.g., wrinkling, buckling) were observed in the substrate by inspection with the naked eye or a parallel plate distance of 3 mm was obtained. Examples AA-QQ comprised a 100 µm thick sheet of PET comprising an elastic modulus of 3,300 MPa attached to a second adhesive that is disposed over the polymer-based portion, the first portion (e.g., second surface area), and the second portion (e.g., fourth surface area). Examples AA-QQ comprise first portions 221 and second portions 231 comprising Composition 2 with an elastic modulus of 71,000 MPa and the first thickness 227 stated in Tables 3-5. In Examples AA-QQ, the first edge surfaces and second edge surfaces comprised circular edge surfaces (e.g., similar to FIG. 4) with the radius of curvature equal to half the first thickness 227. In Examples AA-QQ, a substrate comprising Composition 1 with an elastic modulus of 71,000 MPa and the substrate thickness stated in Tables 3-5. Unless specified otherwise, the substrate is attached to the first surface area of the first portion and the third surface area of the second portion by a first adhesive comprising an elastic modulus of 2.4 MPa with a thickness of 25 µm and exhibited linear elasticity out to less than 8% strain. Unless specified otherwise, the second adhesive attached to the PET sheet comprised a thickness of 50 µm an elastic modulus of 0.1 MPa. Unless specified otherwise, the polymer-based portion 241 comprised a thickness over the second surface area of the first portion and the fourth surface area of the second portion of 20 µm, comprised an elastic modulus of 2.4 MPa, exhibited linear elasticity out to less than 8% strain.

Properties of Examples AA-DD are presented in Table 3. Example AA exhibited wrinkling at a parallel plate distance of 25 mm while Example BB exhibited wrinkling at a parallel plate distance of 16 mm. Examples CC-DD did not exhibit any mechanical instabilities. Decreasing the first portion thickness from 100 µm (Example AA) to 75 µm (Example BB) delayed the onset of mechanical instabilities to a lower parallel plate distance while further decreasing the first portion thickness (Examples CC-DD) eliminated mechanical instabilities for the range of parallel plate distances tested.

TABLE 3

Properties of Examples AA-DD

| Example | Substrate Thickness (µm) | First Portion Thickness (µm) | Parallel Plate Performance |
|---|---|---|---|
| AA | 30 | 100 | Wrinkle at 25 mm |
| BB | 30 | 75 | Wrinkle at 16 mm |
| CC | 30 | 50 | OK at 3 mm |
| DD | 30 | 30 | OK at 3 mm |

Properties of Examples EE-HH are presented in Table 4. In Examples EE-HH, the polymer-based portion and the first adhesive comprised an elastic modulus of 4 MPa and exhibited linear elasticity to at least 20% strain. Example EE exhibited wrinkling at a parallel plate distance of 15 mm while Examples FF-HH did not exhibit any mechanical instabilities. As with Examples AA-DD in Table 3, decreasing the first portion thickness (e.g., from 100 µm in Example EE to 75 µm in Example FF) delayed the onset of mechanical instabilities to a lower parallel plate distance and/or eliminated mechanical instabilities for the range of parallel plate distances tested (Examples GG-HH). Comparing Example AA to Example EE (both comprising a first portion thickness of 100 µm), replacing the polymer-based portion and first adhesive comprising a greater region of linear elasticity (from less than 8% to at least 20%) and increasing the elastic modulus (from 2.4 MPa to 4 MPa), the onset of mechanical instabilities was delayed to a lower parallel plate distance. Similarity, comparing Example BB to Example FF (both comprising a first portion thickness of 75 µm), replacing the polymer-based portion and the first adhesive with one comprising a greater region of linear elasticity and increasing the elastic modulus caused the mechanical instability of Example BB not to be observed for Example FF.

TABLE 4

Properties of Examples EE-HH

| Example | Substrate Thickness (µm) | First Portion Thickness (µm) | Parallel Plate Performance |
|---|---|---|---|
| EE | 30 | 100 | Wrinkle at 15 mm |
| FF | 30 | 75 | OK at 3 mm |
| GG | 30 | 50 | OK at 3 mm |
| HH | 30 | 30 | OK at 3 mm |

Properties of Examples II-KK are presented in Table 5. In Examples II-KK, the first adhesive thickness was 5 µm and the polymer-based portion comprised a thickness of 5 µm over the second surface area and the fourth surface area. In Example KK, the polymer-based portion and the first adhesive comprised an elastic modulus of 4 MPa and exhibited linear elasticity to at least 20% strain. Example II exhibited wrinkling at a parallel plate distance of 12 mm while Examples JJ-KK did not exhibit any mechanical instabilities. Comparing Example AA to Example II (both comprising a first portion thickness of 100 µm), decreasing the thickness of the first adhesive and the polymer-based portion (from 25 µm to 5 µm) delayed the onset of mechanical instabilities (from a parallel plate distance of 25 mm to 12 mm). Comparing Example BB to Example JJ (both comprising a first portion thickness of 75 µm), decreasing the thickness of the first adhesive and the polymer-based portion caused the onset of mechanical instabilities at 16 mm to not be observed for Example JJ. Comparing Example II to Example KK (both comprising a first portion thickness of 100 µm), replacing the polymer-based portion and first adhesive with one comprising a greater region of linear elasticity and increasing the elastic modulus caused the mechanical instability of Example II not to be observed for Example KK.

TABLE 5

Properties of Examples II-QQ

| Example | Substrate Thickness (μm) | First Portion Thickness (μm) | First Adhesive and Polymer Thickness (μm) | Adhesive Elastic Modulus (MPa) | Parallel Plate Performance |
|---|---|---|---|---|---|
| II | 30 | 100 | 5 | 2.4 | Wrinkle at 12 mm |
| JJ | 30 | 75 | 5 | 2.4 | OK at 3 mm |
| KK | 30 | 100 | 5 | 4 | OK at 3 mm |
| LL | 30 | 100 | 25 | 1,000 | Wrinkle 27 mm |
| MM | 30 | 100 | 25 | 5,000 | OK at 3 mm |
| NN | 30 | 100 | 25 | 1,000 | OK at 3 mm |
| OO | 30 | 100 | 25 | 5,000 | OK at 3 mm |
| PP | 30 | 100 | 50 | 0.1 | Wrinkle at 15 mm |
| QQ | 30 | 100 | 50 | 0.05 | OK at 3 mm |

Properties of Examples LL-OO are also presented in Table 5. In Example LL and Example NN, first adhesive comprised an elastic modulus of 1,000 GPa. In Example MM and Example 00 comprised an elastic modulus of 5,000 GPa. In Examples NN-OO, the first adhesive exhibited linear elasticity to at least 20% strain. In Examples NN-OO, the polymer-based portion comprised an elastic modulus of 4 MPa and exhibited linear elasticity to at least 20% strain. Example LL exhibited wrinkling at a parallel plate distance of 27 mm, but no mechanical instabilities were observed for Examples MM-OO. Comparing Example LL to Example MINI, increasing the elastic modulus of the first adhesive (from 1,000 MPa to 5,000) caused the onset of mechanical instabilities at 27 mm to not be observed for Example MM. Comparing Example LL to Example NN, replacing the polymer-based portion with one comprising a greater region of linear elasticity and increasing the elastic modulus caused the mechanical instability of Example LL to not be observed for Example NN.

Properties of Examples PP-QQ are also presented in Table 5. Examples PP-QQ comprised a first adhesive and a polymer-based portion exhibited linear elasticity to at least 20% strain and an elastic modulus of 4 MPa. In Example PP, the second adhesive comprised an elastic modulus of 0.1 MPa and a thickness of 50 μm. In Example QQ, the second adhesive comprised an elastic modulus of 0.05 MPa and a thickness of 50 μm. Example PP exhibited wrinkling at a parallel plate distance of 15 mm, but no mechanical instability was observed for Example QQ. Comparing Example PP to Example QQ, decreasing the elastic modulus of the second adhesive cause the mechanical instability of Example PP not be observed for Example QQ.

The above observations can be combined to provide foldable apparatus comprising a first portion and a second portion and low effective minimum bend radii, high impact resistance, low closing force, and low-velocity failure. The foldable apparatus can comprise a first portion and a second portion comprising glass-based portions, ceramic-based portions, and/or polymer-based portions, which can provide good impact and/or good puncture resistance to the foldable apparatus. The first portion and/or the second portion can comprise glass-based portions and/or ceramic-based portions comprising one or more compressive stress regions, which can further provide increased impact resistance and/or increased puncture resistance. Providing a substrate comprising a glass-based and/or ceramic-based substrate can also provide increased impact resistance and/or increased puncture resistance while simultaneously facilitating good folding performance. A first edge surface of the first portion and/or a second edge surface of the second portion can comprise a blunted edge surface, which can minimize stress concentrations, for example, at an interface between the first portion and/or the second portion and the polymer-based portion. Providing a blunted edge surface for the first portion and/or the second portion can reduce the incidence of adhesion-based failure (e.g., delamination) between the polymer-based portion and the first portion and/or second portion. In other embodiments, the first edge and/or the second edge need not be blunted.

A region between the first portion and the second portion can comprise a polymer-based portion, which can provide good folding performance (e.g., effective minimum effective bend radius in a range from about 1 mm to about 20 mm, for example from about 5 mm to about 10 mm). Providing a minimum distance between the first portion and the second portion that is small (e.g., about 30 mm or less, for example, from about 5 mm to about 20 mm, or from 5 mm to about 10 mm) can further provide good folding performance as well as minimize a region of the foldable apparatus with a lower impact resistance (e.g., the portion of the foldable apparatus including the polymer-based portion compared to the portions of the foldable apparatus comprising the first portion and/or the second portion). In some embodiments, a coating can be disposed over at least the polymer-based portion (e.g., between the polymer-based portion and a user). Providing a polymer-based portion contacting a surface area of the first portion and/or the second portion can reduce folding-induced stresses on a coating and/or substrate, for example, by shifting a neutral axis of the coating and/or substrate closer to the polymer-based portion than a mid-plane of the coating and/or substrate. Further providing a polymer-based portion contacting both the first portion and the second portion can reduce optical distortions when viewing an image (e.g., from a display device or other electronic device). Further providing a polymer-based portion contacting a pair of surface areas facing the same direction can provide a contact surface covering the first portion and the second portion to present the contact surface with consistent properties across its length and/or width for coupling components thereto (e.g., substrates, coatings, release liners, display devices). In some embodiments, the polymer-based portion and/or an adhesive layer (e.g., first, second, third) can comprise a refractive index that can substantially match (e.g., a magnitude of a difference of about 0.1 or less) a refractive index of the first portion and/or the second portion, which can minimize optical distortions. Providing the polymer-based portion contacting a first surface area of the first portion and a third surface area of the second portion and/or a second surface area of the second portion and a fourth surface area of the second portion can further increase the reliability of the foldable apparatus. For example, providing a consistent interface between the first portion and/or second portion that extends beyond the corresponding edge surface can reduce interfacial strain and/or stress as well as reduce stress concentrations on the corresponding portion. In further embodiments, an incidence of mechanical instabilities can be reduced by providing a small thickness (e.g., about 5 millimeters or less, from about 1 millimeter to about 5 millimeters) of the polymer-based portion from one or more of the first surface area of the first portion, the second surface area of the first portion, the third surface area of the second portion, or the fourth surface area of the second portion. In further embodiments, providing a contact surface of the polymer-based portion and/or adhesive portion extending from the first portion to the second portion can provide a uniform interface for other components to attach to, which can reduce stress concentration and reduce the incidence of folding-induced failure.

Providing an inorganic layer (e.g., glass-based substrate, ceramic-based substrate, sapphire) disposed over at least the polymer-based portion (e.g., between the polymer-based portion and a user) can also provide increased impact resistance and/or increased puncture resistance while simultaneously facilitating good folding performance. For example, the inorganic layer can increase a pen drop height that the foldable apparatus can withstand of a central portion of the foldable apparatus comprising the polymer-based portion. Limiting a width of the inorganic layer (e.g., from about 100% to about 200% of the minimum distance between the first portion and the second portion) can provide increased pen drop performance will minimizing an amount of material in the substrate. In further embodiments, the inorganic layer can provide a consistent major surface with the rest of the foldable apparatus, for example, by providing a recessed portion of the first portion and/or the second portion configured to receive the substrate. Providing a consistent major surface comprising the first portion, the second portion, and the inorganic layer can enable a smooth surface of the foldable apparatus that can reduce optical distortions and/or enable a perceived continuous surface for a user toughing the foldable apparatus.

Providing a neutral stress configuration when the foldable apparatus is in a bent configuration can decrease the force to fold the foldable apparatus to a predetermined parallel plate distance. Further, providing a neutral stress configuration when the foldable apparatus is in a bent state can reduce the maximum stress and/or the maximum strain experienced by the polymer-based portion during normal use conditions, which can, for example, enable increased durability and/or reduced fatigue of the foldable apparatus. In some embodiments, the polymer-based portion can comprise a low (e.g., substantially zero and/or negative) coefficient of thermal expansion, which can mitigate warp caused by volume changes during curing of the polymer-based portion. In some embodiments, the neutral stress configuration can be generated by providing a polymer-based portion that expands as a result of curing. In some embodiments, the neutral stress configuration can be generated by curing the polymer-based portion in a bent configuration. In some embodiments, the neutral stress configuration can be generated by folding a ribbon at an elevated temperature (e.g., when the ribbon comprises a viscosity in a range from about $10^4$ Pascal-seconds and about $10^7$ Pascal-seconds).

Providing a coating can reduce folding-induced stresses of the first portion, second portion, and/or polymer-based portion. Providing a coating can reduce the force to achieve a small parallel plate distance (e.g., about 10 Newtons (N) or less to achieve a parallel plate distance of 10 mm, about 3 N or less to achieve a parallel plate distance of about 3 mm). Providing a coating can also improve the scratch resistance, the impact resistance, and/or the puncture resistance of the foldable apparatus while simultaneously facilitating good folding performance. In some embodiments, a substrate can be disposed over at least the polymer-based portion (e.g., between the polymer-based portion and a user). The coating can enable low forces to achieve small parallel plate distances, for example, by shifting a neutral axis of the polymer-based portion away from the coating (e.g., surface facing the user) when the coating has an elastic modulus less than an elastic modulus of a glass-based substrate and/or the coating has a thickness of about 200 µm or less. Further, providing a coating on the substrate can provide low-velocity ejection of shards upon failure of the foldable apparatus (e.g., when it is pushed beyond its design limits) and/or can comprise shards comprising an aspect ratio of about 3 or less.

Directional terms as used herein—for example, up, down, right, left, front, back, top, bottom—are made only with reference to the figures as drawn and are not intended to imply absolute orientation.

It will be appreciated that the various disclosed embodiments may involve features, elements, or steps that are described in connection with that embodiment. It will also be appreciated that a feature, element, or step, although described in relation to one embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. For example, reference to "a component" comprises embodiments having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar"

may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C. As used herein, the terms "comprising" and "including", and variations thereof shall be construed as synonymous and open-ended unless otherwise indicated.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the embodiments herein provided they come within the scope of the appended claims and their equivalents.

What is claimed is:

1. A foldable apparatus comprising:
   a first portion comprising a first surface area and a second surface area opposite the first surface area, a first edge surface defined between the first surface area and the second surface area, a first blunted edge surface of the first edge surface comprises an outwardly convex edge surface, the outwardly convex edge surface is a rounded edge surface that comprises an entire first edge surface, and a first thickness defined between the first surface area and the second surface area;
   a second portion comprising a third surface area and a fourth surface area opposite the third surface area, a second edge surface defined between the third surface area and the fourth surface area, and a second thickness defined between the third surface area and the fourth surface area; and
   a polymer-based portion positioned between the first edge surface and the second edge surface and further extending beyond a plane defined by the second surface area and the fourth surface area to contact the second surface area of the first portion and the fourth surface area of the second portion, the polymer-based portion comprises a third contact surface and a fourth contact surface opposite the third contact surface, and the polymer-based portion comprises a polymer thickness of about 50 micrometers or less measured from the second surface area of the first portion in a direction of the first thickness.

2. The foldable apparatus of claim 1, further comprising a first adhesive layer comprising a first contact surface and a second contact surface opposite the first contact surface, wherein the second contact surface faces the first surface area and the third surface area.

3. The foldable apparatus of claim 2, wherein a thickness of the first adhesive layer defined between the first contact surface and the second contact surface is in a range from about 1 micrometer to about 30 micrometers.

4. The foldable apparatus of claim 2, wherein the third contact surface of the polymer-based portion contacts the second contact surface of the first adhesive layer.

5. The foldable apparatus of claim 2, wherein the first surface area of the first portion contacts the second contact surface of the first adhesive layer, and the third surface area of the second portion contacts the second contact surface of the first adhesive layer.

6. The foldable apparatus of claim 2, wherein the first adhesive layer comprises an elastic modulus is in a range from about 0.001 MegaPascals to about 0.5 MegaPascals.

7. The foldable apparatus of claim 2, wherein the first adhesive layer comprises an elastic modulus is in a range from about 250 MegaPascals to about 4 GigaPascals.

8. The foldable apparatus of claim 1, further comprising a first substrate comprising a first substrate thickness defined between a first major surface and a second major surface opposite the second major surface, and the second major surface of the first substrate facing the first surface area of the first portion and the third surface area of the second portion.

9. The foldable apparatus of claim 1, further comprising a coating disposed over the first portion, the second portion, and the polymer-based portion, wherein the coating comprises a coating thickness in a range from about 0.1 micrometers to about 200 micrometers.

10. The foldable apparatus of claim 9, wherein the coating comprises one or more of an ethylene-acid copolymer, a polyurethane-based polymer, an acrylate resin, or a mercapto-ester resin.

11. The foldable apparatus of claim 1, wherein the foldable apparatus achieves an effective bend radius of about 20 millimeters.

12. The foldable apparatus of claim 1, wherein a minimum distance between the first edge surface of the first portion and the second edge surface of the second portion is in a range from about twice an effective minimum bend radius to about 60 millimeters.

13. The foldable apparatus of claim 1, wherein a minimum distance between the first edge surface of the first portion and the second edge surface of the second portion is in a range from about 1 millimeter to about 100 millimeters.

14. The foldable apparatus of claim 1, wherein the polymer-based portion comprise an elastomer.

15. The foldable apparatus of claim 1, wherein the second blunted edge surface of the second edge surface comprises an outwardly convex edge surface.

16. The foldable apparatus of claim 1, wherein the foldable apparatus resists failure for a pen drop height of 15 centimeters over a location of the first portion.

17. The foldable apparatus of claim 1, wherein a force to bend the foldable apparatus from a flat configuration to a parallel plate distance of about 10 millimeters is about 10 Newtons or less.

* * * * *